(12) United States Patent
Nishimoto et al.

(10) Patent No.: US 6,199,164 B1
(45) Date of Patent: Mar. 6, 2001

(54) INFORMATION MANAGEMENT SYSTEM AND APPARATUS USING OPEN NETWORK ENVIRONMENT, AND STORAGE MEDIUM STORING CONTROL PROGRAM OF APPARATUS AND CAPABLE OF BEING READ BY COMPUTER

(75) Inventors: Atsushi Nishimoto; Hirokuni Fuku; Minami Watanabe, all of Tokyo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/005,186

(22) Filed: Jan. 9, 1998

(30) Foreign Application Priority Data

Jun. 24, 1997 (JP) .................................................. 9-166942

(51) Int. Cl.⁷ .................................................. G06F 11/30
(52) U.S. Cl. .......................................... 713/200; 709/200
(58) Field of Search ...................... 713/200–202; 709/200, 203, 217–219, 223–225, 227–229

(56) References Cited

U.S. PATENT DOCUMENTS

| | | | |
|---|---|---|---|
| 5,586,260 | * 12/1996 | Hu ....................................... | 395/200.2 |
| 5,682,478 | * 10/1997 | Watson et al. ................... | 395/200.12 |
| 5,689,638 | * 11/1997 | Sadovsky ......................... | 395/188.01 |
| 5,696,898 | * 12/1997 | Baker et al. ..................... | 395/187.01 |
| 5,805,820 | * 9/1998 | Bellovin et al. ................ | 395/200.55 |
| 5,822,518 | * 10/1998 | Ooki et al. ...................... | 395/187.01 |
| 5,841,970 | * 11/1998 | Tabuki ............................. | 395/187.01 |
| 5,845,070 | * 12/1998 | Ikudome ......................... | 395/187.01 |
| 5,862,325 | * 1/1999 | Reed et al. ........................... | 709/201 |
| 5,881,234 | * 3/1999 | Schwob ........................... | 395/200.49 |
| 5,887,140 | * 3/1999 | Itsumi et al. .................... | 395/200.55 |
| 5,889,958 | * 3/1999 | Willens ........................... | 395/200.59 |
| 5,892,905 | * 4/1999 | Brandt et al. ................... | 395/187.01 |

* cited by examiner

*Primary Examiner*—David A. Wiley
(74) *Attorney, Agent, or Firm*—Staas & Halsey, LLP

(57) ABSTRACT

A connection server receives access permission information at the start of the connection of a peer client of the user to an open network, registers the access permission information into a database, and responds the relevant access permission information for a retrieval request from an IP server with reference to the database. By a transmitting request based on the access permission information obtained by the retrieval request to the connection server, the IP server obtains predetermined personal information as special personal information, registers it into the database, and, when providing information adapted to the special personal information is obtained, transmits the providing information to the peer client.

22 Claims, 53 Drawing Sheets

FIG. 5

| 96 ↘ CONNECTION PERMISSION INFORMATION | | DEFAULT |
|---|---|---|
| 138 — EMERGENCY CHANNEL | PERMISSION IP-Server HOST NAME (A PLURALITY OF NAMES ARE REGISTERED) | NONE |
| | REFUSAL IP-Server HOST NAME (A PLURALITY OF NAMES ARE REGISTERED) | ALL |
| 140 — REGULAR CONFIRMATION CHNNEL | PERMISSION IP-Server HOST NAME (A PLURALITY OF NAMES ARE REGISTERED) | ALL |
| | REFUSAL IP-Server HOST NAME (A PLURALITY OF NAMES ARE REGISTERED) | NONE |
| 142 — PRESERVATION CHANNEL | PERMISSION IP-Server HOST NAME (A PLURALITY OF NAMES ARE REGISTERED) | ALL |
| | REFUSAL IP-Server HOST NAME (A PLURALITY OF NAMES ARE REGISTERED) | NONE |
| 124 — | ID | |

FIG. 9

| 104 | PUBLIC PERSONAL INFORMATION USE PERMISSION INFORMATION | | DEFAULT |
|---|---|---|---|
| 170 | INEVITABLE | PERMISSION IP-Server HOST NAME (A PLURALITY OF NAMES ARE REGISTERED) | ALL |
| | | REFUSAL IP-Server HOST NAME (A PLURALITY OF NAMES ARE REGISTERED) | NONE |
| 172 | OPTION | PERMISSION IP-Server HOST NAME (A PLURALITY OF NAMES ARE REGISTERED) | NONE |
| | | REFUSAL IP-Server HOST NAME (A PLURALITY OF NAMES ARE REGISTERED) | ALL |
| 174 | ACTIVE PUBLICATION ("DONE" / "NOT DONE") | | NOT DONE |
| 124 | ID | | |

FIG. 10

| | |
|---|---|
| REGISTRATION FORM | 106 |
| KIND OF INFORMATION | 184 |
| SPECIAL PERSONAL INFORMATION REGISTRATION FORM | 186 |

FIG. 11

| | |
|---|---|
| INFORMATION OF INFORMATION PROVIDERS | 108 |
| IP NAME | 188 |
| KIND OF PROVIDING INFORMATION | 190 |
| IP-Server HOST NAME | 192 |

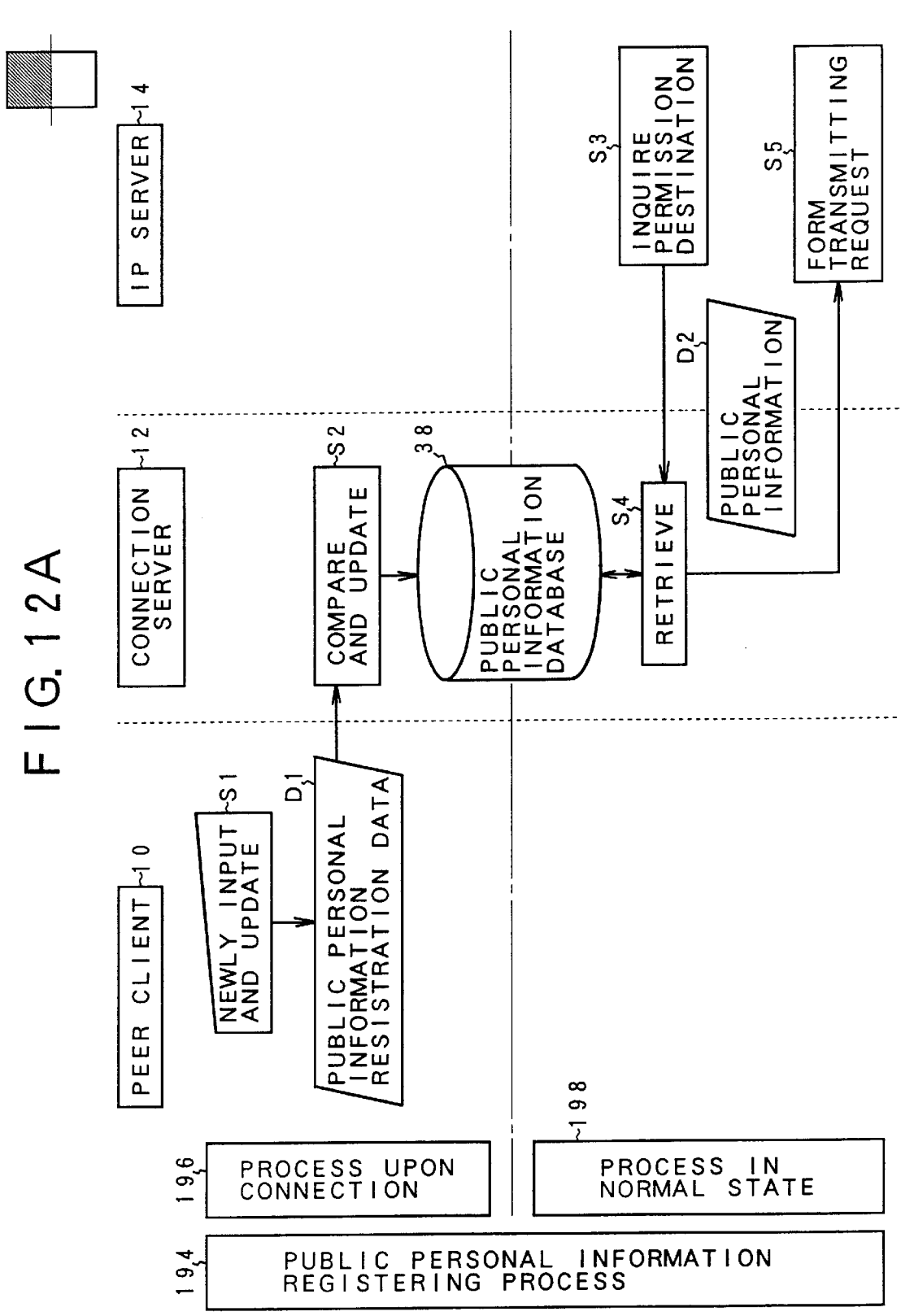

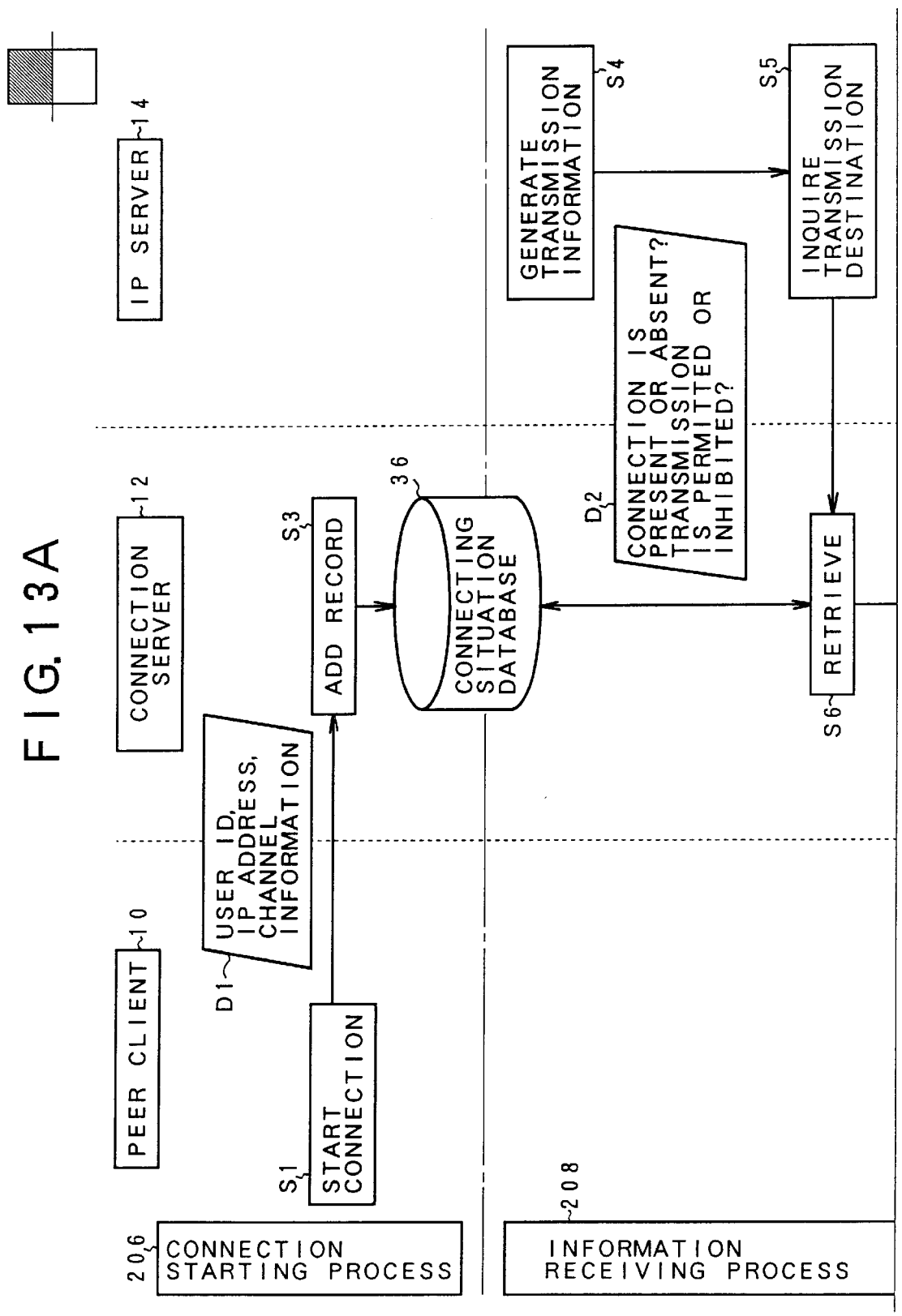

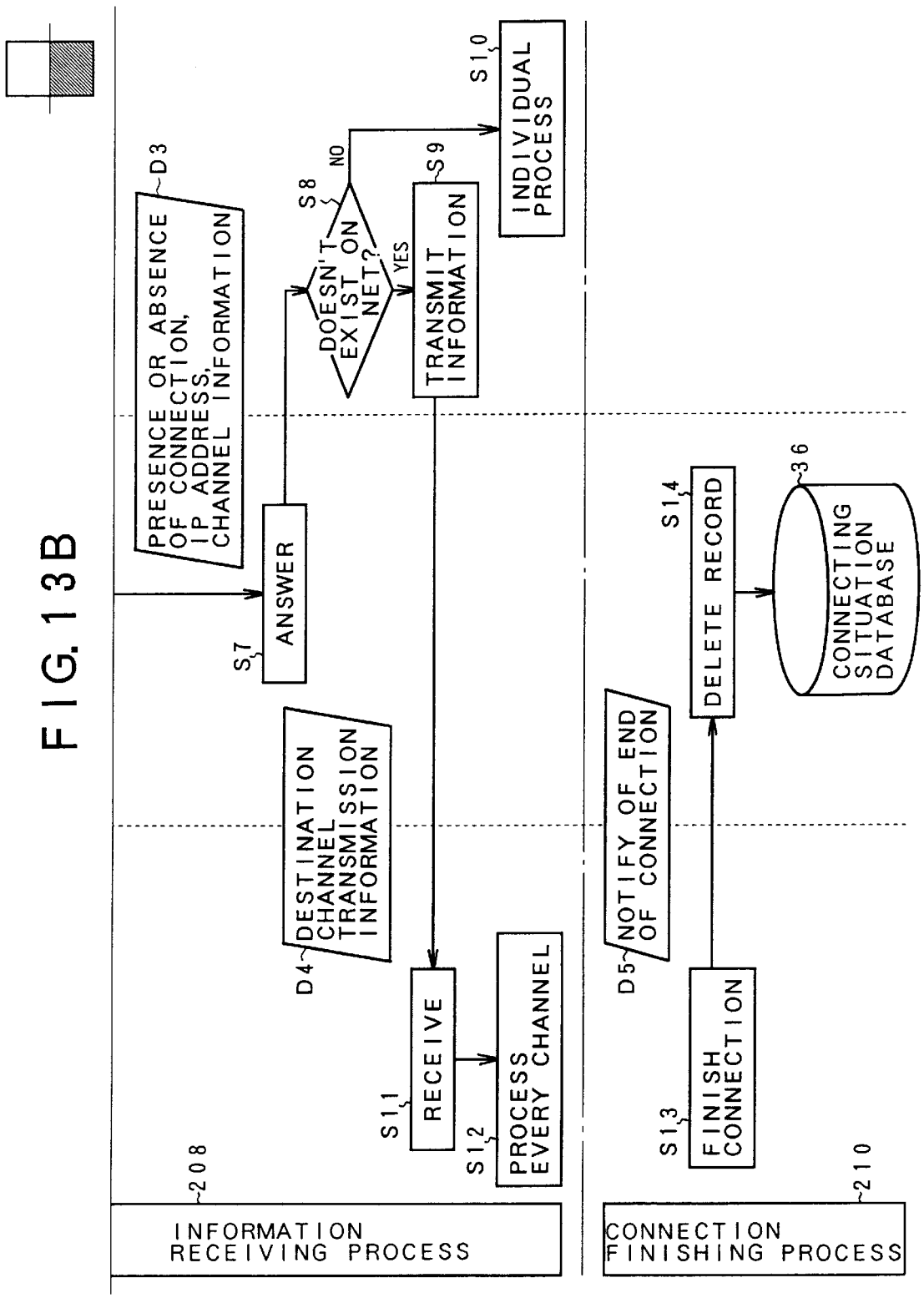

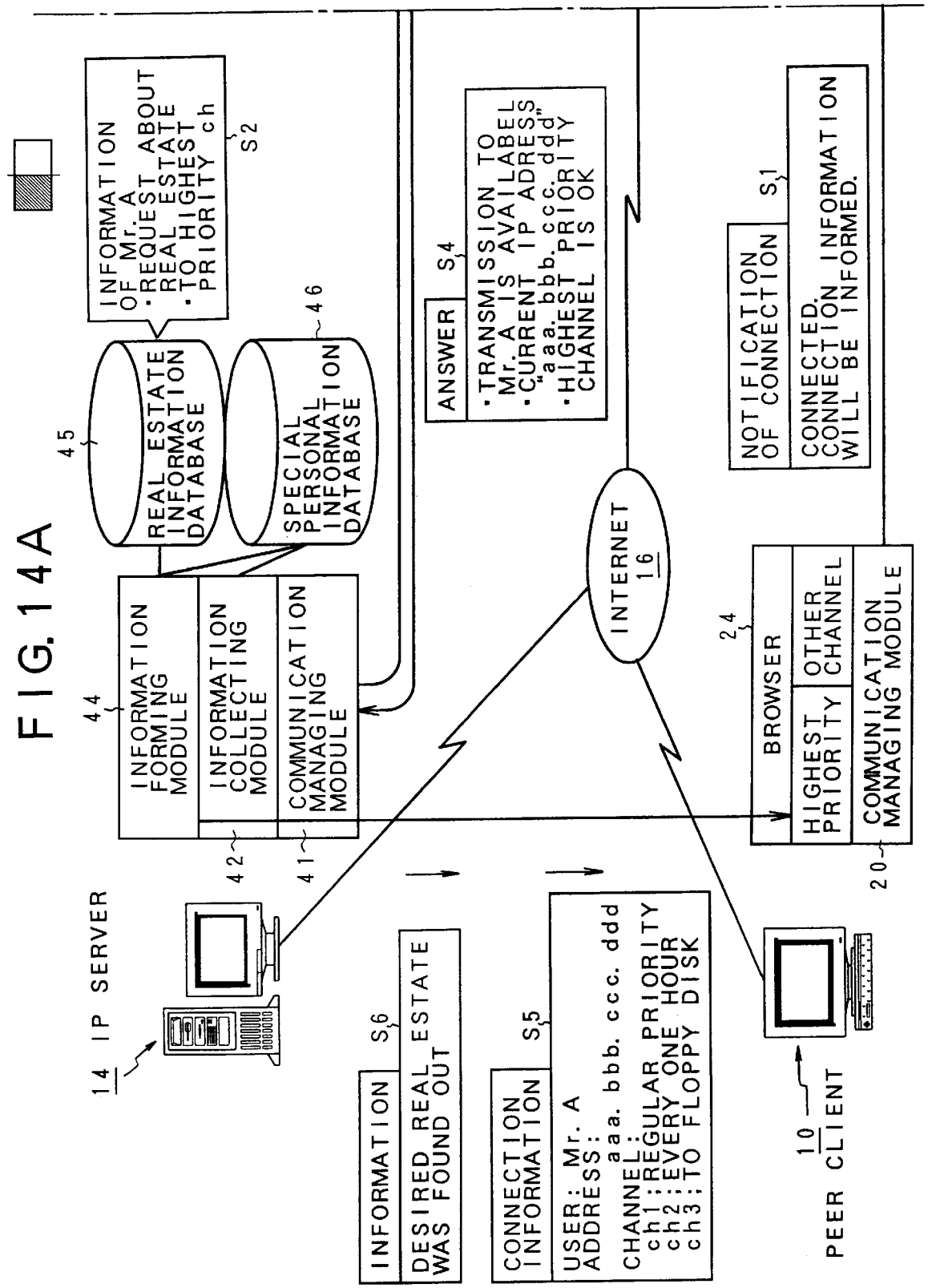

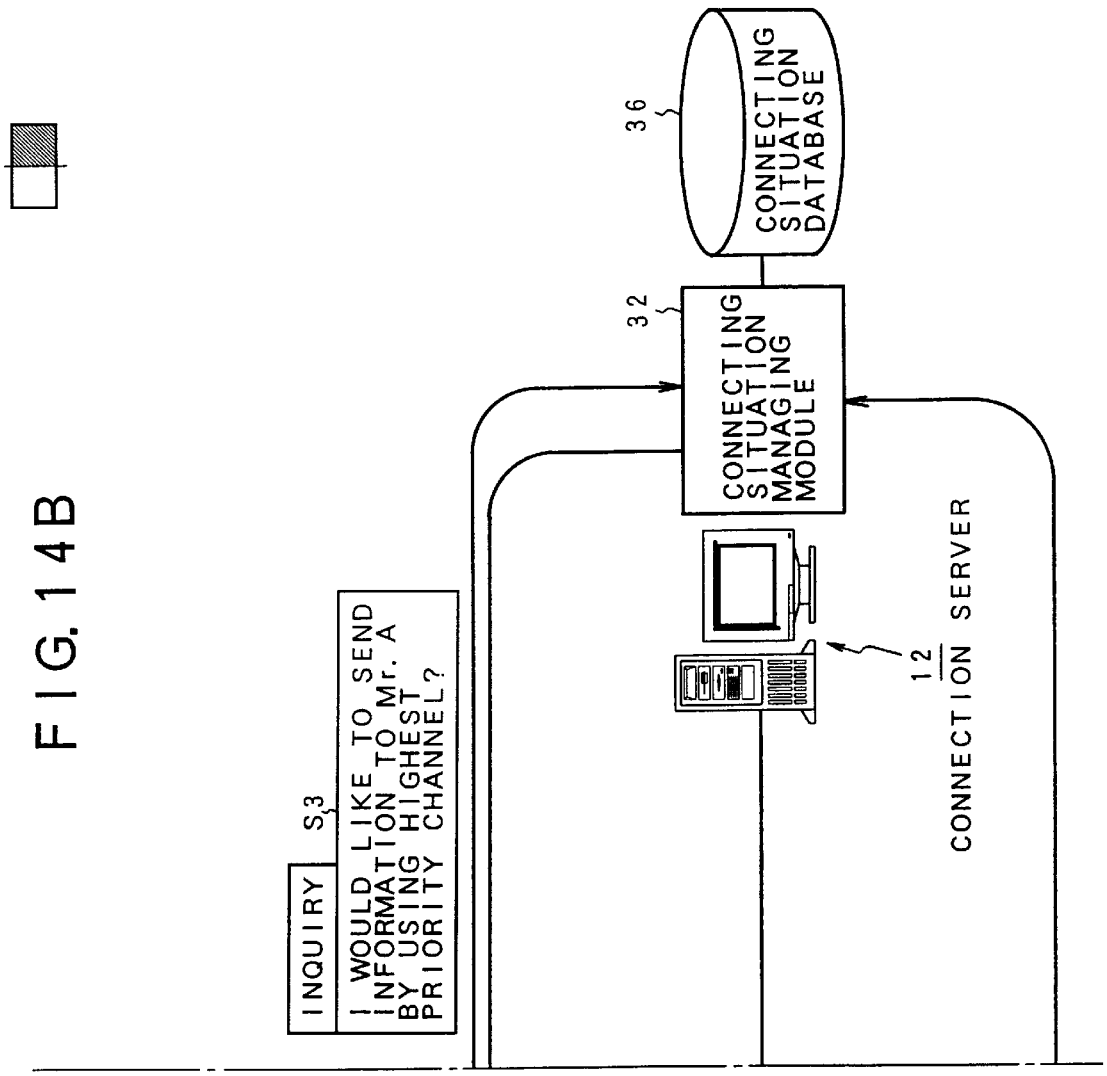

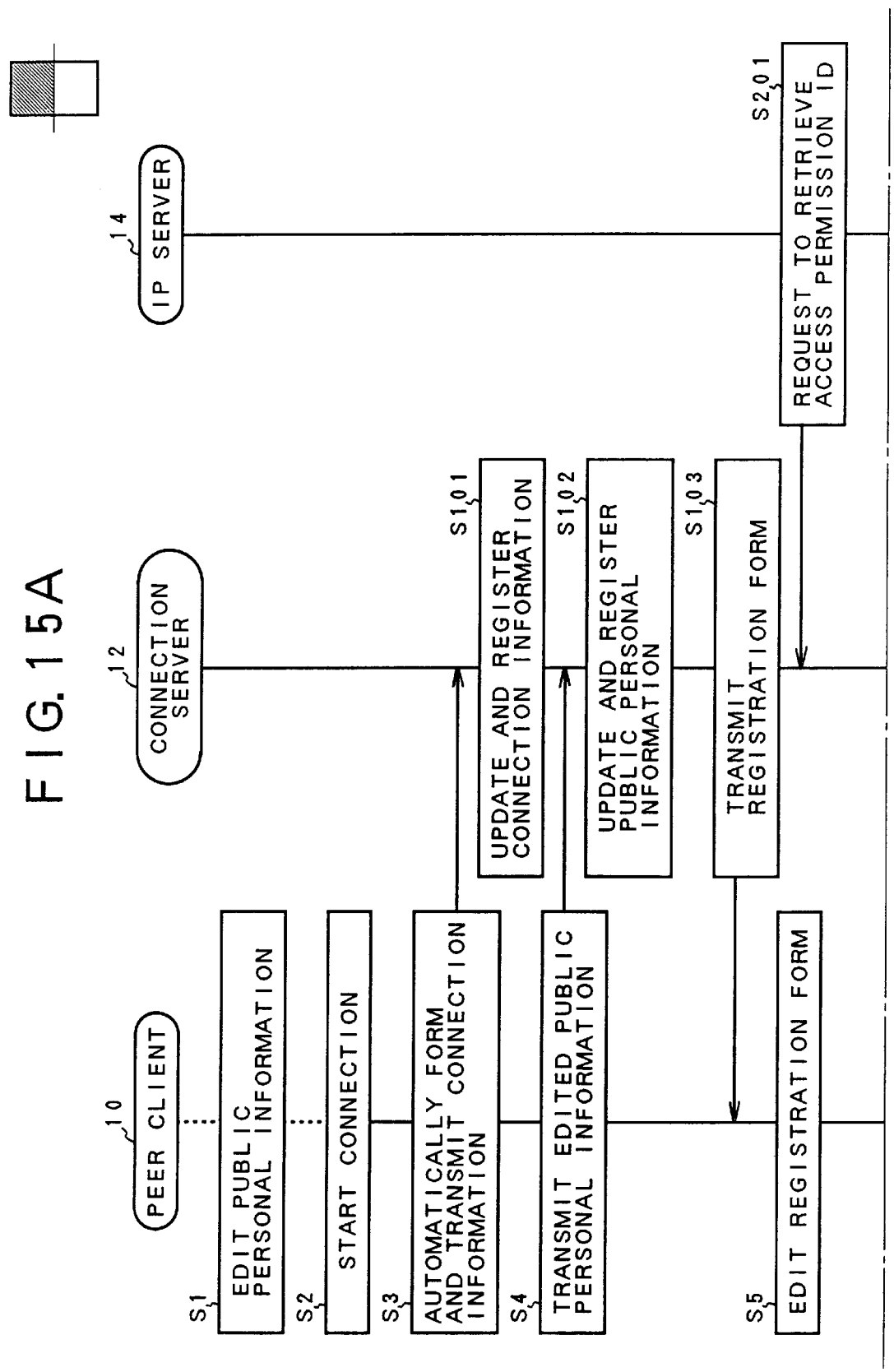

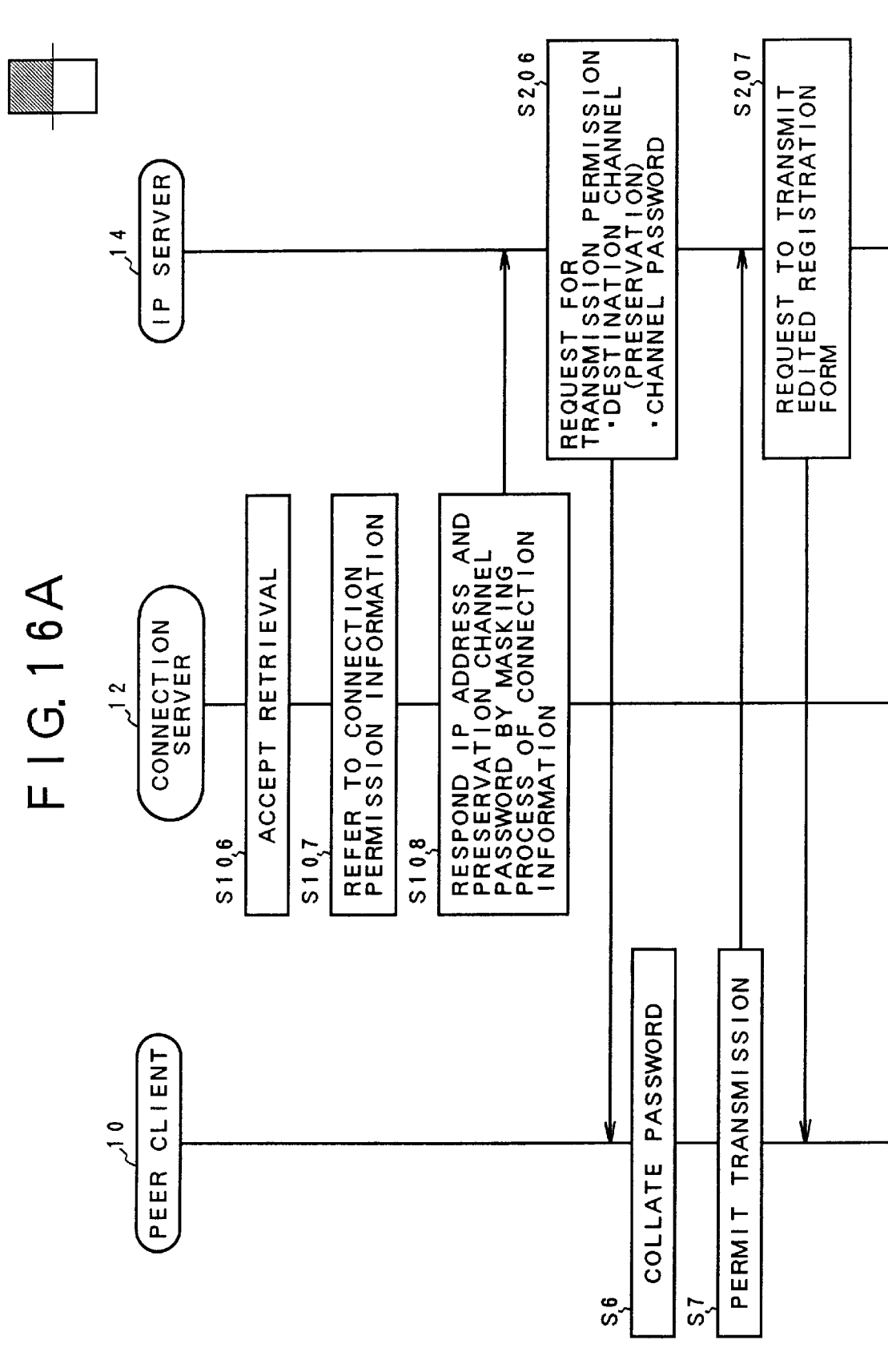

FIG. 17A

| PUBLIC PERSONAL INFORMATION USE PERMISSION INFORMATION | | |
|---|---|---|
| INEVITABLE | PERMISSION IP-Server HOST NAME | ALL |
| | REFUSAL IP-Server HOST NAME | NONE |
| OPTION | PERMISSION IP-Server HOST NAME | NONE |
| | REFUSAL IP-Server HOST NAME | ALL |
| ACTIVE PUBLICATION | | NOT DONE |
| ID | | |

FIG. 17B

| PUBLIC PERSONAL INFORMATION | | |
|---|---|---|
| INEVITABLE | ID | xyz |
| | KIND OF NECESSARY INFORMATION | REAL ESTATE |
| OPTION | (OMITTED) | |

FIG. 17C

| | CONNECTION PERMISSION INFORMATION | |
|---|---|---|
| EMERGENCY CHANNEL | PERMISSION IP-Server HOST NAME | NONE |
| | REFUSAL IP-Server HOST NAME | ALL |
| REGULAR CONFIRMATION CHANNEL | PERMISSION IP-Server HOST NAME | NONE |
| | REFUSAL IP-Server HOST NAME | ALL |
| PRESERVATION CHANNEL | PERMISSION IP-Server HOST NAME | ALL |
| | REFUSAL IP-Server HOST NAME | NONE |
| ID | | |

FIG. 19A

| CONNECTION PERMISSION INFORMATION | | |
|---|---|---|
| EMERGENCY CHANNEL | PERMISSION IP-Server HOST NAME | REAL ESTATE COMPANY |
| | REFUSAL IP-Server HOST NAME | ALL |
| (REGULAR CONFIRMATION CHANNEL IS OMITTED) | | |
| (PRESERVATION CHANNEL IS OMITTED) | | |

96
138 — EMERGENCY CHANNEL

FIG. 19B

| CONNECTION NOTIFICATION DESTINATION INFORMATION FILE | |
|---|---|
| ID | 124 |
| NONE | 146 |

100

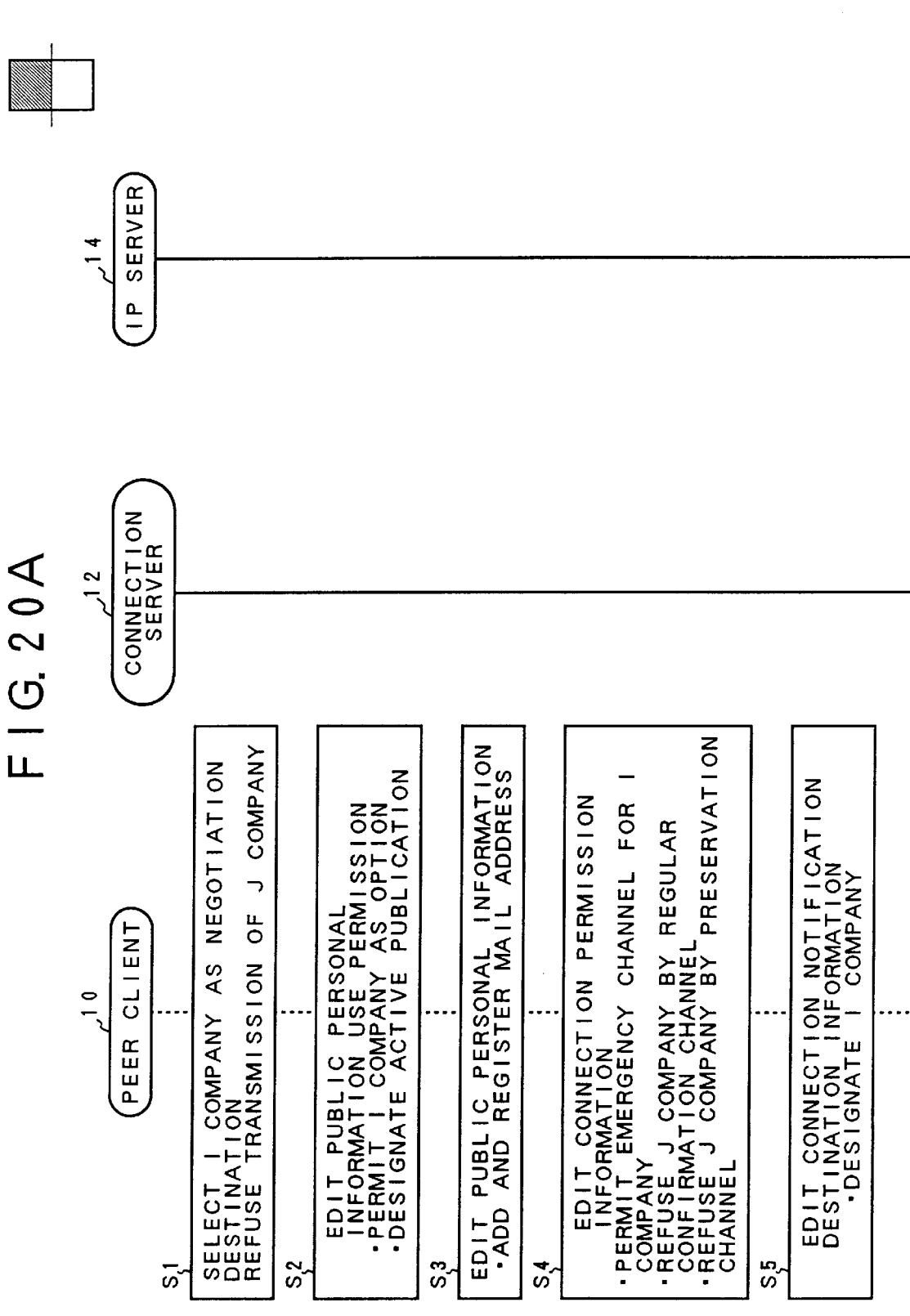

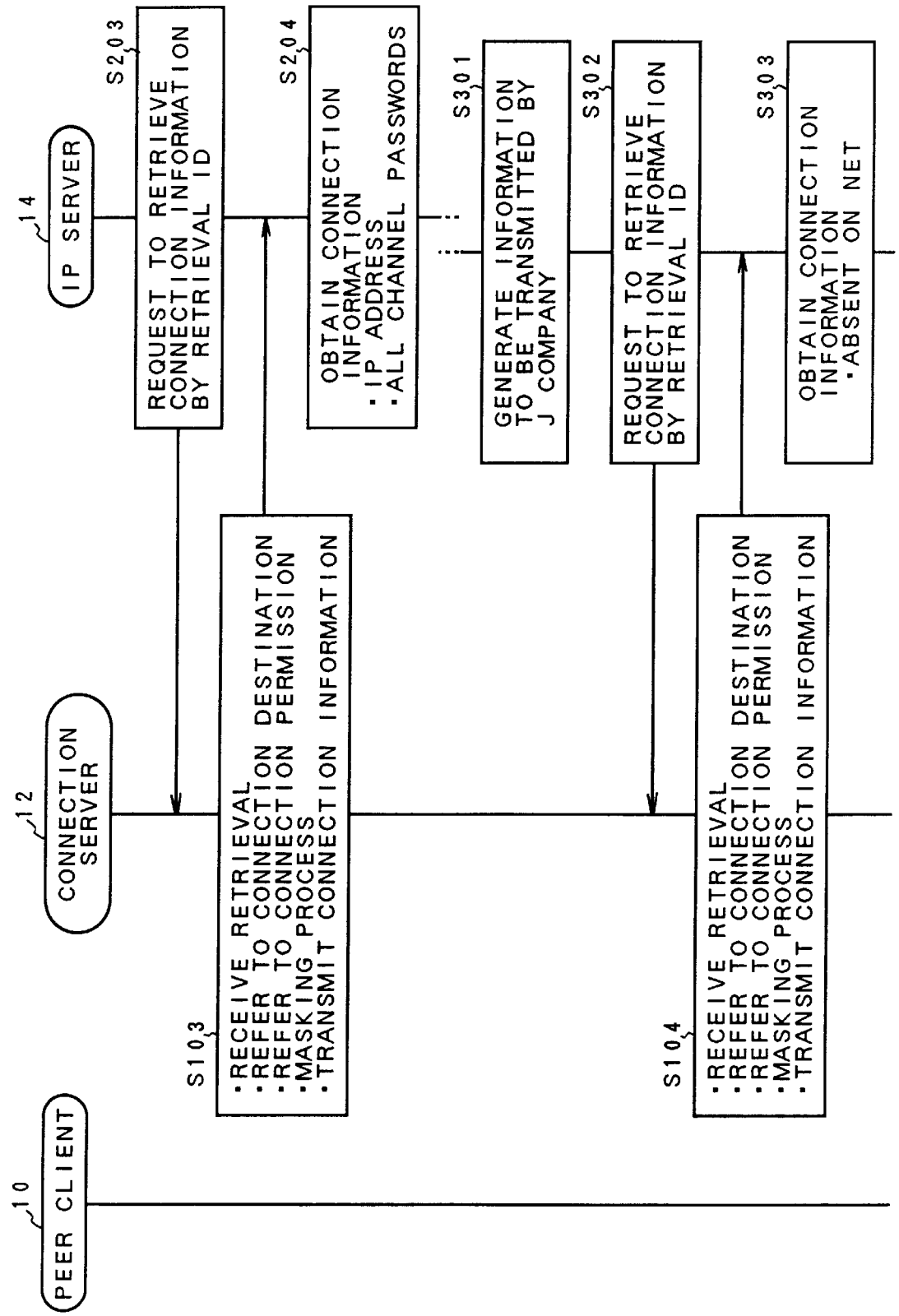

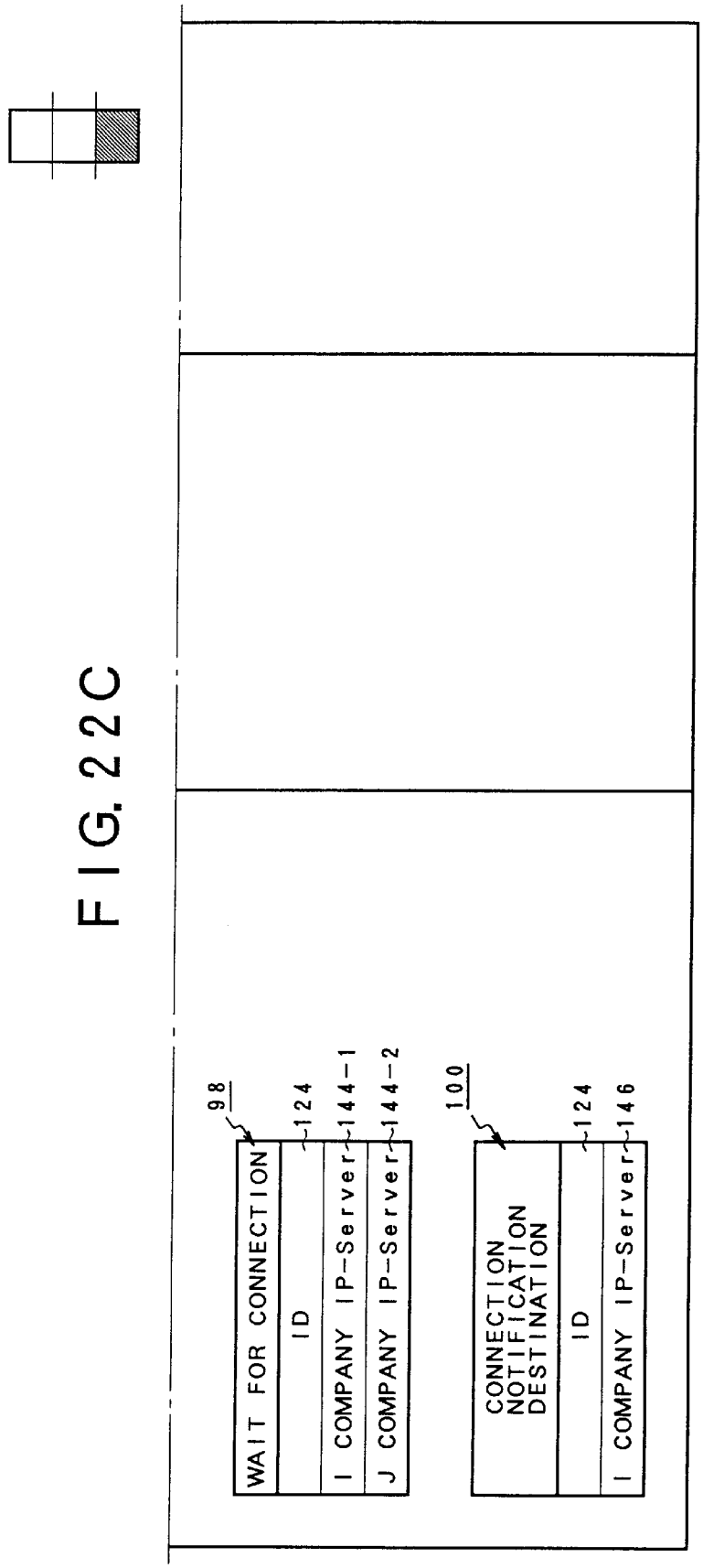

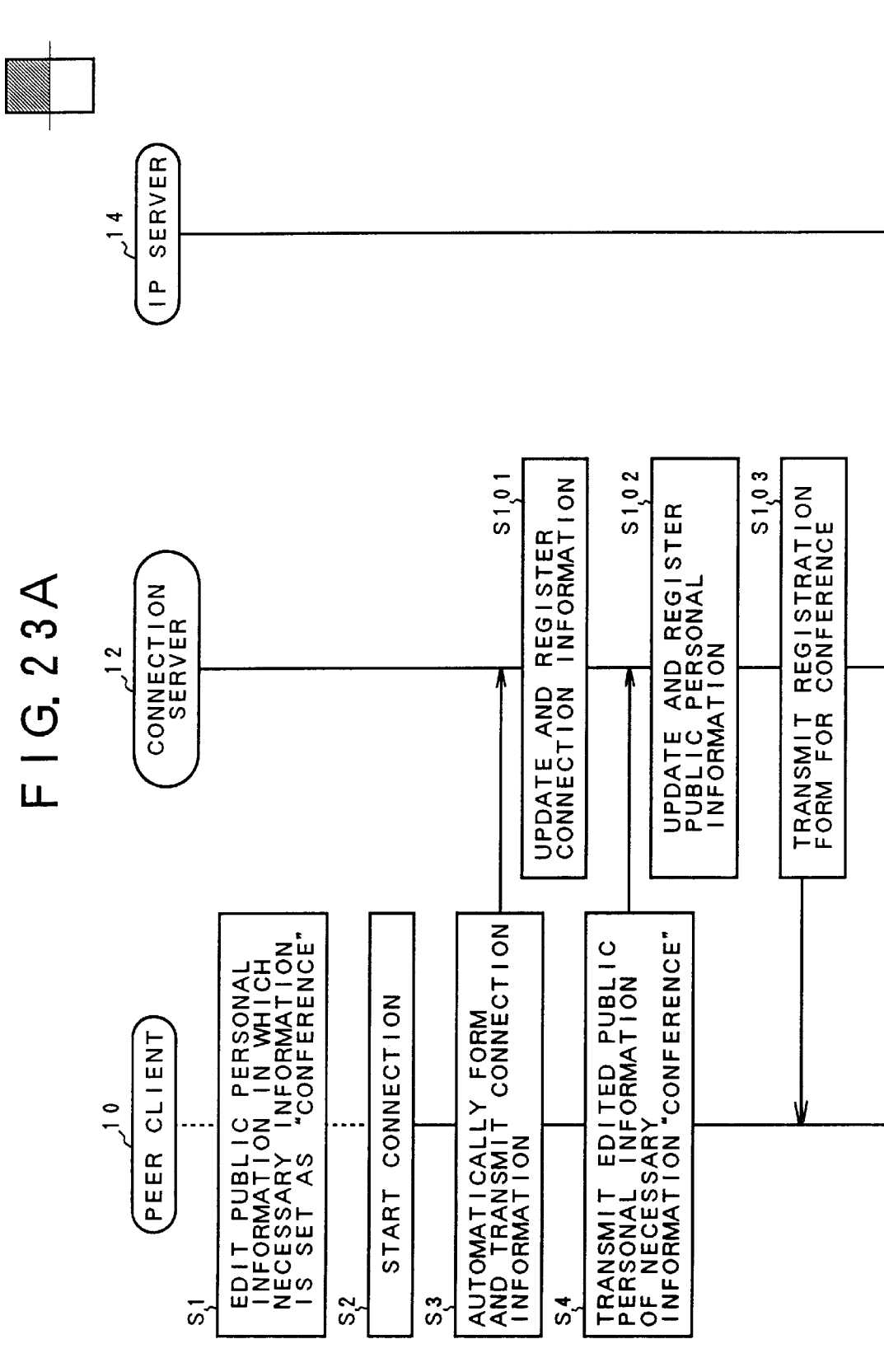

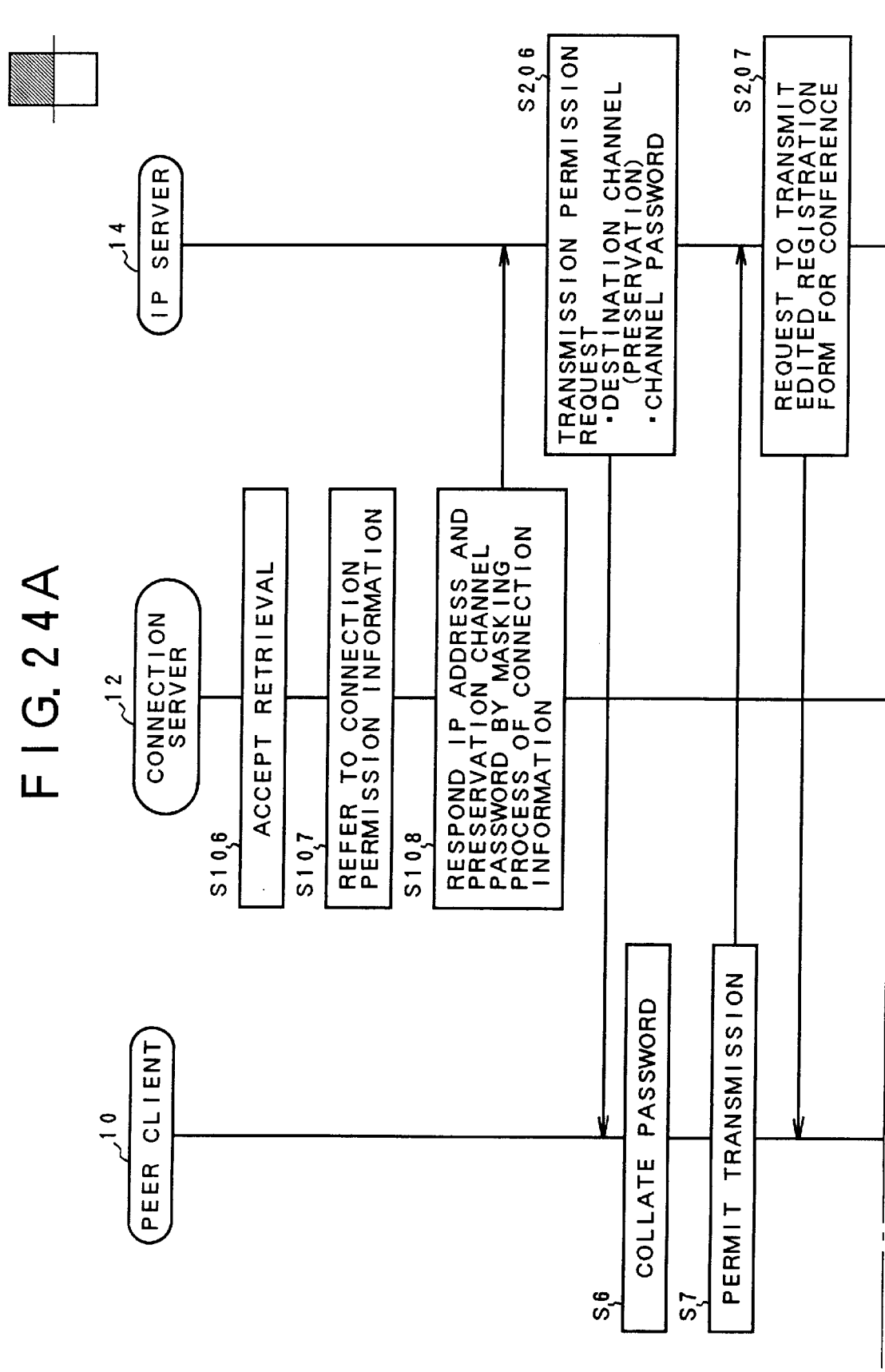

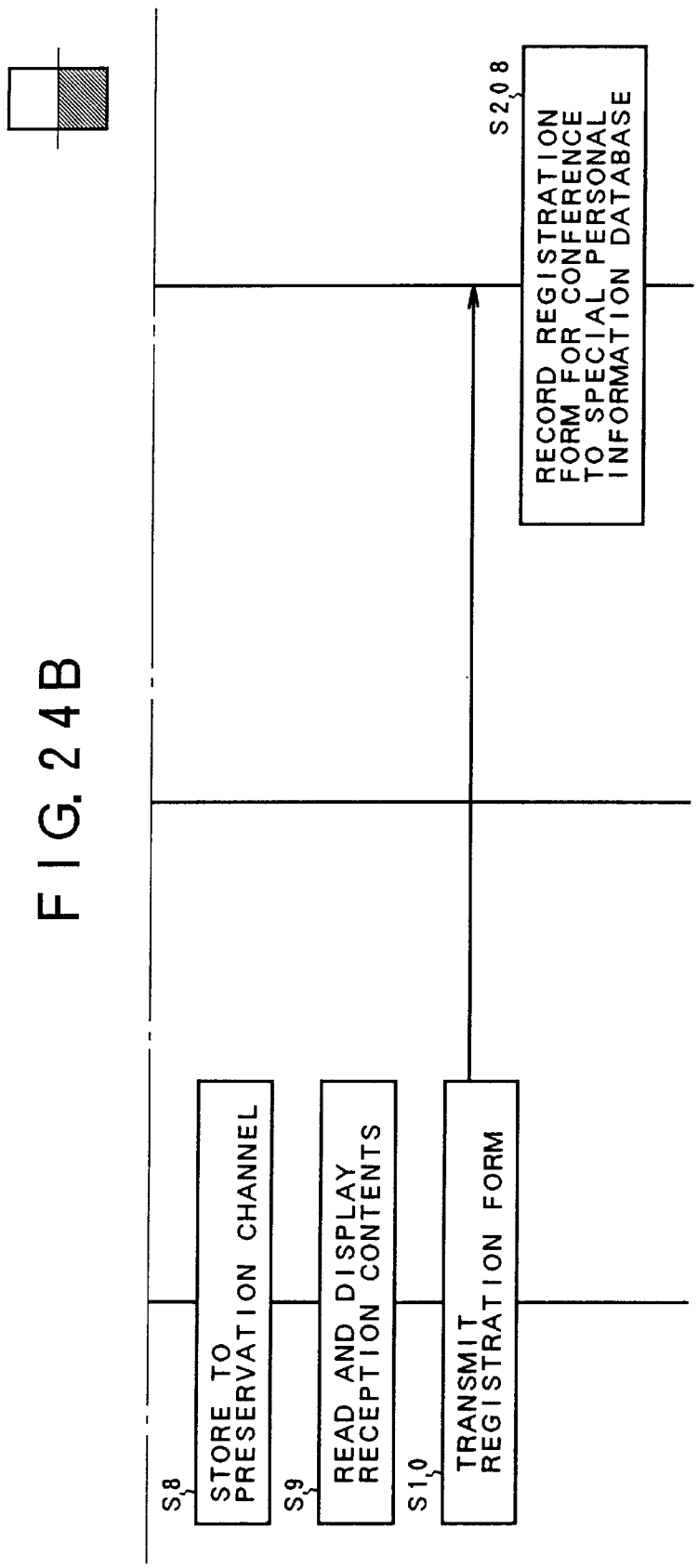

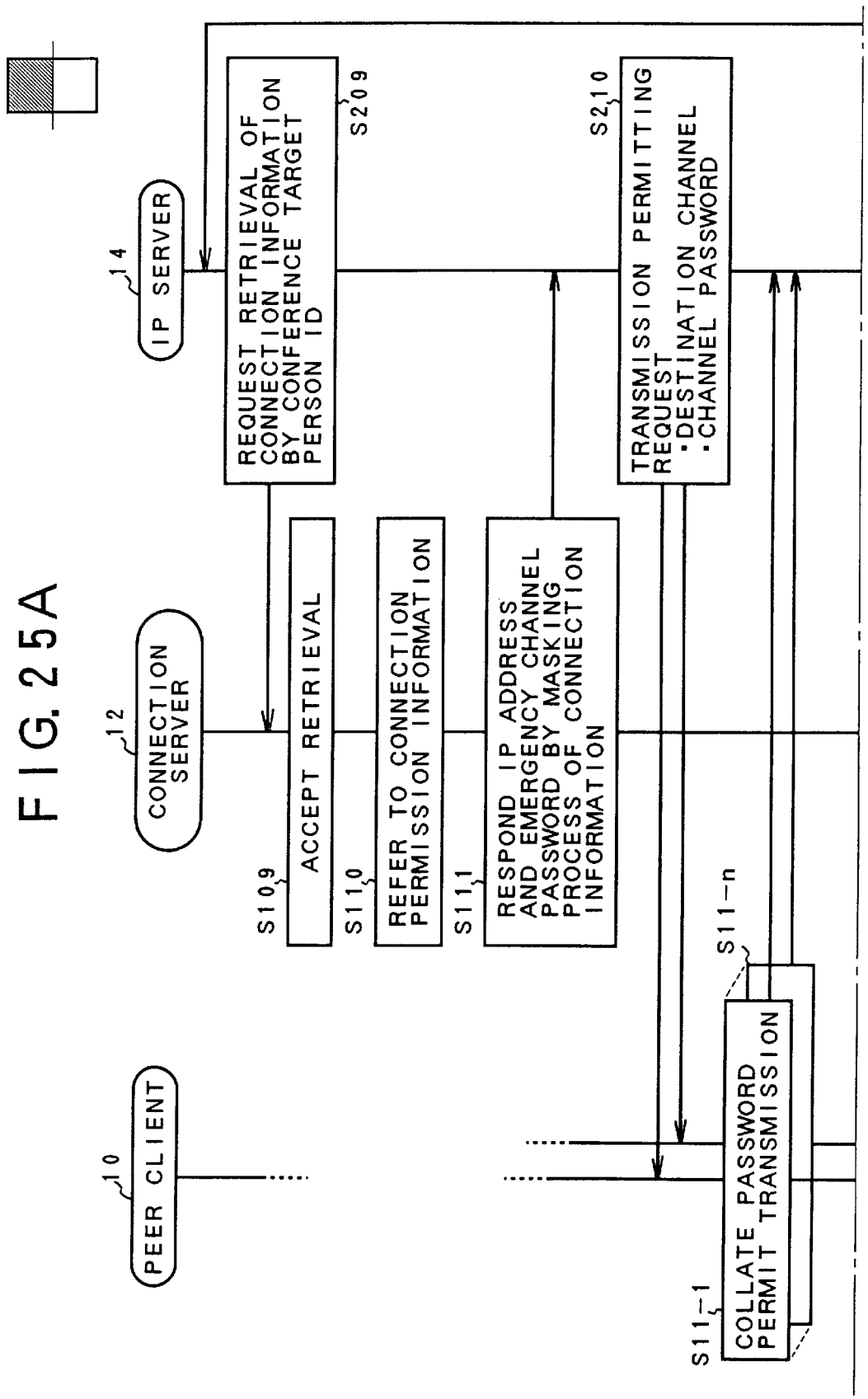

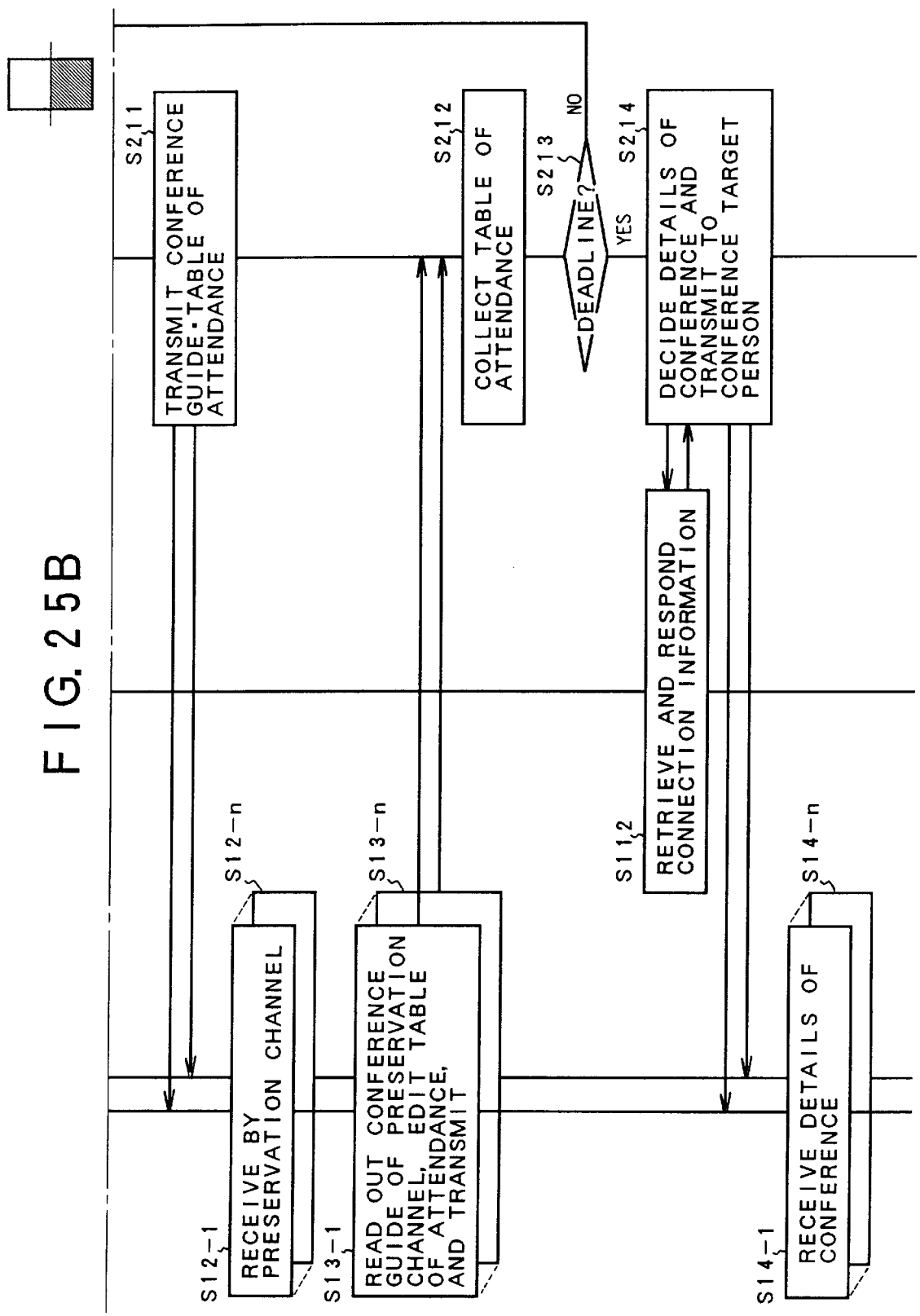

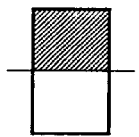

FIG. 27A

```
SPECIAL PERSONAL
INFORMATION
REGISTERING PROCESS
```

S1 — EDIT PUBLIC PERSONAL INFORMATION·PUBLIC PERSONAL INFORMATION PERMISSION INFORMATION

S2 — CONNECTION IS STARTED? NO (loop) / YES

S3 — AUTOMATICALLY FORM AND TRANSMIT CONNECTION INFORMATION

S4 — TRANSMIT AND REGISTER EDITED PUBLIC PERSONAL INFORMATION·PUBLIC PERSONAL INFORMATION PERMISSION INFORMATION

S5 — RECEIVE SPECIAL PERSONAL INFORMATION REGISTRATION FORM AND EDIT AS NECESSARY

S6 — TRANSMITTING REQUEST OF REGISTRATION FORM EXISTS IN PRESERVATION CHANNEL? NO (loop) / YES

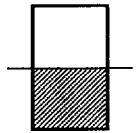
FIG. 27B
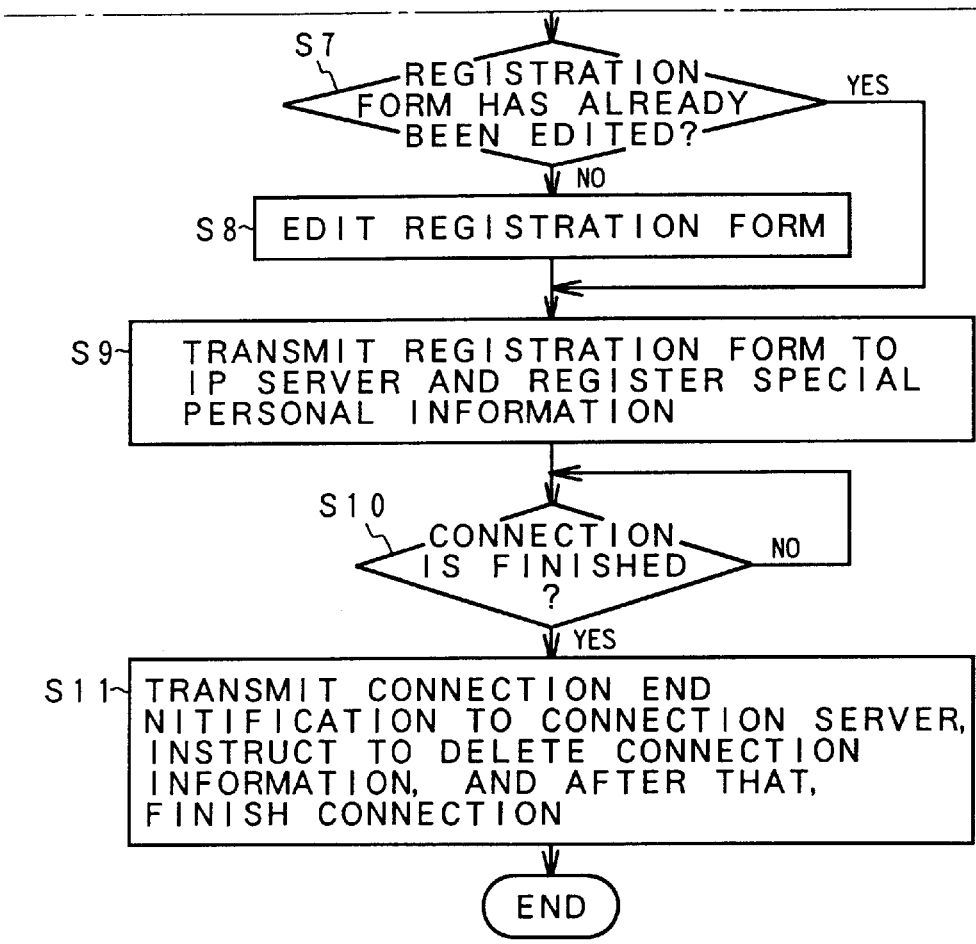

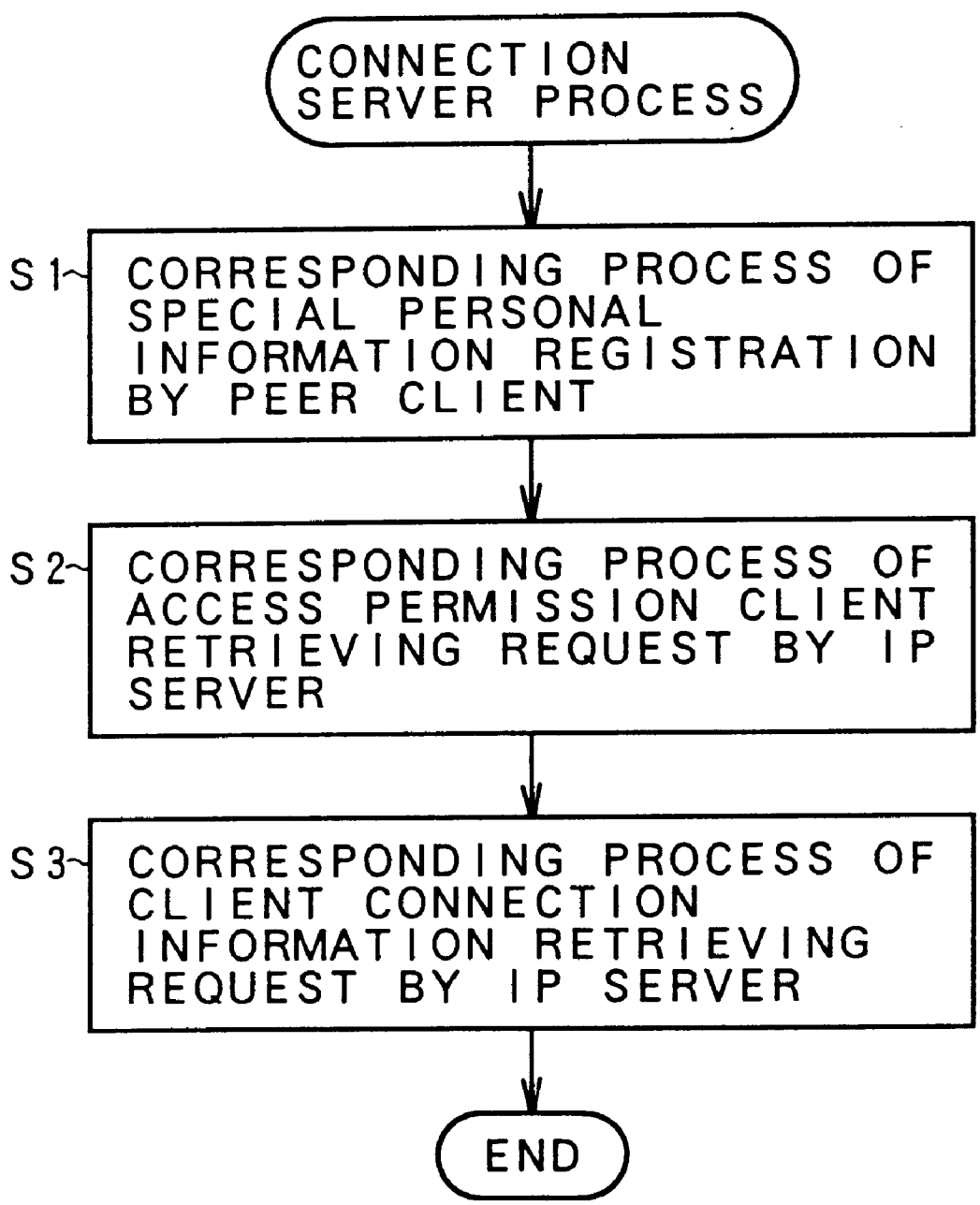

F I G. 3 1
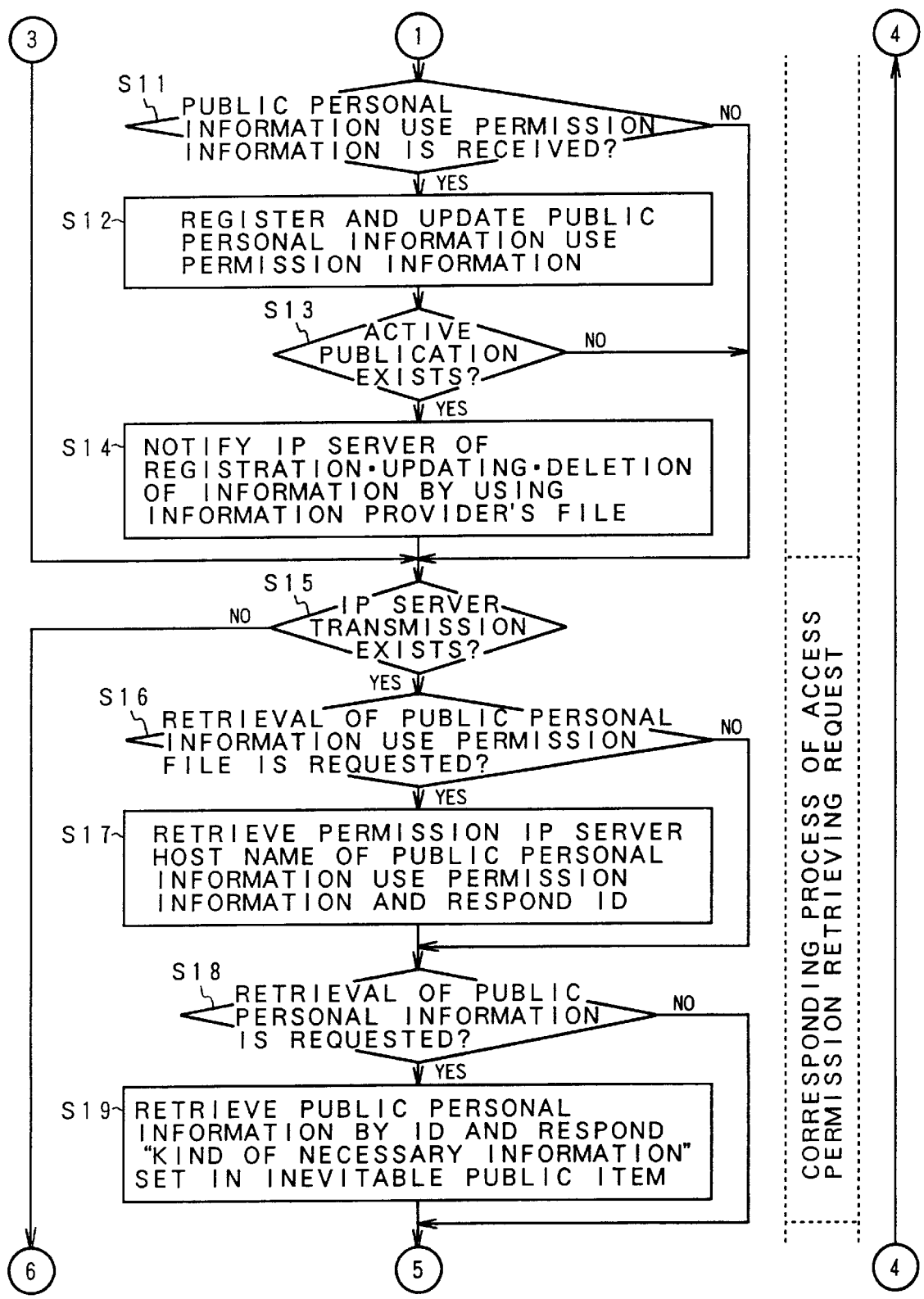

INFORMATION MANAGEMENT SYSTEM AND APPARATUS USING OPEN NETWORK ENVIRONMENT, AND STORAGE MEDIUM STORING CONTROL PROGRAM OF APPARATUS AND CAPABLE OF BEING READ BY COMPUTER

BACKGROUND OF THE INVENTION

The prevent invention relates to information management system and apparatus using an open network environment in which necessary information is provided from an information providing server to a client by using an open network environment such as internet or the like and relates to a storage medium in which a control program of the apparatus has been stored and which can be read by a computer. More particularly, the invention relates to information management system and apparatus in which a connection management server for managing connection information and public personal information necessary to provide information is provided between an information providing server and a client and the client is allowed to have domination regarding providing of information and relates to a storage medium in which a control program of the apparatus has been stored and which can be read by a computer.

Hitherto, as a system for providing necessary information from a server to a client by using an open network environment, systems such as WWW (World Wide Web) using the internet, electronic mail, groupware, and the like have been known. According to the WWW, when a client accesses a server in which necessary information exists, the server transmits the necessary information in response to a request of the client. According to the electronic mail or the groupware, a mail server or a groupware server manages information by receiving and accumulating the information into a spool and the client accesses the spool and takes out the information received and accumulated.

The freshness and secrecy of information will now be considered as follows with respect to such an information management system using the open network environment. In the WWW, all information from the server is provided on the basis of an accessing request from the client and necessary information is retrieved and obtained in a real-time manner. The freshness of the information depends on a frequency of the access to the server. In order to obtain the latest information, it is necessary to frequently access the server. Data is open in principle and is not suitable for transmission and reception of personal information which needs to be non-public. In the electronic mail or the groupware, since the client accesses the spool and extracts the information received and accumulated in the spool, the freshness of the information depends on the frequency of the access to the spool. Although the secrecy of data depends on reliability of the mail server or the groupware server, a provider who manages the server can see the data, so that the secrecy is not so high. On the other hand, as for an information providing service using the WWW, electronic mail, or the like, personal information of the user to receive the service which is provided is necessary. Generally, the service provider registers the personal information of the users into a database in a lump and manages them. The user, therefore, has to provide the user personal information every service and the user personal information which needs to be collected is different every service. There is not an example such that the user information is commonly used by the service providers. Even if the user information is commonly used by an existing technique, it is hard to collect and manage the user information under the present situation. Further, the user who desires to receive information is difficult to determine a specific service provider from the beginning and the user strongly desires to finally determine a provider of necessary information after he received information from a plurality of service providers. In such a case as well, if the user does not open all of the personal information that is required by a service provider from the beginning, he cannot receive the information provided. If the user opens his personal information to a number of service providers, however, since a possibility that the public information is abused is high, he cannot usually do it. Consequently, it is actually difficult for the user to decide a specific service provider while making contacting with a number of service providers. A service provider has to be decided from the beginning. Thus, an advantage of the open network such that necessary information can be widely collected cannot be sufficiently used.

SUMMARY OF THE INVENTION

According to the invention, there is provided an information management system of an open network environment in which the user side is allowed to take a leadership, necessary minimum personal information is opened to the public, an access from a service provider is permitted, and detailed user personal information is provided to the service provider who accessed by a judgment of the user, thereby enabling the information providing and a service work to be performed.

According to the invention, there is provided an information management system in which a user apparatus (peer client) for receiving information which is provided, an information providing apparatus (IP server) for providing information to the user apparatus, and a connection managing apparatus (connection server) for managing various information necessary for providing information from the information providing apparatus to the user apparatus are interconnected by an open network environment such as the internet or the like so that they can communicate with each other.

In such an information management system, when the connection to the open network is started, the user apparatus transmits necessary minimum access permission information which is necessary to provide information to the connection managing apparatus, allows the access permission information to be registered into a database, responds to a transmitting request of predetermined personal information defined as special personal information from the information providing apparatus based on the access permission information, allows the special personal information to be registered into the database, and receives providing information adapted to the special personal information from the information providing apparatus. The connection managing apparatus registers the access permission information transmitted at the time of the start of the connection of the user apparatus to the open network into the database and responds the relevant access permission information to a retrieval request from the information providing apparatus by referring to the database. The information providing apparatus obtains the predetermined personal information defined as special personal information by the transmitting request based on the access permission information obtained by the retrieval request to the connection managing apparatus and registers it into the database. When the providing information adapted to the special personal information is obtained, the information providing apparatus transmits it to the user apparatus. According to such an information management system, the user who desires to receive information provided can receive initial contacts from a plurality of information providing apparatuses merely by disclosing the minimum access permission information necessary for the contact from the information providing apparatus to the connection managing apparatus by the user apparatus.

The initial contact from the information providing apparatus is the transmitting request of personal information of the user which is necessary to provide necessary information or service to the user, that is, what is called the special personal information. The user selects an information providing destination which can be determined to be proper, sends the requested special personal information thereto, registers it into the database of the information providing apparatus, and can receive information or service provided. That is, in a conventional open network environment, the user apparatus serving as a client is branched under the information providing apparatus serving as an IP server and the client is positioned lower than the IP server. On the contrary, the information management system of the invention has a client leading form such that the user apparatus as a client selects a number of information providing apparatuses serving as IP servers and provides more detailed personal information of the user. The position of the client of the invention is raised to a level equivalent to the IP server and the client peers with the server, so that the client is called a peer client. The user who wishes to receive information or service provided can finally determine a necessary information provider through inquiries from a plurality of service providers without opening the personal information such as name, address, and the like which is not directly necessary for a communication control to the public. It is unnecessary to open the personal information to a number of service providers, so that the user can receive necessary information or service provided without anxiety. By registering the special personal information into the database of the information providing apparatus, when necessary information is generated, a transmitting process to the user apparatus is immediately executed, so that a freshness of the information is extremely high. Since the position of the user apparatus on the network is always recognized by the connection managing apparatus. When the information providing apparatus desires to access, by inquiring to the connection managing apparatus, the information providing apparatus can always obtain information necessary to access latest user apparatuses.

A user processing unit in the user apparatus has a connection information processing unit, a public personal information processing unit, a special personal information processing unit, and a reception display unit. The connection information processing unit transmits connection information including a self ID code, a network address, and a password of an information reception channel to the connection managing apparatus at the time of the start of connection to the open network, allows the connection information to be registered into the database of the connection managing apparatus, transmits a connection end notification at the time of the end of connection, and allows the connection information to be deleted from the database. The connection managing apparatus, therefore, can always recognize the position on the network and the presence or absence of the user apparatus. The public personal information processing unit edits public personal information in which each of the self ID code, the kind of providing information, and the reception channel from which the reception of the information is permitted has been designated, transfers the edited public personal information as a part of the access permission information to the connection managing apparatus at the time of connection to the open network, and allows it to be registered into the database. The special personal information processing unit edits a registration format of the special personal information according to the kind of providing information sent from the connection managing apparatus in association with the transmission of the public personal information, transmits the edited registration format in response to a transmitting request of the registration format from the information providing apparatus, and allows it to be registered into the database of the information providing apparatus. The reception display unit receives and displays the information provided from the information providing apparatus after the registration of the special personal information.

A connection managing unit in the connection managing apparatus has a connection information managing unit, a public personal information managing unit, a registration format providing unit, a user retrieval responding unit, and a connection information retrieval responding unit. The connection information managing unit registers the connection information that is transmitted from the user apparatus at the time of the start of the connection to the open network into the database and deletes the relevant connection information from the database when the connection end notification is received. The public personal information managing unit updates and registers the public personal information transmitted from the user apparatus into the database. The registration format providing unit transmits a registration format of the special personal information which has been predetermined according to the kind of providing information designated by the public personal information to the user apparatus. When a retrieval request of the user who desires to provide information from the information providing apparatus is received, the user retrieval responding unit responds the ID code of the user apparatus designating the access permission and the kind of providing information by referring to the database. When a retrieval request of the connection information designating the ID code of a specific user apparatus is received from the information providing apparatus, the connection information retrieval responding unit refers to the database, reads out the relevant connection information, recognizes personal information in which the opening is permitted and personal information in which the opening is refused by referring to the public personal information in the database, and responds the connection information by performing a masking process to the personal information in which the opening is refused.

An information providing processing unit in the information providing apparatus is constructed by a user retrieval requesting unit, a connection information retrieval requesting unit, a special personal information managing unit, and a providing information managing unit. The user retrieval requesting unit requests the connection managing apparatus to retrieve the ID code of the user designating the access permission and the kind of providing information. The connection information retrieval requesting unit requests the connection managing apparatus to retrieve the connection information of the user apparatus by using the specific ID code obtained by the user retrieval requesting unit. The special personal information managing unit requests the user apparatus to transmit the special personal information on the basis of the connection information obtained by the connection information retrieval requesting unit and registers it into the database. When the providing information adapted to the special personal information in the database is obtained, the providing information managing unit transmits the providing information to the user apparatus on the basis of the connection information acquired by the operation of the connection information retrieval requesting unit.

The connection information transmitted from the user apparatus to the connection managing apparatus at the time of the connection start includes passwords of a plurality of kinds of information reception channels. Designation of the permission or inhibition of each information reception channel is controlled by connection permission information which was separately edited. When the connection information is transmitted to the information providing apparatus, the connection managing apparatus refers to the connection permission information and executes the masking process to the connection information. The user apparatus has an emergency channel for displaying the reception information onto a display in a real-time manner, a regular confirmation channel for storing the reception information and reading and displaying it onto the display at every predetermined time interval, and a preservation channel for storing the reception information and displaying it onto the display in accordance with the reading operation of the user. Passwords of the emergency channel, regular confirmation channel, and preservation channel are set by the connection information and the connection permission information and a use permission of the information providing apparatus is designated. The public personal information which is edited and transmitted by the user apparatus includes inevitable public items for designating necessary information and unnecessary information and selective public items such as name, address, telephone number, FAX number, mail address, and the like. Whether the selective public items are opened or not is designated by public personal information use permission information which was separately edited. The selective public items of the public personal information includes an active publication item for actively notifying of the access permission from the connection managing apparatus without waiting for the retrieval of the access permission from the information providing apparatus. The active publication item is selectively designated by the public personal information use permission information. When the retrieval request of the connection information using the ID code of the specific user apparatus is received from the information providing apparatus and the connection information of the relevant user apparatus does not exist in the database, the connection managing apparatus performs the masking process to all of the items of the connection information and responds, thereby notifying of the absence of the user apparatus on the network. When the notification of the absence on the network is received in response to the retrieval request of the connection information for the connection managing apparatus, the information providing apparatus registers the self host name and the ID code of the user apparatus as connection waiting information into connection waiting information of the connection managing apparatus. The connection managing apparatus refers to the connection waiting information when the connection information is registered in the database in association with the start of the connection of an arbitrary user apparatus to the open network, recognizes the information providing apparatus waiting for the connection, retrieves the requested connection information, and responds. The user apparatus forms connection notification destination information for designating the host name of the information providing apparatus which responds to the connection information from the connection managing apparatus, transmits it at the time of the registration of the connection information to the connection managing apparatus in association with the connection to the open network, and registers it into the database. When the retrieval request of the connection information in which the ID code of the specific user apparatus is designated is received from the information providing apparatus, the connection managing apparatus refers to the connection notification destination information in the database and responds valid connection information to the information providing apparatus designated as a connection notification destination. With respect to the information providing apparatus in which a connection notification destination is not designated in the connection notification destination information in the database, invalid connection information in which the masking process was performed to all of the items is responded, thereby notifying of the absence on the network. Even if the password of the reception channel has been opened in the registration of the connection information before that, the information provided from a specific information providing apparatus can be consequently refused after that. As a specific example of the information management system, the user apparatus registers the providing of trading information such as real estate exchange, stock exchange, and the like as predetermined personal information into the database of the information providing apparatus. When the adapted trading information is obtained by the information providing apparatus, it is transmitted to the user apparatus. The user apparatus registers conference convention information necessary for scheduling a conference as predetermined personal information into the database of the information providing apparatus. The information providing apparatus transmits conference guide information to the user apparatuses of convention target persons designated on the basis of the conference convention information and collects attendance information. After collecting the attendance information, the details of the conference are determined and distributed to the user apparatuses of the convention target persons.

According to the invention, there are provided a user apparatus (peer client), an information providing apparatus (IP server), and a connection managing apparatus (connection server) which are connected by the open network environment such as the internet or the like for constructing an information management system so that they can communicate with each other.

Further, according to the invention, there is also provided a recording medium in which a control program of a user apparatus (peer client), an information providing apparatus (IP server), and a connection managing apparatus (connection server) which are connected by an open network environment such as the internet or the like for constructing an information management system so that they can communicate with each other has been stored and the control programs can be executed by a computer. As a format of providing the recording medium in which the control programs of the user apparatus (peer client), the information providing apparatus (IP server), and the connection managing apparatus (connection server) have been stored and can be executed by the computer, there is a format in which the control programs have been stored in a main storage of each apparatus, a format in which the control programs are provided by a portable medium such as CD-ROM, floppy disk, or the like, or a format in which the control programs are provided via a communication line.

The above and other objects, features, and advantages of the present invention will become more apparent from the following detailed description with reference to the drawings.

BRIEF DESCRIPTION OF THE DRAWINGS

FIG. 5 is an explanatory diagram of connection permission information;

FIG. 9 is an explanatory diagram of public personal information use permission information;

FIG. 10 is an explanatory diagram of a registration form;

FIG. 11 is an explanatory diagram of a file of information providers;

FIGS. 12A and 12B are schematic explanatory diagrams of the system operation of providing services of real estate information;

FIGS. 13A and 13B are operation explanatory diagrams of an edition and a registration of public personal information and special personal information;

FIGS. 14A and 14B are schematic operation explanatory diagrams of a retrieval of user connection information and a transmission of use information;

FIGS. 15A and 15B are operation explanatory diagrams from the start of a connection from a user apparatus to a registration of special information;

FIGS. 16A and 16B follow FIGS. 15A and 15B and are operation explanatory diagrams from the start of a connection from a user apparatus to a registration of special information;

FIGS. 17A to 17E are explanatory diagrams of a database of a connection managing apparatus in association with processes in FIGS. 15A, 15B, 16A, and 16B;

FIGS. 19A to 19D are explanatory diagrams of the database of the connection managing apparatus in association with processes in FIGS. 18A and 18B;

FIGS. 20A and 20B are operation explanatory diagrams when a permission and a refusal of the information providing are controlled;

FIG. 21 follows FIGS. 20A and 20B and is an explanatory diagram of the operation when the permission and the refusal of the information providing are controlled;

FIGS. 22A, 22B, and 22C are explanatory diagrams of the updating and registration of the database of the connection managing apparatus in association with the processes of FIG. 21 and obtaining information of an IP server;

FIGS. 23A and 23B are explanatory diagrams of the operation of the system which receives a service providing of a conference schedule;

FIGS. 24A and 24B follow FIGS. 23A and 23B and are explanatory diagrams of the operation of the system which receives the service providing of the conference schedule;

FIGS. 25A and 25B follow FIGS. 24A and 24B and are explanatory diagrams of the operation of the system which receives the service providing of the conference schedule;

FIGS. 27A and 27B are flowcharts for a special personal information registering process of a peer client;

FIG. 29 is a schematic flowchart for a connection server;

FIG. 31 is a flowchart for a corresponding process of an access permission retrieval request and a connection information retrieval request of the connection server;

DETAILED DESCRIPTION OF THE PREFERRED EMBODIMENT

System Construction and Management Information

Figure 1A:
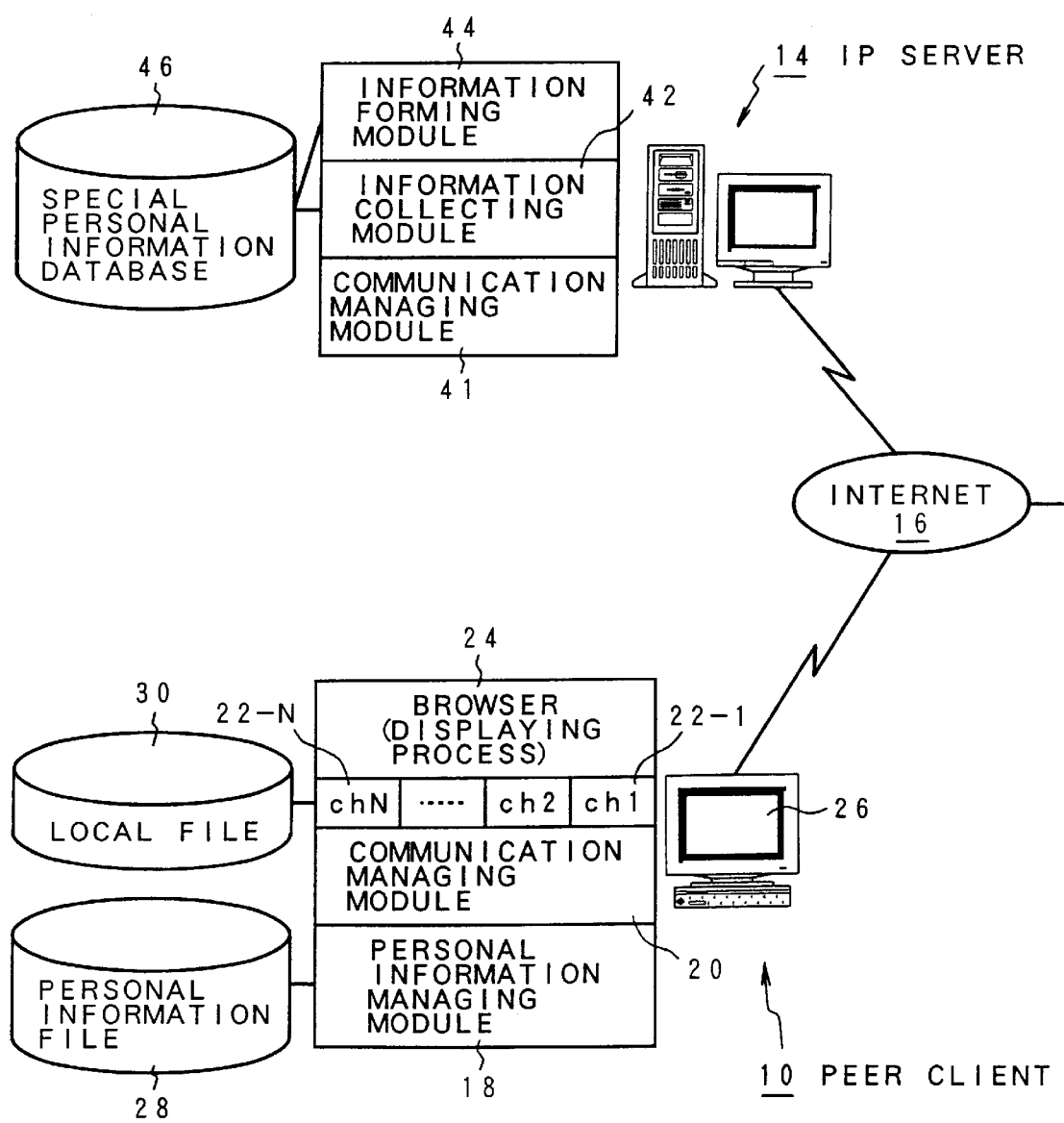
FIGS. 1A and 1B are block diagrams of a system construction of the invention.
Figure 1B:
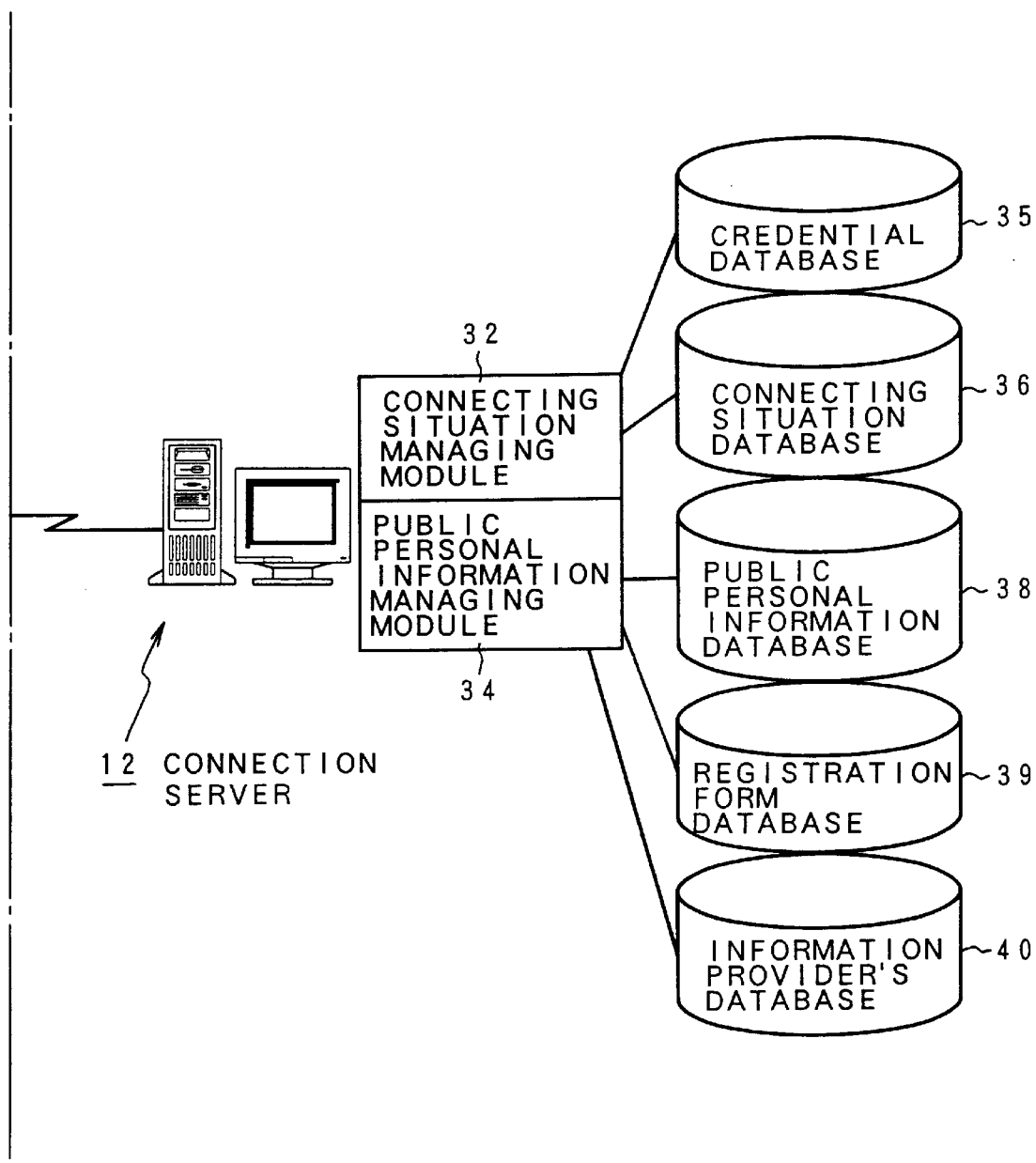

FIGS. 1A and 1B are constructional diagrams of an information management system using an open network environment of the invention. In the information managing system of the invention, a peer client 10 which functions as a user apparatus, a connection server 12 which functions as a connection managing apparatus, and an IP server 14 which functions as an information providing apparatus are interconnected through, for example, an internet 16 as an open network so that they can communicate with each other. The peer client 10 has a personal information managing module 18, a communication managing module 20 having a plurality of reception channels 22-1 to 22-N, a browser 24 for performing a displaying process, a personal information file 28, and a local file 30. The connection server 12 has a connecting situation managing module 32, a public personal information managing module 34, a connecting situation database 36, and a public personal information database 38. The IP server 14 has a communication managing module 41, an information collecting module 42, an information forming module 44, and a special personal information database 46. Fundamental processes of the information management system of the invention as mentioned above are as follows. When the connection of the peer client 10 to the internet 16 is started, necessary minimum access permission information which is necessary for information providing from the IP server, namely, the connection information and the public personal information are transmitted to the connection server 12, the connection information is registered into the connecting situation database 36, and the public personal information is registered into the public personal information database 38. A retrieval request of the user who desires the information providing is issued from the IP server 14 to the connection server 12. In response to the retrieval request, the connection server 12 retrieves the public personal information database 38 and responds the necessary minimum public information, for example, the ID code of the peer client 10 which generates the access permission. The IP server 14 which received the ID code of the peer client 10 which generated the access permission from the connection server 12 subsequently requests the connection server 12 to retrieve the connection information on the peer client 10 side using the ID code. In response to the retrieval request, the connection server 12 retrieves the connecting situation database 36. When the connection information of the relevant peer client 10 is obtained, the connection server 12 recognizes the permitted reception channel and responds the IP address necessary to communicate with the peer client 10, the reception channel, and its password to the IP server 14. The IP server 14 which received the retrieval response of the connection information from the connection server 12 requires the peer client 10 to permit a transmission permission. When the transmission permission is obtained, the IP server 14 requests a transmission of the special personal information that is necessary to provide the information. In response to transmitting requests of the special personal information from a number of IP servers 14, the user of the peer client 10 judges the information provider whom he thinks to be proper. The user transmits the special personal information in which the items which were determined every necessary providing service have been written to the information provider of the specific IP server 14 and registers the special personal information into the special personal information database 46 of the IP server 14. By registering the special personal information from the peer client 10 to the IP server 14, the preparation of the information providing which the user of the peer client 10 desires is completed. Each time the information which is provided by the IP server 14 itself is formed, the IP server 14 retrieves the special personal information database 46 and discriminates the relevant user. When information to be sent to the user is generated, the IP server 14 accesses the connection server 12, requests to retrieve the connection information of the peer client 10 to be transmitted, and transmits the generated information to the permitted reception channel of the peer client 10 by using the connection information obtained in response to the retrieval request.

Figure 2A:
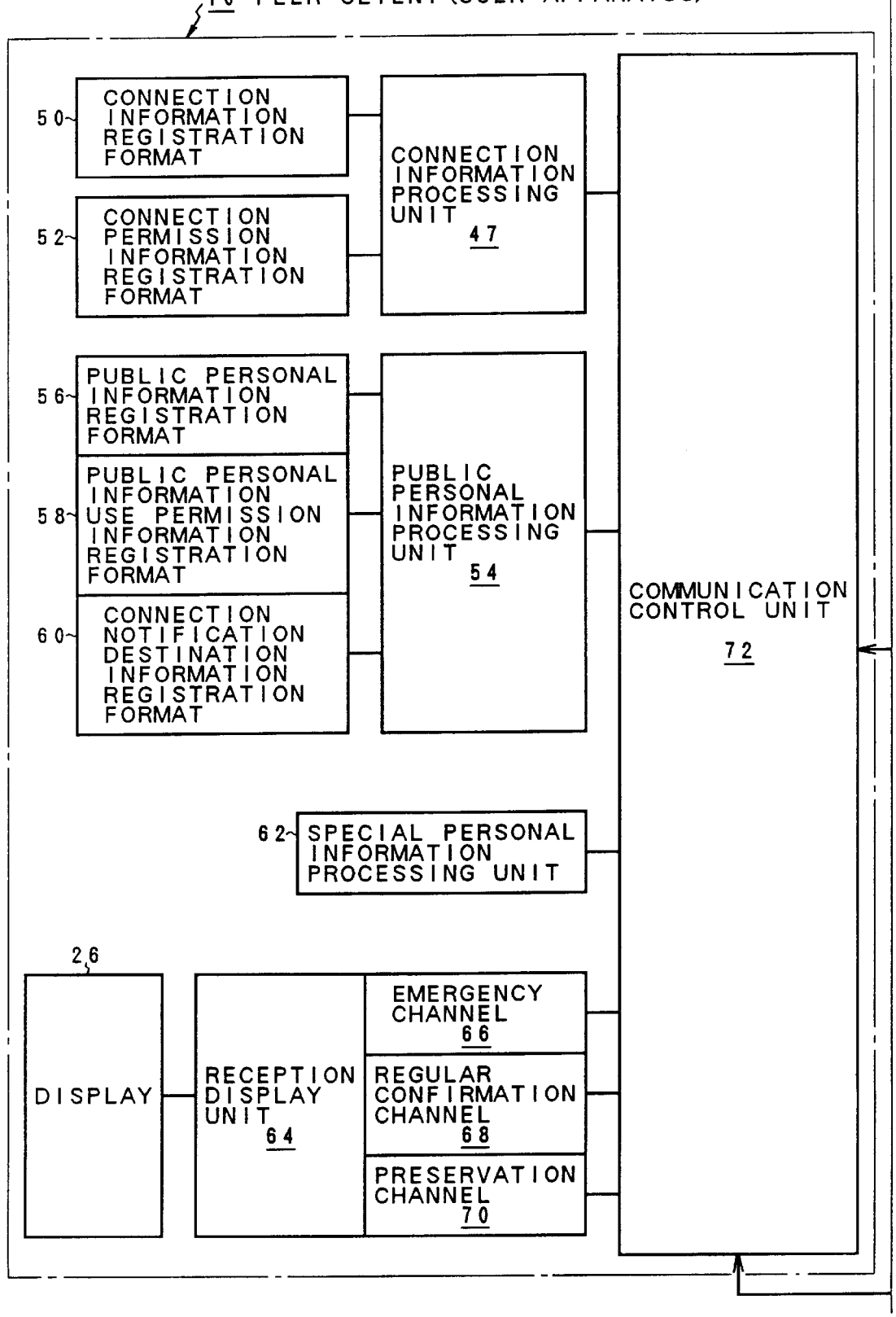
FIGS. 2A, 2B, and 2C are functional block diagrams of a system constructional apparatus of the invention.
Figure 2B:
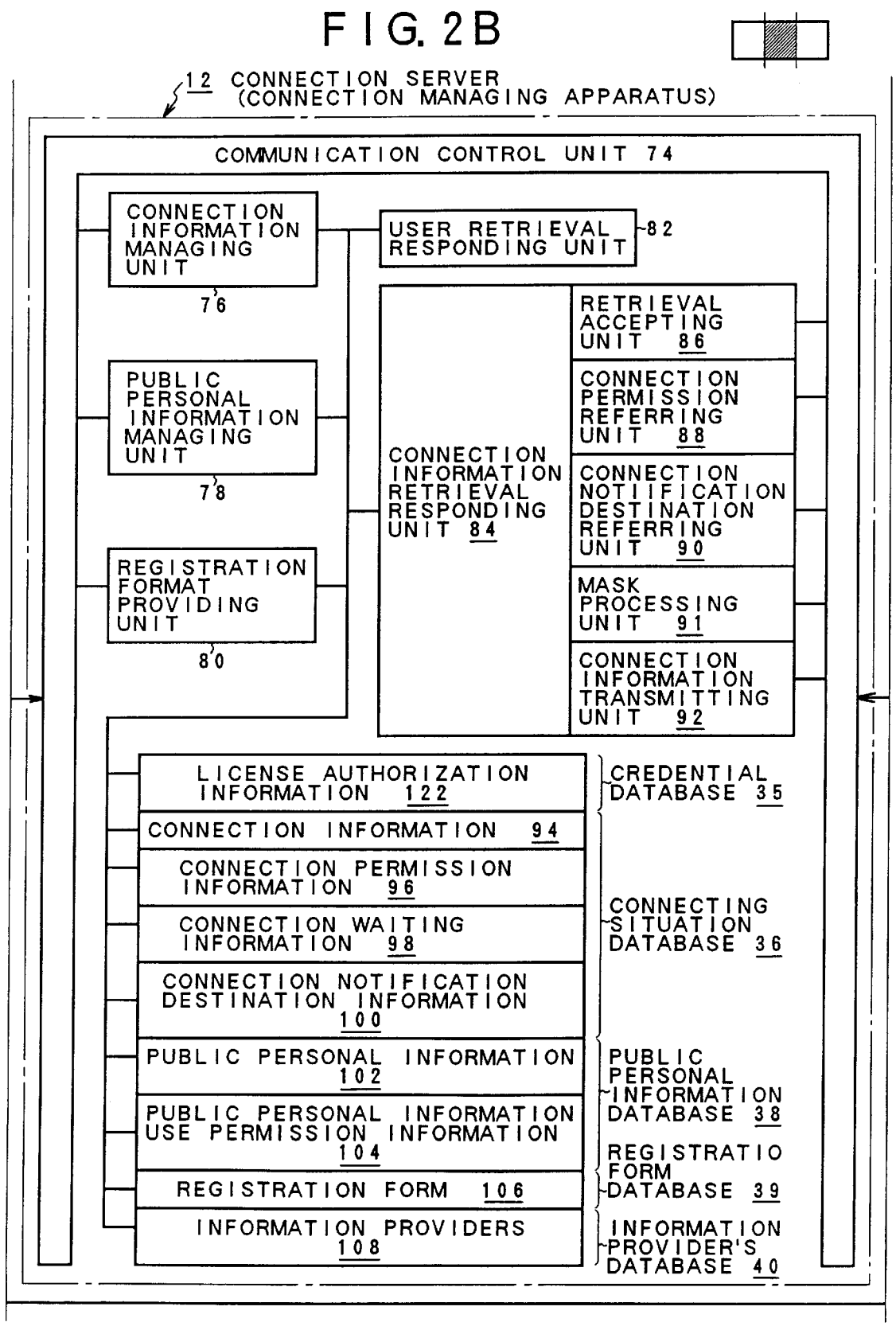
Figure 2C:
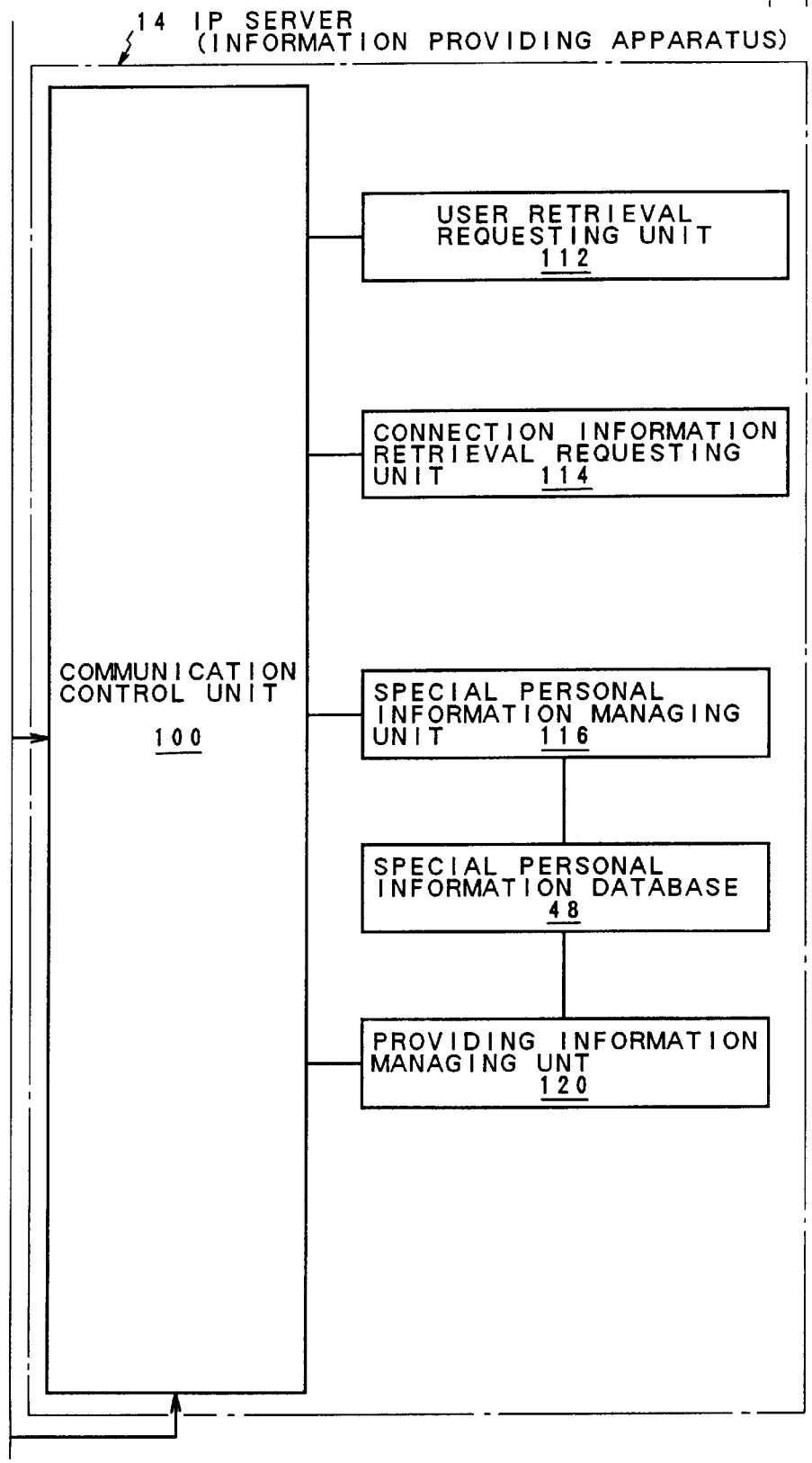

FIGS. 2A, 2B, and 2C are functional block diagrams of the peer client 10, connection server 12, and IP server 14 provided for the information management system in FIGS. 1A and 1B. First, a connection information processing unit 47 is provided for the peer client 10 which functions as a user apparatus. A connection information registration format 50 and a connection permission information registration format 52 are prepared for the connection information processing unit 47. The connection information processing unit 47 automatically forms connection information by using the connection information registration format 50 and transmits it to the connection server 12 when the connection to the internet is started. The connection permission information registration format 52 designates a permission and a refusal of the opening of the reception channel in the connection server 12 and is formed by an edition of the user. A public personal information processing unit 54 is provided for the peer client 10. A public personal information registration format 56, a public personal information use permission information registration format 58, and a connection notification destination information format 60 are provided for the public personal information processing unit 54. Those formats are formed by an edition of the user, respectively. When the connection to the internet of the peer client 10 is started, subsequent to the automatic formation and the transmission of the connection information by the connection information processing unit 47, each of the edited information is transmitted to the connection server 12 by the public personal information processing unit 54. A special personal information processing unit 62 transmits and registers the public personal information indicative of the necessary information to the connection server 12 side. After that, the processing unit 62 executes an editing process to write predetermined items for receiving the necessary information providing into the special personal information registration format which is sent from the connection server 12. After that, the edited special personal information is transmitted in response to a transmitting request of the special personal information from the IP server 14. A reception display unit 64 receives and displays the providing information from the IP server 14. In the embodiment, the reception display unit 64 has an emergency channel 66, a regular confirmation channel 68, and a preservation channel 70. The emergency channel 66 is a reception channel having a highest priority for immediately displaying the information from the IP server 14 onto a display 26 when such information is received. When the information from the IP server 14 is received, the regular confirmation channel 68 once stores it into the file. When a predetermined set time comes, the presence of the information reception is interrupted and displayed on the display 26. The received information is displayed on the display 26 by the reading operation of the user for the regular confirmation channel 68. Therefore, the regular confirmation channel 68 is a channel having a next high priority subsequent to the emergency channel 66. Further, the preservation channel 70 merely stores the received information from the IP server 14 into the file and is a reception channel having a lowest priority for displaying the received information onto the display 26 only when the reading operation of the preservation channel 70 is performed by the user. A communication between the peer client 10 and the connection server 12 or IP server 14 is performed via a communication control unit 72. The communication control unit 72 executes a communication control according to a proper communication protocol adapted to the internet used. Similar communication control units are provided as communication control units 74 and 110 for the connection server 12 and IP server 14, respectively.

The connection server 12 which functions as a connection managing apparatus will now be described. The connection server 12 has a connection information managing unit 76, a public personal information managing unit 78, a registration format providing unit 80, a user retrieval responding unit 82, and a connection information retrieval responding unit 84. The connection information retrieval responding unit 84 includes functions of a retrieval accepting unit 86, a connection permission referring unit 88, a connection notification destination referring unit 90, a mask processing unit 91, and a connection information transmitting unit 92. Further, the connection server 12 has a credential database 35, the connecting situation database 36, and the public personal information database 38. Connection information 94, connection permission information 96, connection waiting information 98, and connection notification destination information 100 have been stored in the connecting situation database 36 on a peer client unit basis. Public personal information 102, public personal information use permission information 104, a registration form 106, and information providers 108 have been stored in the public personal information database 38 similarly on a peer client unit basis. The IP server 14 which functions as an information providing apparatus has a user retrieval requesting unit 112, a connection information retrieval requesting unit 114, a special personal information managing unit 116, the special personal information database 48, and a providing information managing unit 120.

Figure 3:
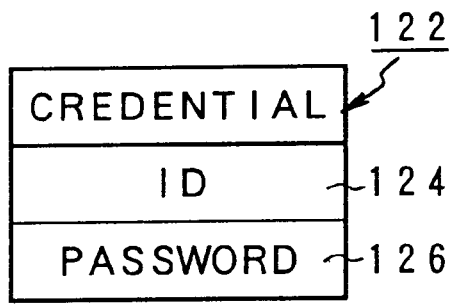
FIG. 3 is an explanatory diagram of license authorization information.

Each information which is registered in the connecting situation database 36 and public personal information database 38 of the connection server 12 in FIGS. 2A to 2C and is managed will now be described. FIG. 3 shows license authorization information 122 stored in the credential database 35 and is generally called "credential" and has an ID code 124 allocated to the peer client 10 by the information management system of the invention and a password 126 of a predetermined digit number determined by the user of the peer client 10.

Figure 4:
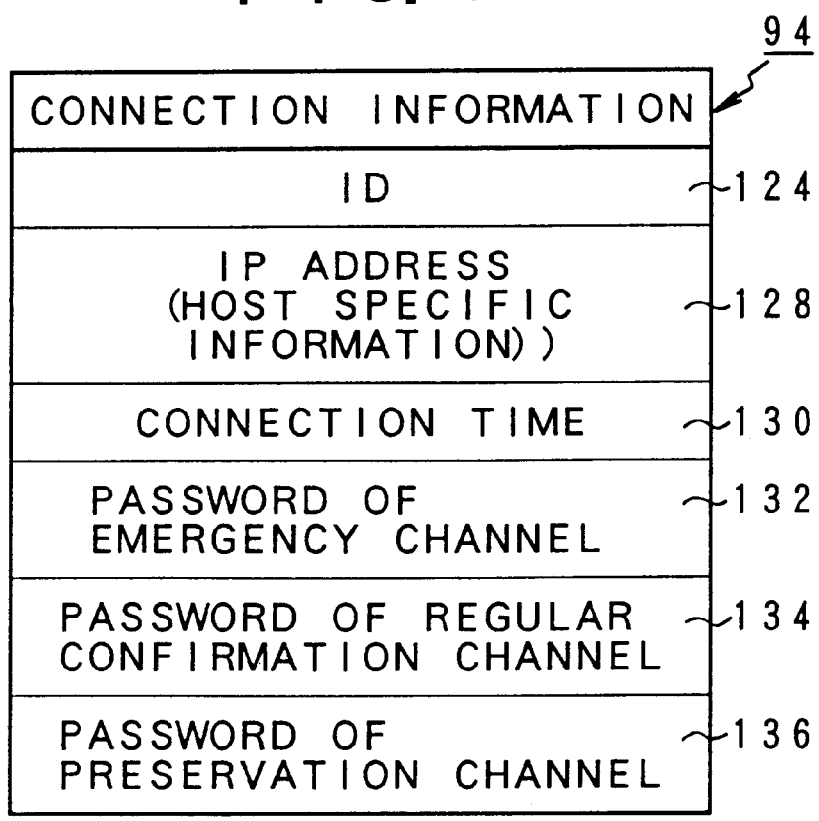
FIG. 4 is an explanatory diagram of connection information.

FIG. 4 shows the connection information 94 of the peer client 10 which is stored into the connecting situation database 36. The connection information 94 has the ID code 124, an IP address 128, a connection time 130, and passwords 132, 134, and 136 of the emergency channel, regular confirmation channel, and preservation channel. Each of the passwords 132, 134, and 136 is automatically formed by the peer client 10 on the basis of a random number process and becomes a different password every time the peer client 10 is connected to the internet 16. In the connection information 94, with respect to the ID code 124, IP address 128, and connection time 130, they are transmitted as they are in response to a retrieval request from the IP server 14. However, as for the passwords 132, 134, and 136 of the emergency channel, regular confirmation channel, and preservation channel, an opening and a non-opening are controlled in accordance with the designation of the connection permission information in FIG. 5.

FIG. 5 shows the connection permission information 96 which is stored into the connecting situation database 36 of the connection server 12. The connection permission information 96 has three information comprising emergency channel connection permission information 138, regular confirmation channel connection permission information 140, and preservation channel connection permission information 142. Further, the ID code 124 has been stored in the connection permission information 96. A permission IP server host name and a refusal IP server host name can be registered into each of the connection permission information 138, 140, and 142 of the emergency channel, regular confirmation channel, and preservation channel, respectively. As a default value, in the emergency channel connection permission information 138, all of the refusal IP server host names are refused by setting "All". With respect to the regular confirmation channel connection permission information 140 and preservation channel connection permission information 142, the permission IP server host names are set to be default and are permitted to all of the IP servers by setting "All". As for the default value in the connection permission information 96, before the peer client 10 is connected to the connection server 12, the connection permission information registration format 52 is read out by the connection information processing unit 47 and is properly edited, thereby making it possible to designate the opening of the password of the channel which is made receivable in the connection information 94 in FIG. 4.

Figure 6:
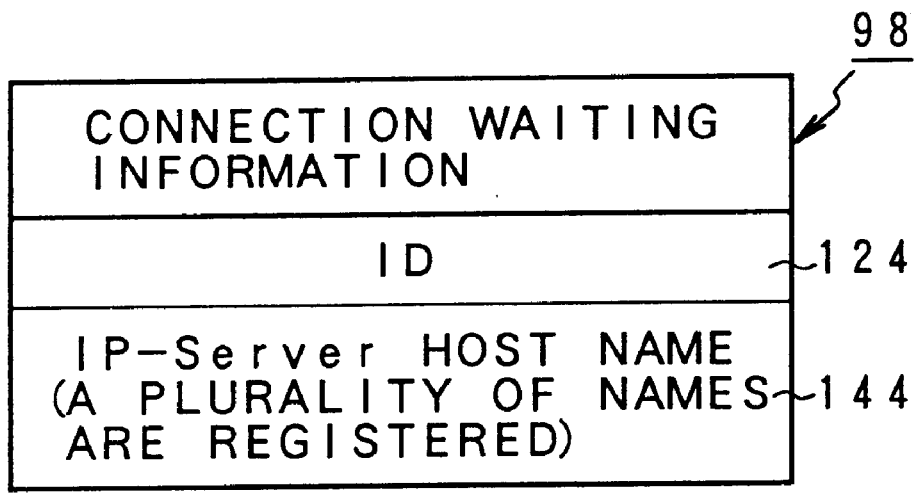
FIG. 6 is an explanatory diagram of connection waiting information.

FIG. 6 shows the connection waiting information 98 which is stored into the connecting situation database 36 of the connection server 12. The ID code 124 of the peer client 10 and an IP server host name 144 of the IP server 14 which had requested the connection server 12 to retrieve the connection information and was made wait are stored into the connection waiting information 98. That is, when the user wants to transmit to the peer client 10 whose ID code 124 has been known by the IP server 14 in FIGS. 2A to 2C, a retrieval is requested to the connection information retrieval responding unit 84 of the connection server 12 by the connection information retrieval requesting unit 114. In this instance, if the peer client 10 designated by the ID code is disconnected from the network due to a log-off or the like, the relevant connection information 94 doesn't exist in the connecting situation database 36. The IP server 14 cannot get the connection information. The IP server 14, therefore, registers the ID code 124 of the peer client which waits for the connection to the network and the self IP server host name 144 into the connecting waiting information 98 in FIG. 6. By registering them into the connection waiting information 98 as mentioned above, when the peer client 10 of the relevant ID code 124 is connected to the network and the connection information is transmitted and registered into the connection server 12, the IP server host name 144 in a connection waiting state is recognized by the reference to the connection waiting information 98. A retrieval and a response of the connection information can be automatically performed to the IP server in the waiting state from the connection server 12 side.

Figure 7:
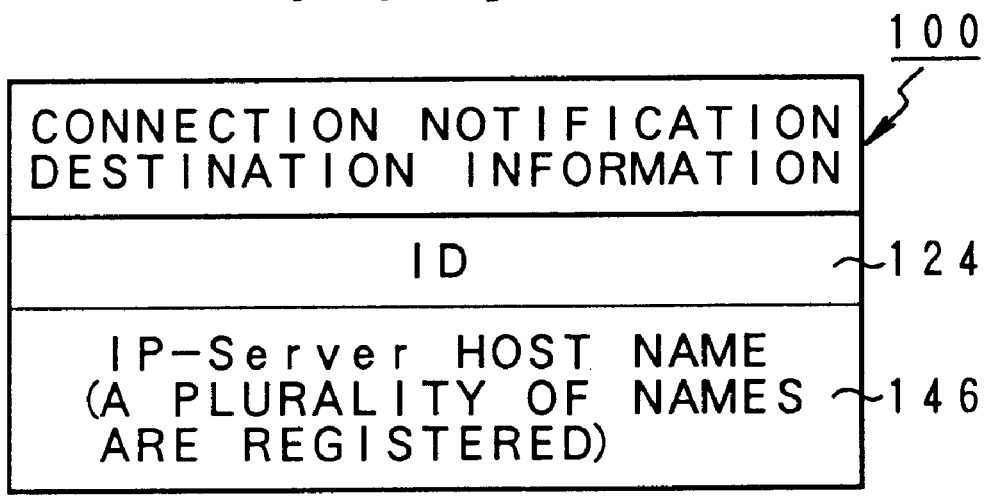
FIG. 7 is an explanatory diagram of connection notification destination information.

FIG. 7 shows the connection notification destination information 100 which is stored into the connecting situation database 36 provided for the connection server 12 in FIGS. 2A to 2C. The ID code 124 of the peer client 10 which registered and a host name 146 of the IP server serving as a connection notification destination are stored in the connection notification destination information 100. That is, the connection notification destination information registration format 60 is read out and the connection notification destination information 100 is edited by the public personal information processing unit 54 of the peer client 10 in FIGS. 2A to 2C and is transmitted together with the connection information and the like when the connection to the connection server 12 is started and is registered into the connecting situation database 36. The connection notification destination information 100 is referred to when the peer client 10 is connected to the network and the connection information is preferentially notified from the connection server to the IP server registered as a notification destination without retrieving. Thus, an advantage such that the connection information is transmitted to the IP server which is frequently used simultaneously with the connection of the peer client to the network and, if there is providing information, it can be immediately received can be derived.

Figure 8:
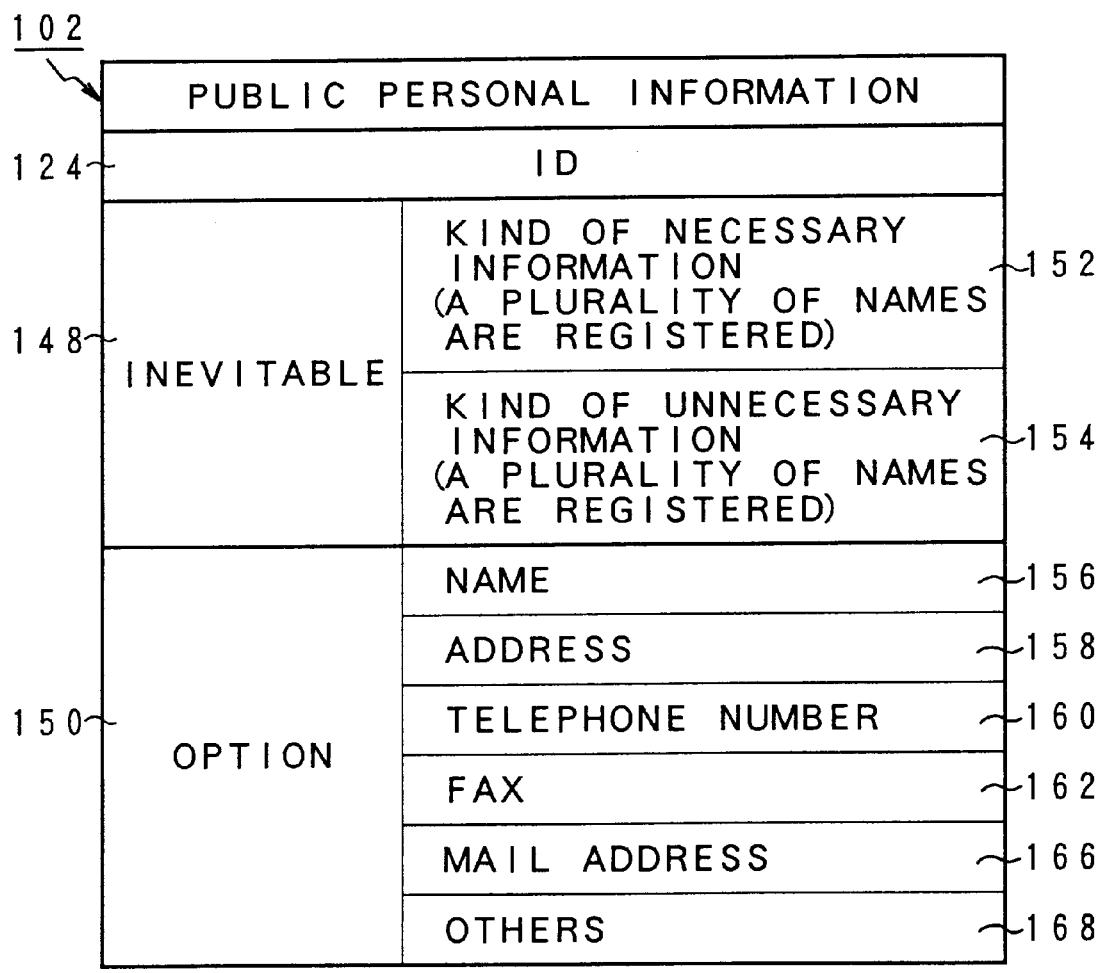
FIG. 8 is an explanatory diagram of public personal information.

FIG. 8 shows the public personal information 102 which is registered into the public personal information database 38 provided for the connection server 12 in FIGS. 2A to 2C. In the public personal information 102, inevitable public items 148 and option public items 150 are provided subsequent to the ID code of the peer client 10. The inevitable public items 148 are information which is fixedly opened. A kind 152 of necessary information and a kind 154 of unnecessary information to the IP server 14 can be registered in the inevitable public items 148. The option public items 150 are items in which the opening and the non-opening can be selectively designated by the public personal information use permission information 104 in FIG. 9 and it is also possible to register nothing about it on the basis of a judgment of the user. In the example, the option public items 150 include a name 156, an address 158, a telephone number 160, a facsimile FAX 162, a mail address 166, and others 168. If the user of the peer client 10 wants to make an access permission to obtain information which the user desires to receive for the first time to the connection server 12, all of the option public items 150 are not opened and information and kinds of services such as "real estate exchange", "stock exchange", "exchange trading", "conference schedule", and the like which the user wants to be provided are registered in the kind 152 of necessary information in the inevitable public items 148. As for the kind 154 of unnecessary information in the inevitable public items 148, the kind 152 of necessary information is once set and registered into the public personal information database 38 of the connection server 12. After that, if the user wants to stop the providing of the registered services, the registered items are deleted from the kind 152 of necessary information. However, when the stop of the providing cannot be protected due to some errors, in order to clearly stop, it is sufficient to register the kind of unnecessary information to be stopped. As will be obviously understood from the public personal information 102, in the information management system of the invention, the public personal information which is first provided to the connection server 12 is only the ID code 124 of the peer client 10 and the kind 152 of necessary information set in the inevitable public items 148. It is possible to receive initial approaches from the IP servers 14 of a plurality of information providers corresponding to the kind of necessary information which are connected to the internet by the necessary least public personal information.

The public personal information use permission information 104 in FIG. 9 is constructed by inevitable public item use permission information 170, option public item use permission information 172, an active publication 174, and the ID code 124. In the inevitable public item use permission information 170, a permission IP server host name and a refusal IP server host name are registered, a default of the permission IP server host name is set to "All", and a default of the refusal IP server host name is set to "none" in correspondence to "All". Likewise, with respect to the option public item use permission information 172 as well, a permission IP server host name and a refusal IP server host name can be registered. A default of the permission IP server host name is set to "none" and a default of the refusal IP server host name is set to "All". Therefore, in the default state, the inevitable public items 148 of the public personal information 102 in FIG. 8 are set to "use permission" and the option public items 150 are set to "use refusal". In the active publication 174 in the public personal information use permission information 104, the presence or absence of the active publication is set. A default value is set such that the active publication is "not done". By setting the active publication 174 to "done", when the peer client 10 sends the connection information and the public personal information to the connection server at the start of the connection to the network and registers them into the database, the public personal information is actively provided to the IP server. That is, when it is recognized that the active publication 174 has been set to "done" in the public personal information use permission information 104, the connection server 12 refers to the kind of necessary information and the kind of unnecessary information registered in the inevitable public items 148. A kind 190 of providing information of the data of the information provider in FIG. 11 obtains a relevant IP server host name 192. The connection server 12 actively transmits information indicating that an access permission and an access refusal have already been issued to a plurality of IP servers 14 having those IP server host names, thereby realizing a more rapid and efficient information providing from the IP server 14 side.

FIG. 10 shows the registration form 106 stored in a registration form database 39 of the connection server 12 in FIGS. 2A to 2C. The registration form 106 is constructed by a kind 184 of information and a special personal information registration form 186. For example, when the kind 184 of information indicates "real estate exchange", registration formats such as I. kind of property
II. estimate
III. location
and the like have been prepared as special personal information registration form 186.

FIG. 11 shows the information 108 of information providers which is registered into an information provider's database 40 of the connection server 12 in FIGS. 2A to 2C. The information 108 of information providers is used for an active transmission to the IP server. The information 108 of information providers has an IP (Information Provider) name 188 as a denomination of a party IP who provides information, the kind 190 of providing information, and the name 192 of the IP server host who provides information.

Schematic System Operation

Figure 12B:
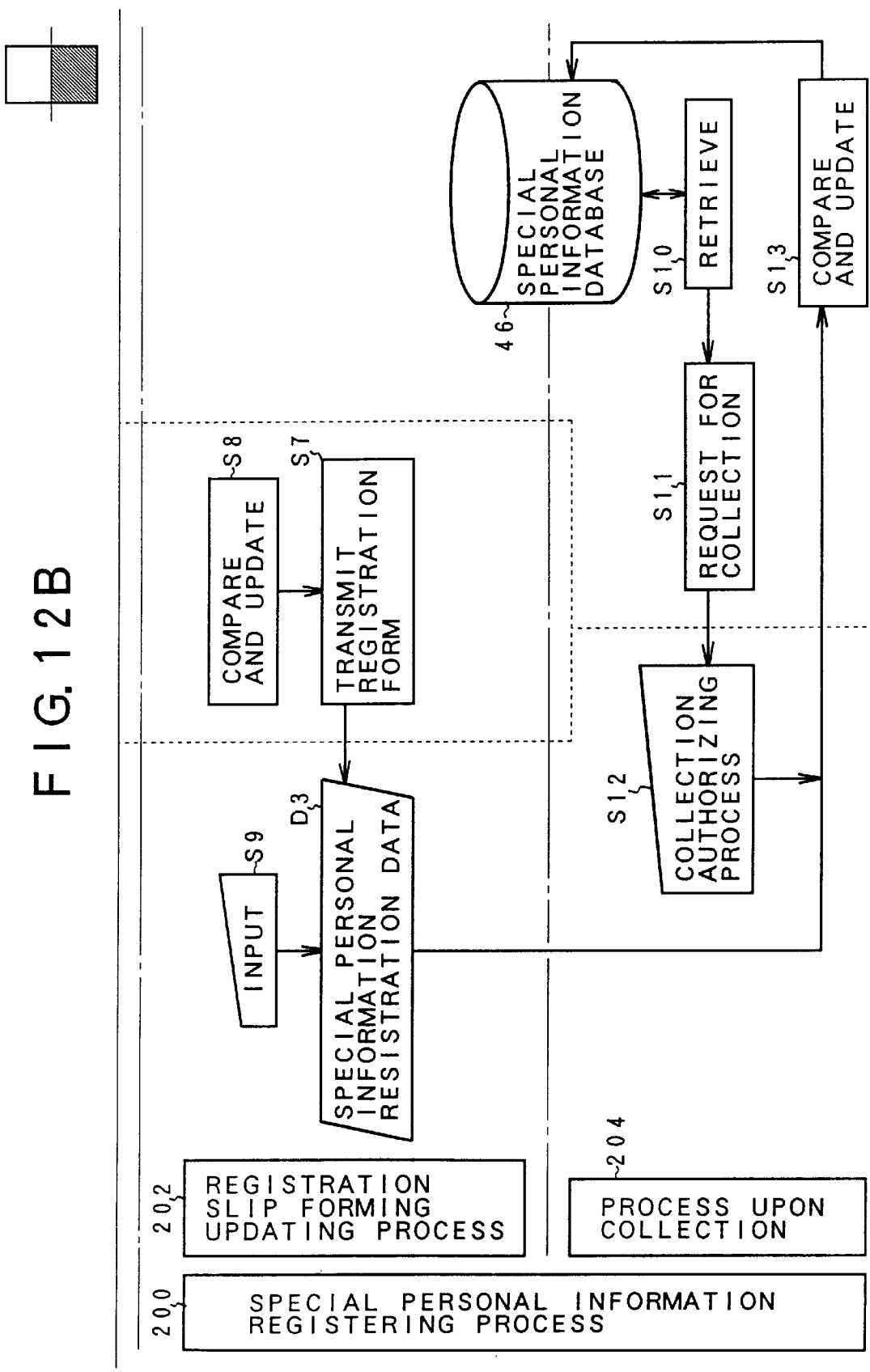

FIGS. 12A, 12B, 13A, and 13B are schematic diagrams of an edition and registration of the public personal information, an edition and registration of the special personal information, and further, a system operation of a receiving process of necessary information in the information management system of the invention. An example of the "real estate exchange" of the user A will now be described. FIG. 12A shows a public personal information registering process 194 and a special personal information registering process 200 which is executed subsequently. The public personal information registering process 194 is divided into a process 196 upon connection and a process 198 in a normal state. In the process 196 upon connection, first, prior to the connection, in step S1, a new input and updating for setting "real estate exchange" which needs an information providing into the kind 152 of necessary information in the inevitable public items 148 of the public personal information 102 in FIG. 9 is executed. When the connection to the internet 16 is started, public personal information registration data D1 formed in step S1 is transmitted to the connection server 12. In step S2, it is compared with the data which has already been registered and, when it is not registered yet, the data D1 is updated and registered as it is into the public personal information database 38. If the data D1 has already been registered, the changed portion is updated and registered into the public personal information database 38. After completion of the registration of the public personal information into the database in association with the connection of the peer client 10 to the internet 16, the process 198 in the normal state is executed. In this state, the IP server 14 periodically requests the connection server 12 so as to retrieve the public personal information regarding the necessary information "real estate exchange" in step S3. In response to the retrieval request, the connection server 12 retrieves the public personal information database 38 in step S4 and sends public personal information data D2 registered by the user A of the peer client 10 to the IP server 14. On the basis of the public personal information data D2, the IP server 14 executes a forming process of a transmitting request to register the special personal information of the user A into the database in step S5. In this instance, the contents of the public personal information data D2 which can be obtained by the IP server 14 are only the ID code 124 of the user A and the "real estate exchange" registered in the kind 152 of necessary information in FIG. 8. The name, address, and the like in the option public items 150 in FIG. 8 are obscure.

Subsequently, the special personal information registering process 200 in FIG. 12B is executed. The special personal information registering process is divided into a registration slip forming updating process 202 and a process upon collection 204. In the registration slip forming updating process 202, the connection server 12 receives the result of the comparison updating of the public personal information database in step S2 in the foregoing process 196 upon connection, sends the registration format to the peer client 10 in step S7 in accordance with the kind 152 of necessary information which was newly registered, and user A registers special personal information data D3 for the registration format in step S9.

For example, the information such as

"kind of property: condominium"

"estimate: ¥50,000,000"

"location: in the area of Tokyo"

and the like which is necessary for the real estate exchange is registered. In step S11, the IP server 14 requests the peer client 10 of the user ID code of the transmitting request formed in step S5 so as to transmit the special personal information. With respect to the connection information of the peer client 10 for the transmitting request, the connection server 12 is requested so as to retrieve the connection information by the ID code retrieved in step S10, the connection information is obtained, and the collection of the special personal information for the peer client 10 is requested by using the connection information. The peer client 10 which received the collecting request of the special personal information from the IP server 14 executes a collection authorizing process by a password collation using the password of the reception channel permitted in step S12 and, after that, sends the special personal information data D3 which has already been edited to the IP server 14. The IP server 14 which received the transmission of the special personal information data D3 compares it with the contents registered in the special personal information database 46 in step S13. If the data D3 is not yet registered, the received special personal information is registered as it is into the database. If the data D3 has already been registered, the changed portion is updated and registered. After completion of the public personal information registering process 194 and special personal information registering process 200 in FIGS. 12A and 12B, the processing routine advances to a process for providing the necessary information to the peer client 10 from the IP server 14 in FIGS. 13A and 13B.

Processes for providing the information after the special personal information was registered into the IP server 14 in FIGS. 13A and 13B are a connection starting process 206, an information receiving process 208, and a connection finishing process 210. First, in the connection starting process 206, in step S1, when the connection of the peer client 10 to the internet 16 is started, the connection information 94 in FIG. 4 is automatically formed and the user ID, the IP address, and the connection information data D1 including the permitted reception channel information are transmitted to the connection server 12. In step S3, a registration by an addition of a record to the connecting situation database 36 is executed. Subsequently, the processing routine advances to the information receiving process 208. In the information receiving process 208, a property which satisfies the special personal information of "real estate exchange" which has already been registered on the IP server 14 side and which the user A of the peer client 10 desires is found out and the transmission information is generated in step S4. When the transmission information is generated, in step S5, the IP server 14 inquires the presence or absence of the connection of the peer client 10, the permission or inhibition of the transmission, and the like to the connection server 12 by the inquiry data D2 as a transmission destination inquiry. Specifically speaking, the IP server 14 requests the connection server 12 so as to retrieve the connection information by using the ID code. In response to the retrieval request, the connection server 12 refers to the connecting situation database 36 in step S6. When the relevant connection information is obtained, the answer of the connection information is responded to the IP server 14 in step S7. When the valid connection information of the peer client 10 of the transmission destination is received in step S8, the IP server 14 transmits the generated information to the peer client 10 in step S9. When the connection information of the peer client 10 is not obtained from the connection server 12 in step S8, step S10 follows and an individual process such as mailing or the like is executed. Transmission data D4 of the information generated in step S9 is received in step S11 together with a destination channel and transmission information of the peer client 10. A process of each channel designated by the destination channel is executed in step S12. For example, when the destination channel is the emergency channel, the received information is displayed on the display of the peer client 10 in a real-time manner. When the destination channel is the regular confirmation channel, a message indicating that there is an information reception at a predetermined time is displayed and is read out and displayed by the operation of the user. When the destination channel is the preservation channel, the received information is stored in the preservation channel and the system waits for the reading out and displaying operations by the user. Such an information receiving process 208 is repeated each time the transmission information is generated by the IP server 14. The user A of the peer client 10 can successively receive the information regarding the real estate exchange. In the case where the user A who uses the peer client 10 moves the location or finishes the works, the connection finishing process 210 is executed. When the connecton finishing process of the peer client 10 is performed in step S13, connection end notification data D5 is transmitted to the connection server 12. In response to the data D5, the connection server 12 deletes a record of the ID code which received the connection end notification from the connecting situation database 36 in step S14.

FIGS. 14A and 14B show a state of the system operation in the information receiving process 208 in FIGS. 13A and 13B. When the user A connects the peer client 10 to the internet 16, the connection is notified to the connection server 12 in step S1. The connection information of the peer client 10 is registered into the connecting situation database 36 of the connection server 12. In this state, in the IP server 14, information which satisfies the requirement of the property based on the special personal information of the user A of the peer client 10 is derived from a real estate information database 45 and the transmission to the channel having the highest priority is set. The IP server 14 inquires the connection server 12 as an inquiry in step S3 in order to transmit the information to the user A by using the highest priority channel. Specifically speaking, a connection information retrieval request by the ID code of the user A is sent. In response to the inquiry, the connection server 12 retrieves the connecting situation database 36 and the answer in step S4 is responded to the IP server 14. That is, information indicating that the transmission to the user A is possible and the present IP address of the user A is "aaa. bbb. ccc. ddd" and the use of the emergency channel is permitted as a highest priority channel is notified. When receiving the answer in step S4 as a connection information retrieval response from the connection server 12, the IP server 14 transmits the data to the peer client 10 of the user A by using the connection information in step S5, sends the information of the desired property found out in step S6 by the highest priority channel, and allows it to be displayed on the display in a real-time manner. Further, not only the information providing of the desired property but also the real estate agent on the IP server 14 side obtains a permission of the user A of the peer client 10 and transmits the providing property to the IP server of the trading bank of the user A. The bank side transmits a housing loan guide and a financial schedule program to the user A of the peer client 10. By receiving them, the user A can make a financial schedule. Later, when a purchase of the property is decided, the user A transmits an output of the financial schedule program to the IP server of the bank from the peer client 10. In response to it, the bank forms necessary documents such as a contract and the like and executes an appointment adjustment and the like between the person in charge of the bank and the user A.

Although FIGS. 12A, 12B, 13A, and 13B relate to "real estate exchange" as an example, as applications other than it, the invention can be also applied to the information providing and services such as foreign exchange trading, stock exchange, further, adjustment of a conference schedule, and the like. The use in, for example, the stock exchange will now be described as follows with respect to the system of FIGS. 1A and 1B.

I. The user B of the peer client 10 registers the following special personal information into the special personal information database 46 of the IP server 14 of the securities exchange company. "Timing to report, time point when a stock price of X company is equal to ¥1,000"

II. When the stock price of X company is equal to ¥1,000 as a market price, the IP server 14 of the securities company obtains communication information indicative of the location where the user B exists on the internet 16 by a retrieval request of the connection information to the connection server 12. The IP server 14 transmits the generated information to the peer client 10 of the user B via the highest priority emergency channel and opens a notification window onto the display 26 of the peer client 10 of, for example, the user B.

III. Information such as present stock price, time-sequential transition of the stock price, volume, and the like is displayed in the notification window of the peer client 10 of the user B. If the user B wants to know additional information, he sends a transmitting request to the IP server 14 to thereby obtain it.

IV. On the basis of the information received from the IP server 14, the user B makes a judgment about the dealing and executes, for example, a cyber settlement regarding the dealing by a predetermined procedure.

With respect to the system construction of FIGS. 2A to 2C, the use in the adjusting process of the conference schedule will now be described as follows.

I. A person who convenes a conference discloses, for example, a list of target persons to be convened (with ID codes), a candidate of a location, a candidate of the day and time, and the like by an editing process by using a registration format which has been prepared to convene the conference in the peer client 10. He transmits the registration format for conference convention which was formed to the IP server 14 who provides an adjusting process of the conference schedule as a service, thereby allowing the registration format to be registered into the special personal information database 46.

II. The IP server 14 refers to the registration format for conference convention registered in the special personal information database, traces the position on the internet 16 by requesting the connection server 12 so as to retrieve the connection information by the ID codes of the convention target persons, and transmits a conference guide and a table of attendance on the basis of the connection information of the convention target persons derived as a retrieval response.

III. The convention target persons who received the conference guide and the table of attendance from the IP server 14 write or select the necessary items onto the tables of attendance and transmit them to the IP server 14.

IV. The IP server 14 collects the tables of attendance which were received so far until a preset deadline term and determines the details of the conference from the designated information such as positions of the attendants, date and time, and the like. The determination results are first transmitted to the person who convenes the conference and the details of the conference are finally determined by getting an authorization permission of the person who convenes the conference.

V. The details of the conference which were finally determined are transmitted as a notification of holding the conference to the convention target persons from the IP server 14.

Details of the System Operation

§1 Real estate exchange

The details of the processing operation in the information management system of the invention will now be described with respect to an example in a case where the user A obtains real estate information in order to newly get a house and real estate companies I and J provide information in accordance with his demand.

FIGS. 15A, 15B, 16A, and 16B show the details of a processing procedure which is executed until the user A registers the public personal information to obtain the real estate information into the database of the connection server 12 by using the peer client 10 and the user A registers the special personal information to obtain the real estate information into the database of the IP server 14 by a request from the IP server 14 of the real estate company I which knew the desire of the user A by the retrieval of the database of the connection server 12. Further, FIGS. 17A to 17E show each information which is registered and updated in the database of the connection server 12 in the processes of FIGS. 15A, 15B, 16A, and 16B.

Figure 15B:
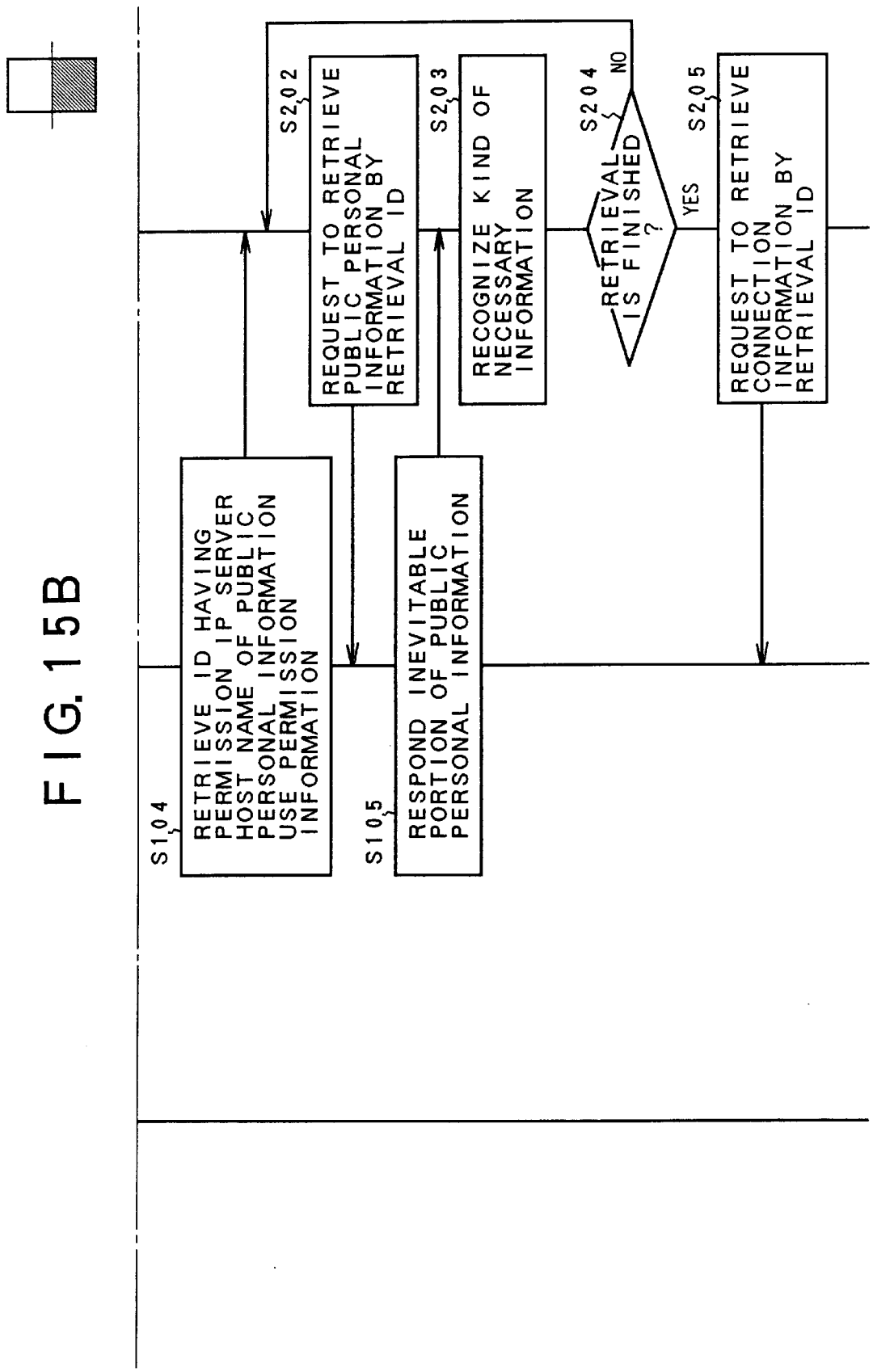
Figure 16B:
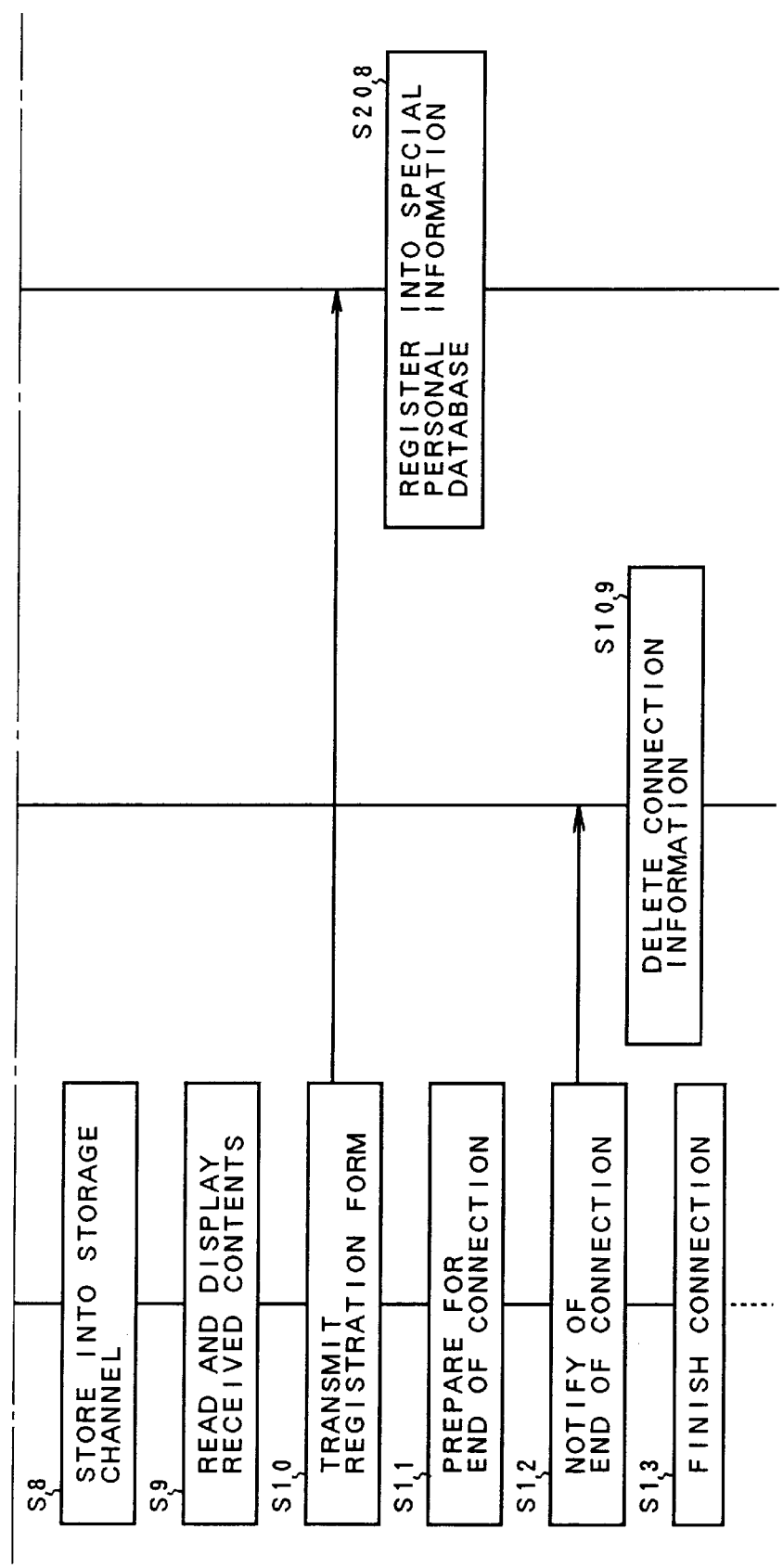
Figure 17D:
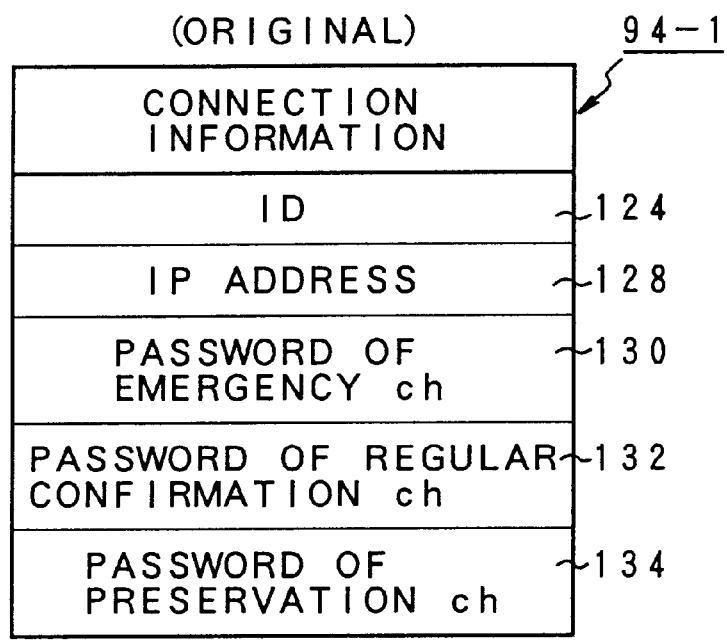

In FIGS. 15A and 15B, in step S1, the user A first edits the public personal information 102 as shown in FIG. 17B by using the peer client 10 and inputs "real estate" into the kind of necessary information of the inevitable public items 148. The ID code of the user A is "xyz" which has previously been allocated. Subsequently, when the user A starts the connection in step S2 in the peer client 10 in step S3, the peer client 10 automatically forms connection information having the ID code "xyz" of the user A and transmits it to the connection server 12. In step S101, the connection server 12 registers the record of the connection information received from the peer client 10 into the connecting situation database 36 of the connection server 12. As shown in FIG. 17D, the connection information in this instance has the ID code 124 of the user A, IP address 128 of the peer client 10, password 132 of the emergency channel having the highest priority, password 134 of the regular confirmation channel having the next high priority, and password 136 of the preservation channel having the lowest priority. Referring again to FIGS. 15A and 15B, after the connection information was transmitted in step S3, the peer client 10 transmits the public personal information which has already been edited to the connection server 12 in step S4. The connection server 12 updates and registers the record of the public personal information of the user A received from the peer client 10 into the public personal information database 38 in step S102. On the peer client 10 side, the connection permission information 96 in FIG. 6, connection notification destination information 100 in FIG. 7, and public personal information use permission information 104 in FIG. 9 except for the public personal information can be also edited. In this case, however, only the public personal information 102 in FIG. 8 is edited and the edited information is sent to the connection server 12 and is updated and registered. Therefore, as for the public personal information use permission information 104 in FIG. 17A and connection permission information 96 in FIG. 17C other than the public personal information 102 of the user A which was updated and registered in FIG. 17B, the original information in which the set values are default values have been registered. Referring again to FIGS. 15A and 15B, when the public personal information of the user A from the peer client 10 is received and updated and registered in step S102, the connection server 12 refers to the registered public personal information of the user A in FIG. 17B, recognizes "real estate" as a kind of necessary information, and transmits the registration form for special personal information registration which has been predetermined in correspondence to "real estate", to the peer client 10 in step S103. In step S5, the user A of the peer client 10 which received the transmission of the registration form from the connection server 12 executes an editing process to input necessary items into the received registration form for special personal information registration for "real estate" as necessary. The edition of the registration form can be also performed later when a transmitting request of the special personal information registration form is received from the IP server 14 side.

Figure 17E:
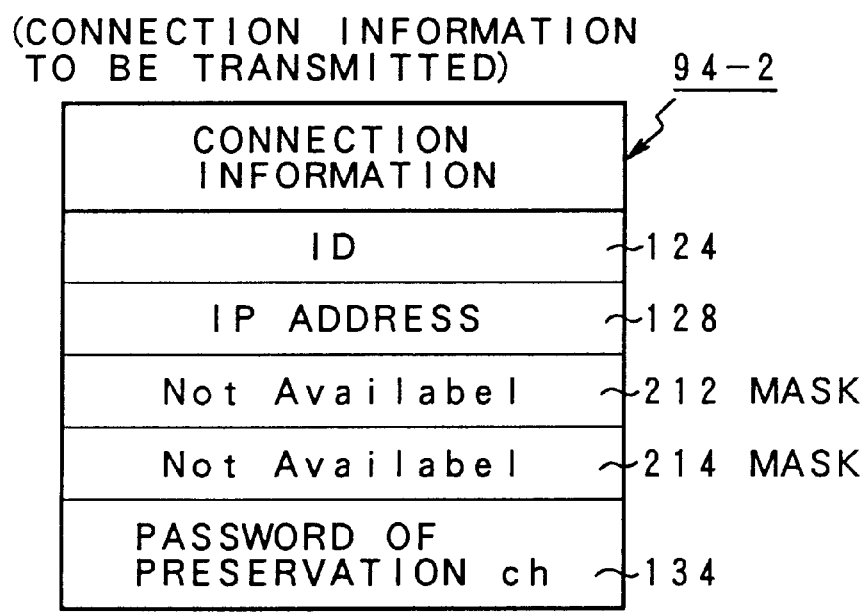

The IP server 14 of the real estate company I requests the connection server 12 periodically or by a manual operation so as to retrieve the ID code having an access permission in step S201. In response to the retrieval request, the connection server 12 retrieves each of the public personal information use permission information registered in the public personal information database 38 in step S104, retrieves the ID code in which the relevant IP server name has been registered in the IP server host name in which the access was permitted, and responds to the IP server 14. In this instance, with respect to the user A, the original public personal information use permission information 104 in FIG. 17A has been registered in the database. As for the permission IP server host name of the inevitable public item permission information 170, a default value is set to "All" indicating that the accesses regarding all of the IP servers are permitted. Therefore, the ID code "xyz" of the user A is transmitted to the IP server 14 by the retrieval by the connection server 12. By the retrieval request of the access permission ID as mentioned above, the ID codes of a number of users in which the access was permitted including the ID code "xyz" of the user A can be derived from the IP server 14. However, at this stage, whether the information which the user wants to know is "real estate" or not cannot be known on the IP server 14 side. The IP server 14, therefore, requests the connection server 12 so as to retrieve the public personal information by the ID code of the user who expresses the access permission which could be retrieved in step S202. In response to the retrieval request, the connection server 12 reads out the public personal information of the ID code as a retrieval target in step S105 and responds the information about the kind of necessary information written in the inevitable public items. For example, in step S202, when the retrieval request of the public personal information by the ID code "xyz" of the user A is sent, in step S105, the connection server 12 retrieves the public personal information 102 in FIG. 17B and responds "real estate" written in the kind of necessary information in the inevitable public items 148 to the IP server 14. With regard to the response to the retrieval request of the public personal information, the IP server 14 recognizes the kind of necessary information in step S203 and repeats the retrieval request of the public personal information by the captured ID code in which the access was permitted until the end of the retrieval in step S204. When the retrieval of the public personal information is finished, the IP server 14 requests the connection server 12 so as to retrieve the connection information by using the ID code determined as for the kind "real estate" of the necessary information in step S205. In this instance, the IP server 14 of the real estate company I requests the connection server 12 so as to retrieve the connection information by using the ID code of the user A. The connection server 12 who received the retrieval request accepts the retrieval request in step S106 in FIGS. 16A and 16B. The retrieval request of the connection information to the connection server 12 from the IP server 14 is performed at random by the IP server 14 on the information providing side. Upon acceptance of the retrieval in step S106, the retrieval requests are held in accordance with the receiving order and the processes are sequentially executed in accordance with the order from the old request. After completion of the retrieval acceptance in step S106, in next step S107, the connection server 12 refers to the connection permission information 96 in FIG. 17C having the ID code "xyz" of the user A and recognizes that the permission IP server host name "All" of the preservation channel 142 has been permitted. In next step S108, with respect to original connection information 94-1 in FIG. 17D, as shown in FIG. 17E, only the password 136 of the permitted preservation channel is left, masking processes by masks 212 and 214 are executed with respect to the password 132 of the emergency channel and the password 134 of the regular confirmation channel which are not permitted, and the connection server 12 responds to the IP server 14 together with the ID code 124 and IP address 128. Therefore, the IP server 14 can further know the password of the IP address and the preservation channel in which the reception is permitted in response to the retrieval request of the connection information by the ID code "xyz" by the connection server 12. At this stage, however, it is obscure that the user of the ID code "xyz" is the user A. In step S206, the IP server 14 subsequently requests the peer client 10 so as to permit the transmission by using the destination channel and the channel password based on connection information 94-2 in FIG. 17E derived by the retrieval. The peer client 10 who received the transmission permitting request collates the password of the reception permission channel in step S6. When a collation coincidence is obtained, the peer client 10 gives a transmission permission to the IP server 14 in step S7. In step S207, the IP server 14 which received the transmission permitting requests the peer client 10 so as to transmit the edited special personal information registration form. This transmitting request is stored into the preservation channel as a permitted channel in step S8. After that, the user A of the peer client 10 reads out and displays the received information of the preservation channel in step S9, knows the transmitting request of the edited registration form from the IP server 14, and receives the information providing from the real estate company I. For this purpose, in step S10, the user A transmits the edited special personal information registration form to the IP server 14. The IP server 14 which received the transmission of the registration form registers the special personal information sent from the user A into the self special personal information database 46. The special personal information includes, for example, I. Kind of house "condominium"
II. Estimate "¥50,000,000"
III. Location "in the area of Tokyo"

After completion of the registration of the special personal information of the user A into the IP server 14, as shown in FIGS. 1A and 1B, the IP server 14 monitors the discovery of a property which satisfies the conditions of the user A registered in the special personal information database 46 in the information forming module 44. When the property which satisfies the desire is obtained, the information of the discovered real estate is transmitted to the peer client 10 of the user A. The transmission of the real estate information in this instance is also executed in a manner similar to the case of the transmitting request of the edited registration form within a range from step S205 in FIGS. 15A and 15B to step S207 in FIGS. 16A and 16B. That is, the transmission permission is requested to the connection server 12 after the connection information of the user A at the present time point was obtained by the retrieval request of the connection information by the ID code of the user A. When the transmission permission is obtained by the password collation, a process for transmitting the information of the discovered real estate to the preservation channel permitted at that time is repeated. In a manner similar to the registration of the special personal information of the user A to the real estate company I, the user A likewise registers the special personal information with respect to the other real estate company J. Thus, the real estate information regarding the property which satisfies the registered special personal information of the user A is sent from the real estate companies I and J to the peer client 10 of the user A simultaneously with the generation of the necessary information on the real estate company side.

Figure 18A:
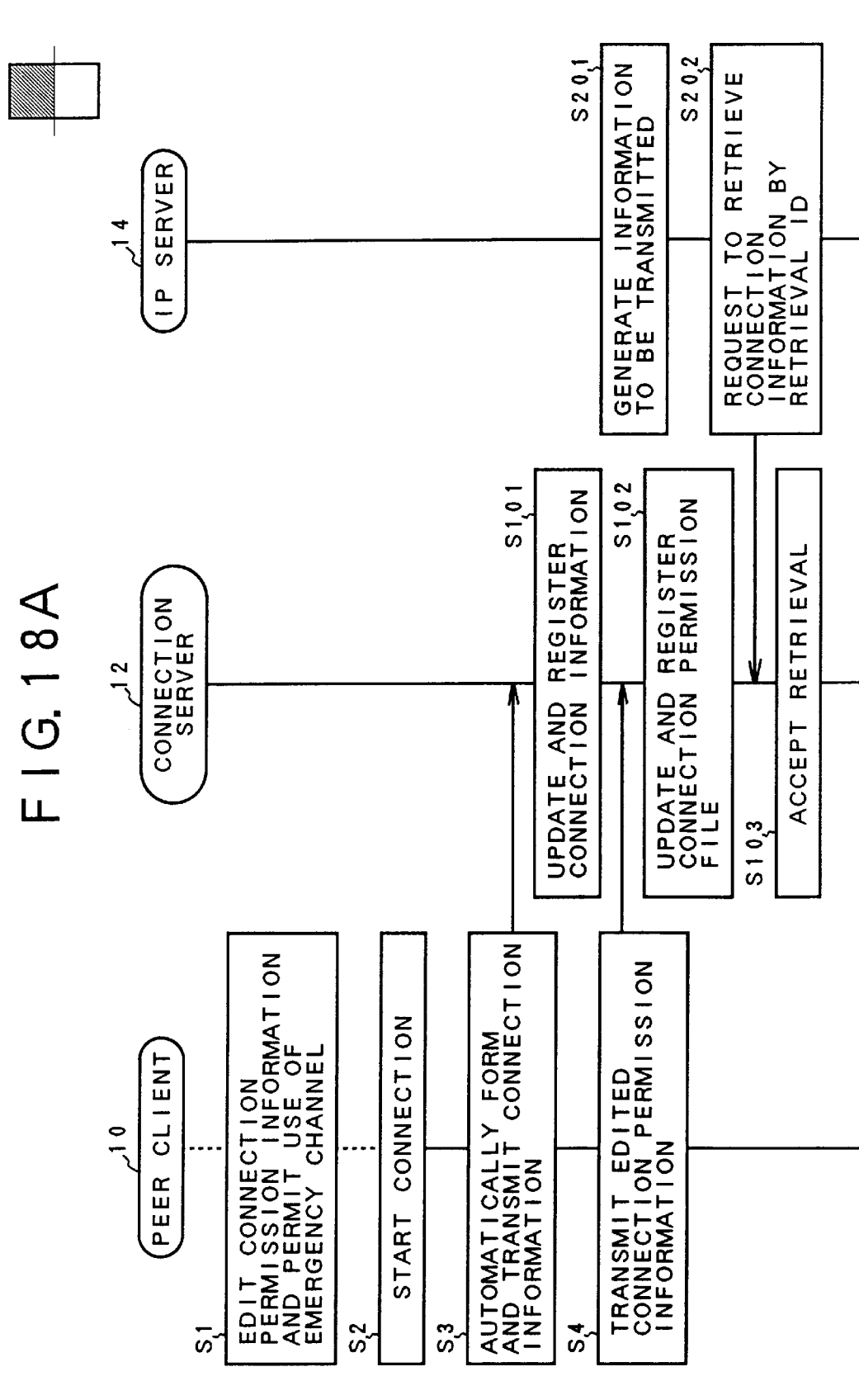
FIGS. 18A and 18B are explanatory diagrams of an updating and a registration of the database of the connection managing apparatus for providing information at any time.
Figure 18B:
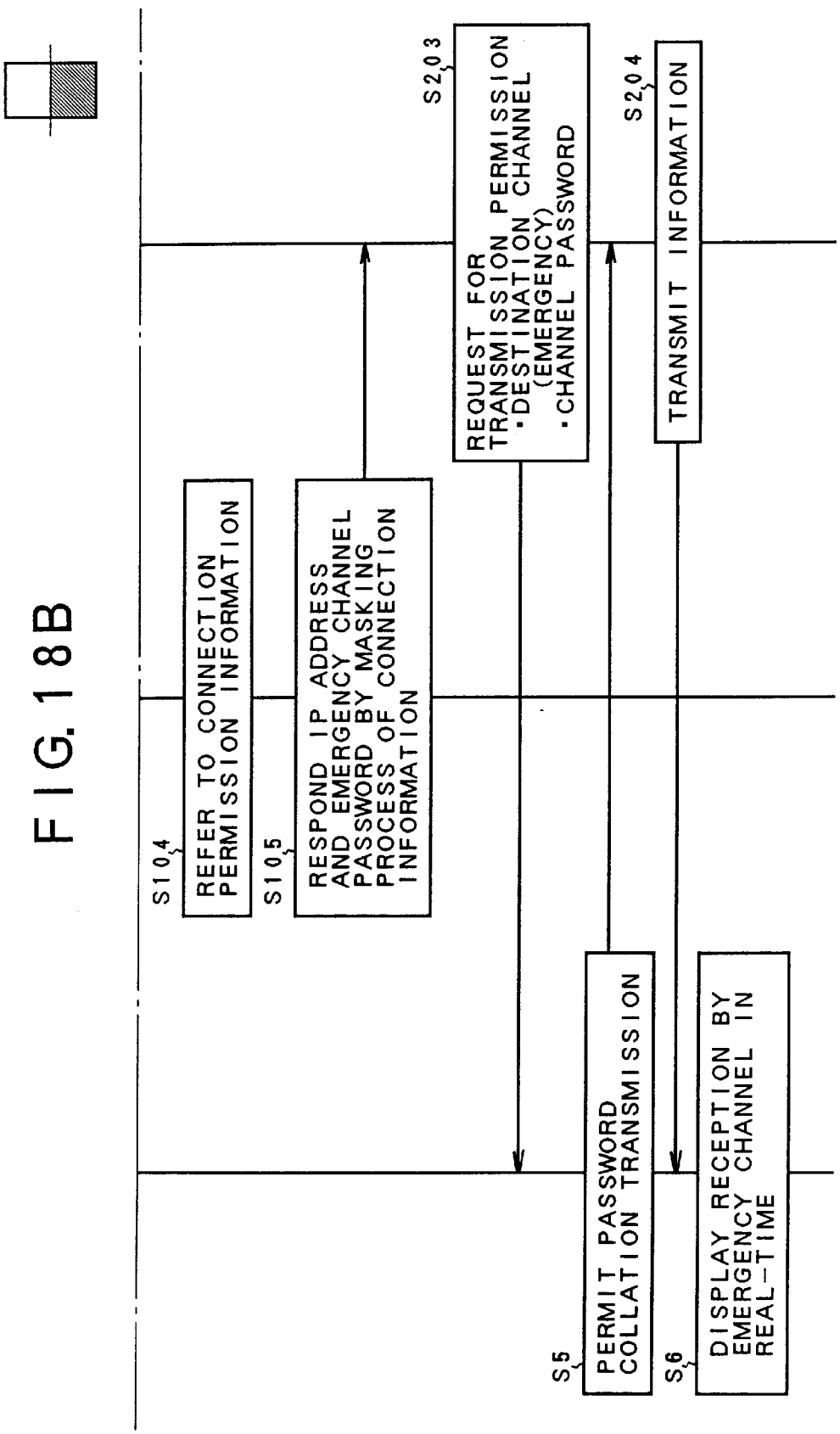
Figure 19C:
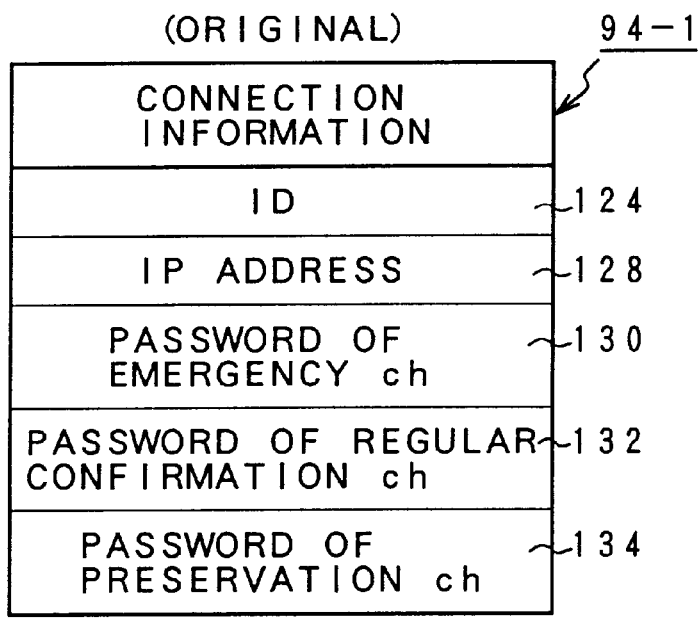
Figure 19D:
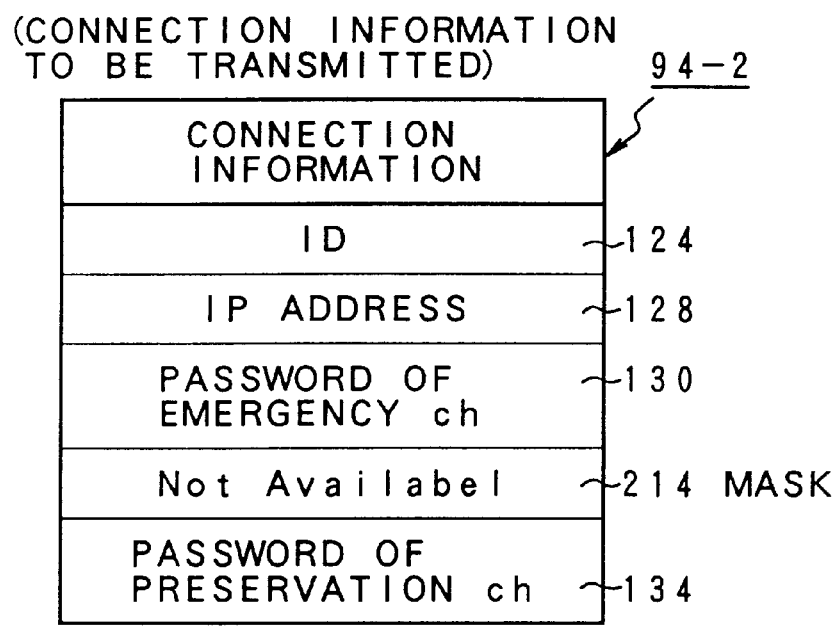

FIGS. 18A and 18B show processes in case of changing the public personal information so that the user A can receive and display the information of the real estate company I in a real-time manner by looking at the contents of the transmitted real estate information for the preservation channel from the real estate companies I and J. First, in the peer client 10, the user A edits a connection permission file in which the real estate information from the real estate company I can be received and displayed in a real-time manner and permits the use of the emergency channel as shown in step S1. That is, as shown in the connection permission information 96 in FIG. 19A, "real estate company group" is set into "permission IP server host name" in the emergency channel permission information 138. In step S2, when the peer client 10 is connected to the internet 16, the connection information is automatically formed and transmitted to the connection server 12 in step S3. In step S101, the connection information is updated and registered. At the same time, the edited connection permission information is transmitted to the connection server 12 in step S4. The connection permission information is updated and registered in step S102. After completion of the updating and registration of the connection permission information in which the use of the emergency channel was permitted, when the real estate information to be transmitted is generated on the IP server 14 side of the real estate company I as shown in step S201, the retrieval of the connection information using the ID code "xyz" of the user A is requested in step S202. In response to the retrieval request, the connection server 12 accepts the retrieval in step S103 and refers to the connection permission information in step S104. In this instance, as shown in FIG. 19A, since the IP server host name of "real estate company I" has been set as a permission IP server host name of the emergency channel connection permission information 138, in step S105, the connection server 12 responds the IP address and the password of the emergency channel to the IP server 14 by the masking process in which the masking process regarding the emergency channel password of the connection information was released. That is, the original connection information 94-1 in FIG. 19C is opened while releasing the mask of the password 132 of the emergency channel on the basis of the connection permission information 96 in FIG. 19A and responds the connection information 94-2 in which the mask 214 is performed with regard to only the password 134 of the regular confirmation channel to the IP server 14. Therefore, the IP server 14 sends the transmission permitting request using the channel password of the emergency channel as an allocated channel to the peer client 10 in step S203. In response to the transmission permission based on the password collation in step S5, the IP server 14 transmits the information to the emergency channel of the peer client 10 in step S204. In step S6, the peer client 10 opens the information received by the emergency channel onto the display by, for example, a window and displays it in a real-time manner.

Figure 20B:
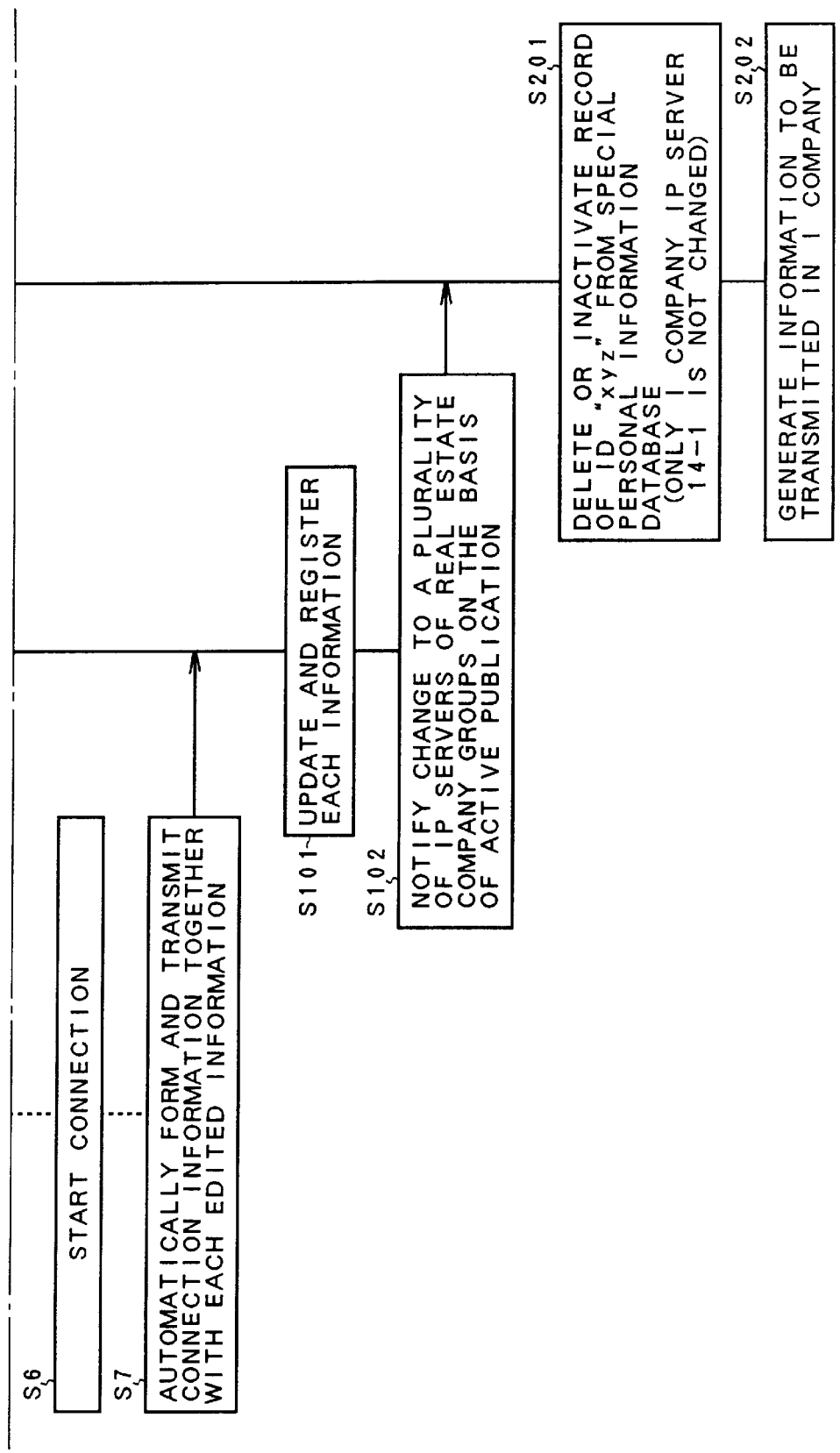

FIGS. 20A and 20B show processes in the case where as a result of that the information reception was frequently performed, the user A decides the target property on the basis of the real estate information from the real estate company I, determines to negotiate therewith, notifies the real estate company I of his decision via an electronic mail or by the present system, and thereafter, actively receives a report from the real estate company I but refuses the transmission from the other real estate company J. In other words, it is assumed that, in step S1, the user A of the peer client 10 selects the real estate company I as a negotiation partner and determines that the transmission from the real estate company J is refused, and such a decision has also already been informed to the real estate company I via the communication so far. In step S2, the public personal information use permission information is edited. That is, in FIGS. 22A, 22B, and 22C, as shown in the public personal information use permission information 104 of the user A registered in the connection server 12, "real estate company I, IP server host name" 216 is set into "permission IP server host name" in the option public item permission information 172 and a publication permission of the option public items 150 of the public personal information 102 of the user A is set. Further, the active publication 174 is set to "done". When the peer client 10 is connected to the connection server 12, a fact that there is a change in public personal information is actively informed to a plurality of IP servers 14 of the real estate company group on the basis of "done" of the active publication 174. As providing information to the IP server when the active publication 174 is set to "done", information including the ID code 124 and inevitable public items 148 in the public personal information 102 in FIGS. 22A to 22C is transmitted.

Referring again to FIGS. 20A and 20B, after completion of the edition of the public personal information use permission information in step S2, the public personal information is edited in step S3. For example, as shown in the public personal information 102 of the connection server 12 in FIGS. 22A to 22C, since the option public items 150 are opened by the edition of the public personal information use permission information 104, the user A inputs "aa@bb. cc. dd" as a self mail address 166 into the option public items 150 and inputs "A" into the name 156. Therefore, by obtaining the option public items 150 of the edited public personal information 102, the real estate company I of an IP server 14-1 can recognize for the first time that the user is A. Subsequently in step S4 in FIGS. 20A and 20B, the connection permission information is edited. In this case, the emergency channel is permitted to only the real estate company I and, with respect to the regular confirmation channel and the preservation channel, the real estate company J is refused. That is, as shown in the connection permission information 96 of the connection server 12 in FIGS. 22A to 22C, "I company" is set into a permission IP server host name 218 of the emergency channel 138 and "J company" is inputted to refusal IP server host names 220 and 222 of the regular confirmation channel 140 and preservation channel 142, respectively. Subsequently in step S5 in FIGS. 20A and 20B, when connecting to the internet 16 after the next time by the edition of the connection notification destination information, the operation is designated so as to notify of a fact that the connection to the real estate company I was performed. That is, as shown in the connection notification destination information 100 of the connection server 12 in FIGS. 22A to 22C, "I company, IP server host name" is set as an IP server host name 146 of the connection notification destination. After completion of the edition of each information in steps S2 to S5 as mentioned above, the connection to the internet 16 is started in step S6. The transmission by the automatic formation of the connection information and the transmission of each of the information which has already been edited are executed for the connection server 12 in step S7. Each information is updated and registered into the database in step S101. In this instance, as shown in the public personal information use permission information 104 of the connection server 12 in FIGS. 22A to 22C, since the active publication 174 has been set to "done" with respect to the ID code "xyz" of the user A, the active publication is recognized. In step S102, a fact that there is a change in database registration information in the connection server 12 is notified to a plurality of IP servers 14 of the real estate company group. In the plurality of IP servers 14 of the real estate company group which received the change notification based on the active publication, if the special personal information of the ID code "xyz" of the user A has been registered in the special personal information database, it is deleted. The public personal information 102 like an I company IP server 14-1 in FIGS. 22A to 22C is obtained, so that it is possible to know that the user of the ID code "xyz" is Mr. A and to know his mail address. When the information which the real estate company I wants to transmit is generated in step S202 in FIGS. 20A and 20B, the retrieval of the connection information is requested to the connection server 12 by the retrieval ID in step S203 in FIG. 21. Thus, the connection information of the user A is transmitted via the masking process based on the retrieval acceptance, reference to the connection destination information, and reference to the connection permission information in step S103. The IP server 14 obtains the connection information in step S204.

Figure 22A:
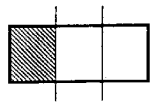
Figure 22B:
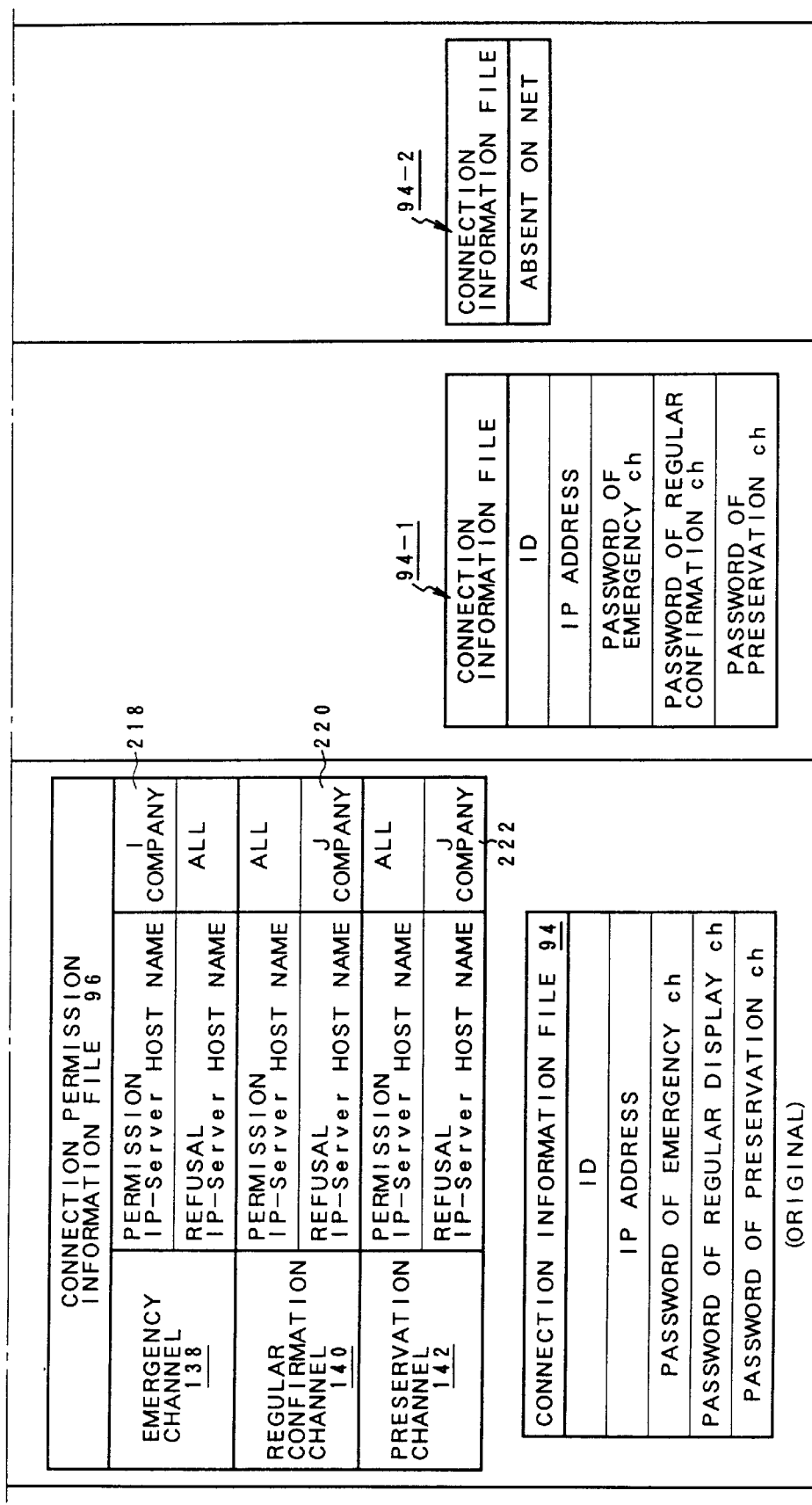

As for the connection information of the user A obtained by the real estate company I, the passwords have been opened with respect to all of the emergency channel, regular confirmation channel, and preservation channel as shown in the connection information 94-1 of the IP server 14-1 of the I company in FIGS. 22A to 22C. The IP server 14-1 of the real estate company I can transmit the information using the channel which is thought to be necessary.

On the other hand, when information which the other real estate company J wants to transmit is generated in step S301 in FIG. 21 accidentally or by a mistake although such a case ordinarily doesn't occur because the ID code "xyz" has been deleted from the special personal information database or has been inactivated, the connection server 12 is requested to retrieve the connection information by using "xyz" of the user A in step S302. In response to the retrieval request, the connection server 12 similarly executes an acceptance of the retrieval, a reference to the connection destination information, and a reference to the connection permission information, executes the masking process to the connection information, and after that, transmits the resultant information in step S104. An IP server 14-2 of the real estate company J gets the connection information in step S303. The contents of the connection information are "absent on net" as shown in the connection information 94-2 of the IP server 14-2 of J company in FIGS. 22A to 22C. That is, as for the public personal information 102 registered in the connection server 12, the kind 154 of unnecessary information of the inevitable public items 148 has been set to "real estate". Therefore, in the public personal information 102-2 which is obtained by the IP server 14-2 of the J company, the kind of necessary information has been set to "none". Thus, the ID code "xyz" of the user A is eventually excluded from the access targets of the J company IP server 14-2 which provides the information regarding the real estate. At a time point when it is recognized, it is desirable to delete the record of the ID code "xyz" from the special personal information database 48. For a retrieval request of the connection information in which the ID code "xyz" was designated from the IP server 14-2 of the J company due to an accidental purpose or a mistake which ordinarily cannot occur, in the connection permission information 96 of the connection server 12, the real estate company J has been registered to "refusal IP server host name" with respect to all of the emergency channel 138, regular confirmation channel 140, and preservation channel 142, so that the passwords of all of the channels in the original connection information 94-1 are mask-processed. In the J company IP server 14-2, thus, only "absent on net" like connection information 94-2 can be accepted as a response of the retrieval request by the ID code "xyz", so that the transmission of the information to the user A is refused. It is desired that, at a time point when the above process is continuously performed a few times, the record of the ID code "xyz" of the user A is deleted from the special personal information database 48.

§2 Adjustment of conference schedule

FIGS. 23A, 23B, 24A, 24B, 25A, and 25B show the details of the system operation when a conference schedule is adjusted by the information management system of the invention in FIGS. 1A and 1B.

Figure 23B:
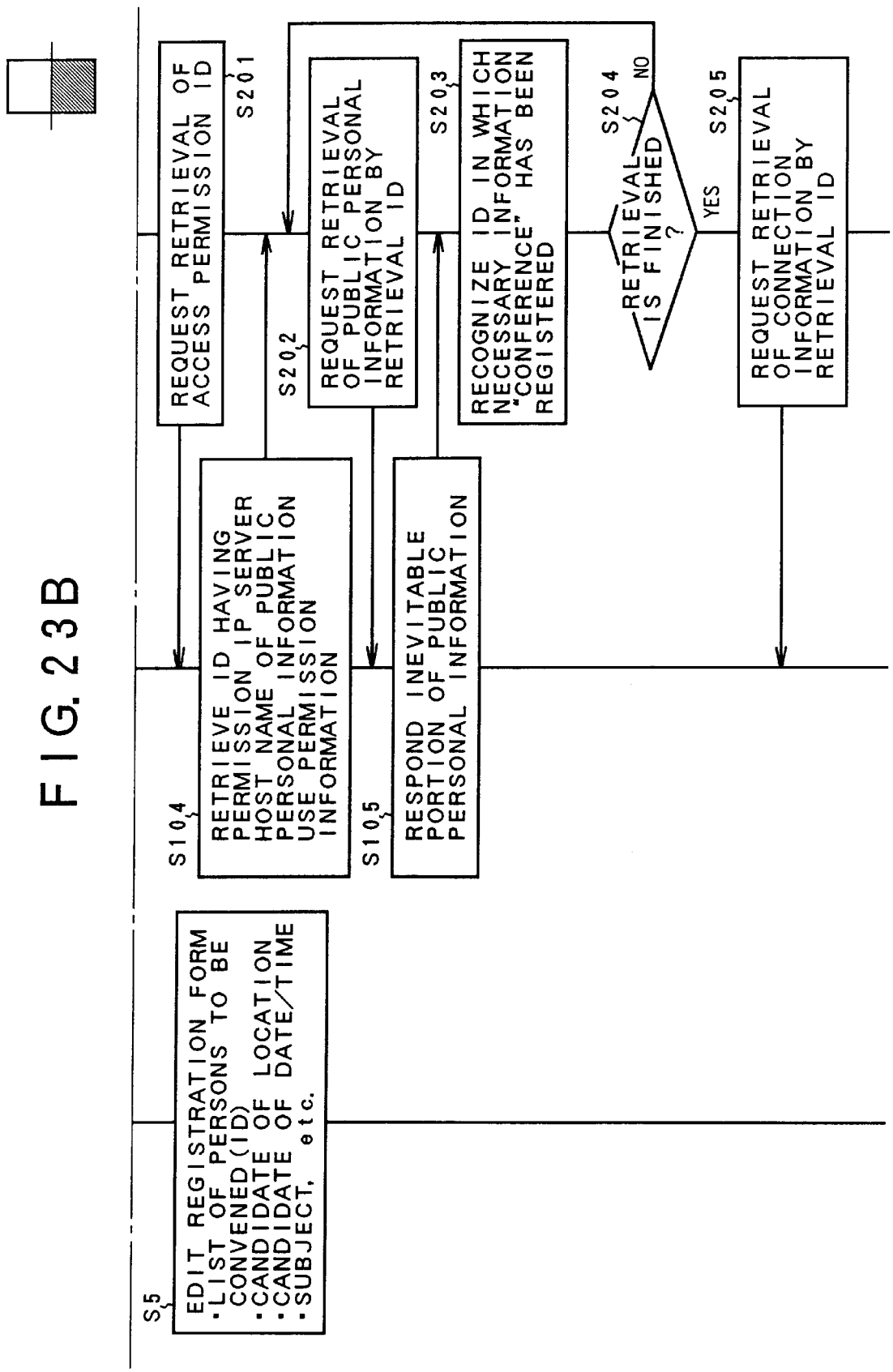

In FIGS. 23A and 23B, a person who convenes a conference edits the public personal information in which the necessary information is set to "conference" in step S1 by using the peer client 10. In step S2, the connection to the internet 16 is started. In step S3, the connection information is updated and registered in step S101 of the connection server 12 by the transmission due to the automatic formation of the connection information. In step S4, the edited public personal information of the necessary information "conference" is transmitted. In step S102, the public personal information is updated and registered into the connection server 12. On the basis of the updating and registration of the public personal information in which the necessary information is set to "conference", the connection server 12 transmits the registration form for the conference to the peer client 10 in step S103. In response to the registration form, the person who convenes the conference of the peer client 10 edits the registration form in step S5. For example, he inputs a list of convention target persons (including the ID codes), a candidate of the location, a candidate of day and time, a subject for discussion, and the like. On the other hand, the IP server 14 side which provides the adjustment service of the conference schedule requests the connection server 12 so as to retrieve the ID code in which the access is permitted in step S201. In response to the retrieval request, the connection server 12 responds the ID code with reference to the public personal information use permission information in step S104. With respect to the retrieval ID code, the IP server 14 requests the retrieval of the public personal information in step S202. By receiving a response of the inevitable portions due to the retrieval of the public personal information in step S105 by the connection server 12, the ID code in which "conference" has been registered as necessary information is recognized in step S203. When the end of retrieval is discriminated in step S204, the retrieval request of the connection information by the ID code retrieved in step S203 is performed to the connection server 12 in step S205. The connection server 12 accepts the retrieval in step S106 in FIGS. 24A and 24B, refers to the connection permission information in step S107, and responds to the IP server 14 by using the IP address preservation channel password as connection information by the masking process of the connection information in step S108. The IP server 14 subsequently requests the peer client 10 to permit the transmission in step S206, receives the transmission permission in step S7 based on the password collation in step S6, and requests the transmission of the edited registration form for the conference in step S207. The peer client 10 stores the form transmitting request into the preservation channel in step S8. After that, the person who convenes the conference reads out and displays the received contents of the preservation channel in step S9 and transmits the edited registration form to the IP server 14 in step S10. In step S208, the IP server 14 registers the registration form for the conference transmitted from the peer client 10 into the special personal information database. Subsequently, in step S209 in FIG. 25A, the IP server 14 obtains the ID code of the person who convenes the conference with reference to the registered registration form for the conference and sends the retrieval request of the connection information by the ID code to the connection server 12. In response to the retrieval request of the connection information, the connection server 12 accepts the retrieval in step S109, refers to the connection permission information in step S110, and responds the IP address and the password of, for instance, the emergency channel by the masking process of the connection information in step S111. Therefore, the IP server 14 performs the transmission permitting request by the channel password in which the destination channel is set to the preservation channel in step S210. The transmission permitting request is received by the peer client 10 of a certain conference target person. The transmission permission due to the password collation is issued as shown in step S11-1. In response to it, the IP server 14 transmits a conference guide and a table of attendance in step S211, thereby allowing them to be received by the preservation channel on the peer client 10 side in step S12-1. In accordance with the information receipt in the preservation channel, the conference target persons read out the conference guides of the preservation channel and edit the tables of attendance and transmit them to the IP server 14 in step S13-1 after that. The IP server 14 collects the tables of attendance in step S212. The processes from step S209 are repeated until predetermined deadline conditions such as term, the number of attendants, and the like are satisfied in step S213. When the deadline is discriminated in step S213, step S214 follows. The details of the conference, namely, the attendant target persons, location, day and time, and subject of discussion are determined from the contents of the tables of attendance which have already been collected. With respect to the person who convenes the conference and the conference target persons, while receiving the connection information retrieval response like step S112 by the retrieval request to the connection server 12, the details of the conference are sent to the conference target persons and the person who convenes the conference, thereby allowing them to be received as shown in steps S14-1 to S14-n of the peer client 10. If the details of the conference were determined in step S214 here, it is desirable for the IP server 14 to first transmit a notification of holding the conference having the decided contents to the conference convening person who requested the schedule of the conference and receive the confirmation of the person who convenes the conference and, after that, transmit the notification to the conference target persons.

Processing Functions of the Apparatus

A processing function of each of the peer client 10 serving as a user apparatus, connection server 12 serving as a connection managing apparatus, and IP server 14 serving as an information providing apparatus in FIGS. 1A and 1B will now be described.

(Peer client)

Figure 26:
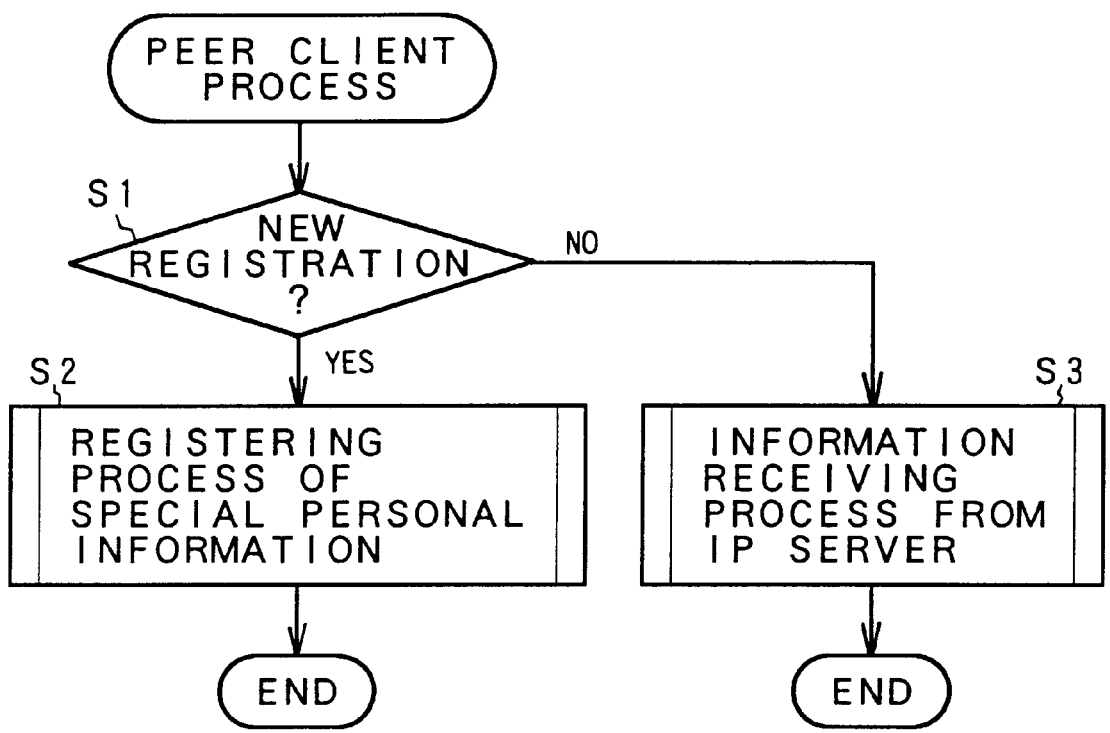
FIG. 26 is a schematic flowchart for a peer client process.

FIG. 26 is a schematic flowchart for the processing operation of the peer client 10 in FIGS. 1A and 1B. In the peer client process, a check is made to see if the special personal information is newly registered in step S1. When the special personal information is newly registered, the processing routine advances to a registering process of the special personal information in step S2. If NO, an information receiving process from the IP server is executed in step S3.

FIGS. 27A and 27B are detailed flowcharts for the registering process of the special personal information in step S2 in FIG. 26. In the special personal information registering process, first in step S1, the public personal information and the public personal information permission information are edited. When the start of the connection to the internet 16 is discriminated in step S2, the connection information is automatically formed and transmitted to the connection server 12 in step S3. Subsequently in step S4, the edited public personal information and the public personal information permission information file are transmitted and registered into the database of the connection server 12. In step S5, the special personal information registration form is received from the connection server 12 and is edited as necessary. In step S6, a check is made to see if there is a transmitting request of the registration form to the preservation channel from the IP server. When there is the transmitting request, a check is made to see if the registration form has been edited in step S7. If NO, the registration form is edited in step S8 and step S9 follows. If YES, the processing routine soon advances to step S9. The edited registration form is transmitted to the IP server 14 and is registered into the special personal information database 48. Subsequently in step S10, the presence or absence of a connection end preparation from the internet 16 is discriminated. When the connection end preparation is recognized, the connection end notification is transmitted to the connection server 12 in step S11 and a deletion of the self connection information 94 from the connecting situation database 36 is instructed. After that, a connection finishing process is actually executed and the processing routine is finished.

Figure 28A:
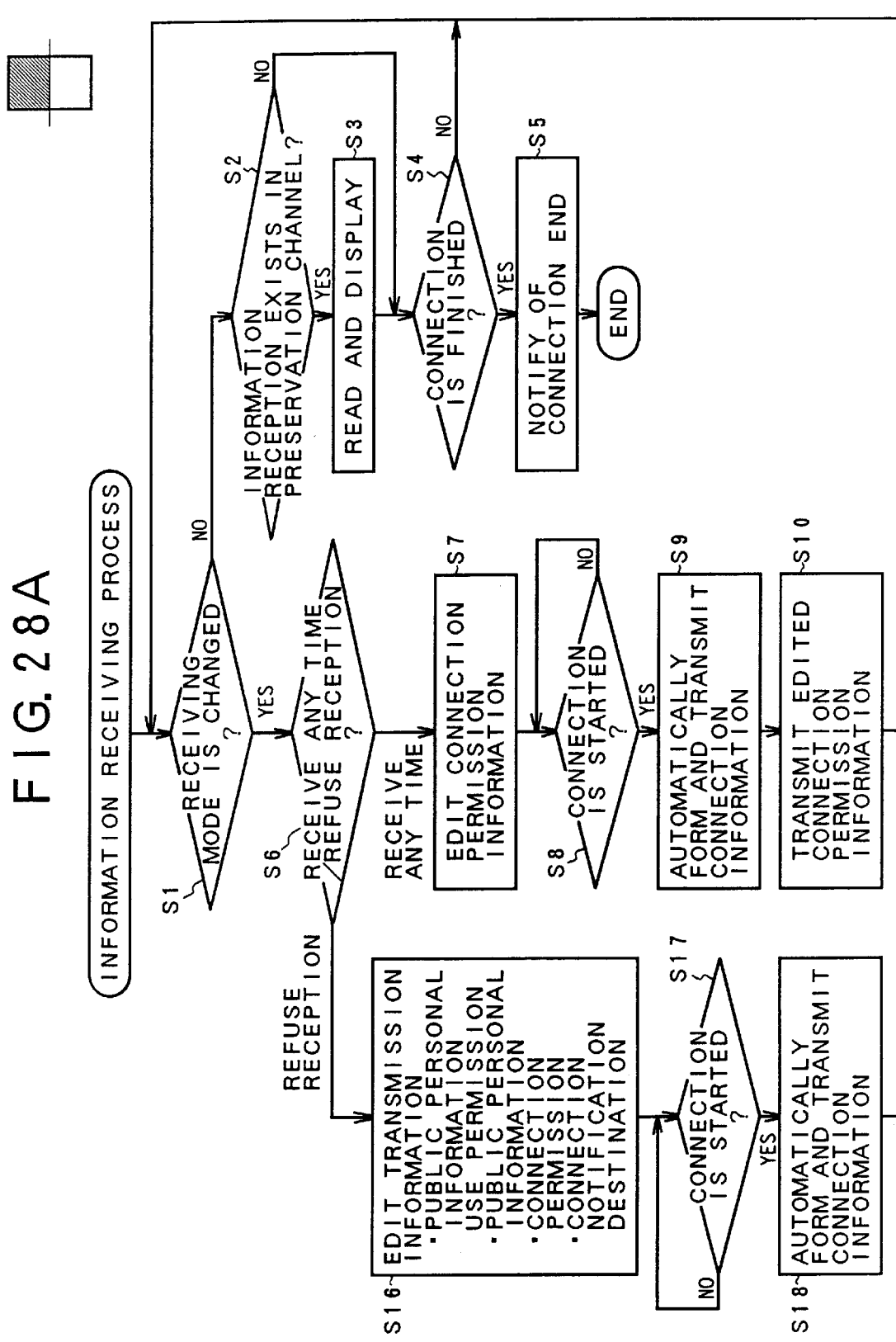
FIGS. 28A and 28B are flowcharts for an information receiving process of the peer client.
Figure 28B:
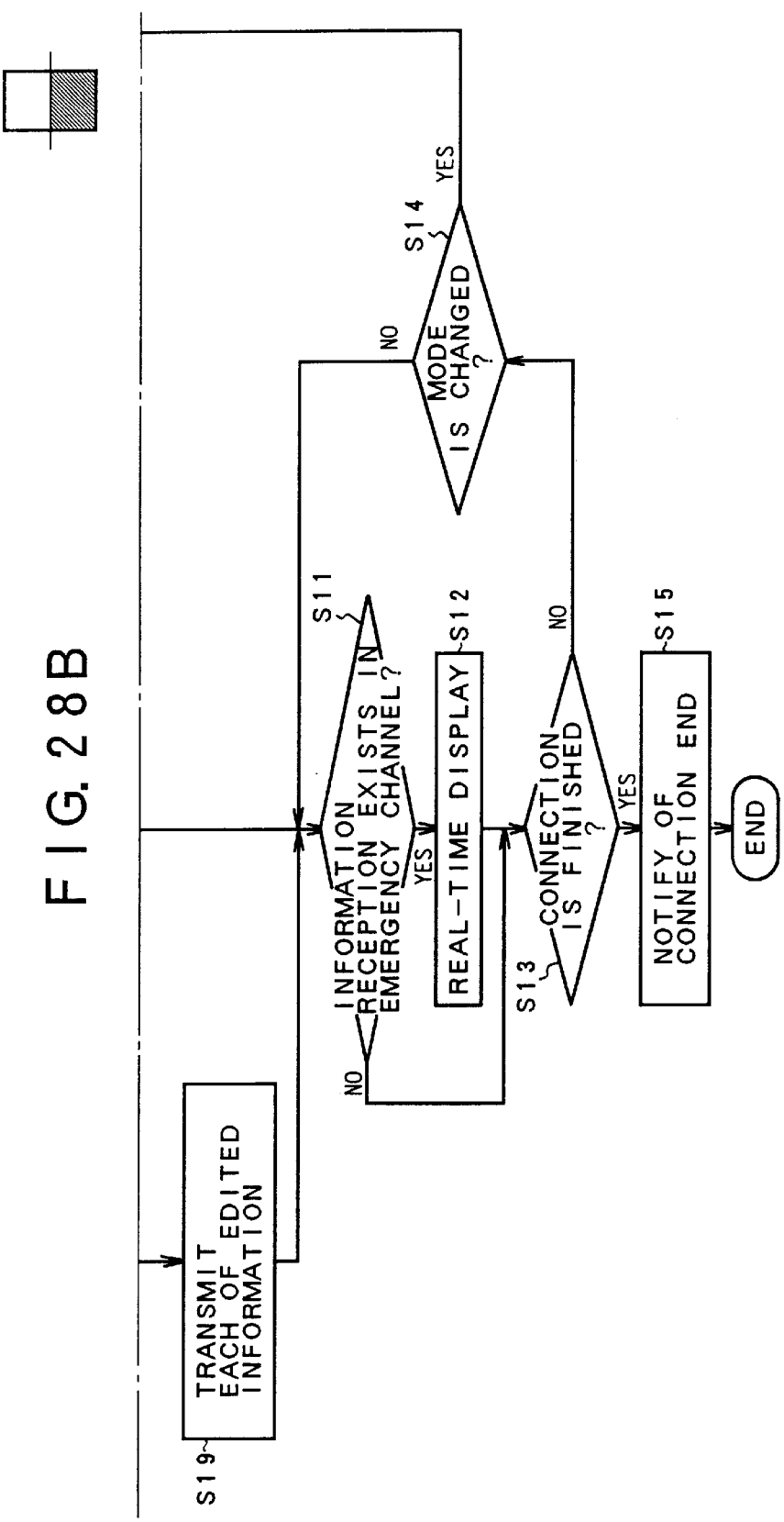

FIGS. 28A and 28B are detailed flowcharts for the information receiving process from the IP server in step S3 in the peer client process in FIG. 26. First in step S1, a check is made to see if the receiving mode has been changed. The change in receiving mode is checked by discriminating the presence or absence of a changing operation of the receiving mode in a menu picture plane of the peer client 10. If the receiving mode is not changed, processes from step S2 according to the contents in the connecting situation database 36 and public personal information database 38 of the original connection server 12 which was set at the time of the special personal information registering process in FIGS. 27A and 27B are executed. That is, a check is made to see if the information has been received in the preservation channel in step S2. If the information is received, the received information is read out and displayed on the basis of the reading operation of the user in step S3. When the connection end preparation is recognized in step S4, the connection end is notified to the connection server 12 in step S5, thereby deleting the connection information 94 from the connecting situation database 36. The connection is actually finished. When the change of the receiving mode is discriminated in step S1, a check is made to see if the changed receiving mode is the anytime reception in which the emergency channel is permitted or the reception refusal in which the reception is refused in step S6. In case of the anytime reception, step S7 follows and the use of the emergency channel is permitted by the edition using the connection permission information registration format 52. If necessary in association with the permission of the use of the emergency channel, an edition to change the registration contents can be also performed with respect to the public personal information registration format 56 and public personal information use permission information registration format 58. After completion of the edition, when the connection to the internet 16 is started in step S8, the connection information is automatically formed and is transmitted to the connection server 12 in step S9. After that, each information including the edited connection permission information is transmitted in step S10, thereby allowing the information to be updated and registered into the connecting situation database 36 and public personal information database 38 on the connection server 12 side. Subsequently in step S11, when there is the information reception in the emergency channel whose mode was changed, the information is displayed on the display in a real-time manner in step S12. In step S13, the presence or absence of the connection end preparation is discriminated. When the connection is not finished, the presence or absence of the mode change is discriminated in step S14. The processes from step S11 are repeated. When there is the mode change, the processing routine is returned to the process in step S1. When the connection end preparation from the internet 16 is recognized in step S13, the end of connection is notified to the connection server 12 in step S15, thereby allowing the connection information 94 to be deleted from the database. The connection is actually finished. When a menu of the reception refusal for the specific IP server is selected in association with the change in receiving mode in step S6, step S16 follows. Each file of the public personal information use permission information, public personal information connection permission information, and connection notification destination information is edited, for example, like the real estate company J of the registration information of the connection server 12 in FIGS. 22A to 22C. When the connection to the internet 16 is started in step S17, the connection information is automatically formed and is transmitted to the connection server 12 in step S18. After that, each of the edited information is transmitted in step S19 and the connecting situation database 36 and public personal information database 38 of the connection server 12 are updated and registered, thereby refusing the reception of the information from the specific IP server.

(Connection server)

FIG. 29 is a schematic flowchart for the processing function of the connection server 12 which functions as a connection managing apparatus in FIGS. 1A and 1B. The processes of the connection server can be divided into a corresponding process for the registration of the special personal information by the peer client 10 in step S1, a corresponding process for the access permission by the IP server 12 and the retrieval request of the client in step S2, and a corresponding process for the retrieval request of the client connection information by the IP server 14 in step S3.

Figure 30:
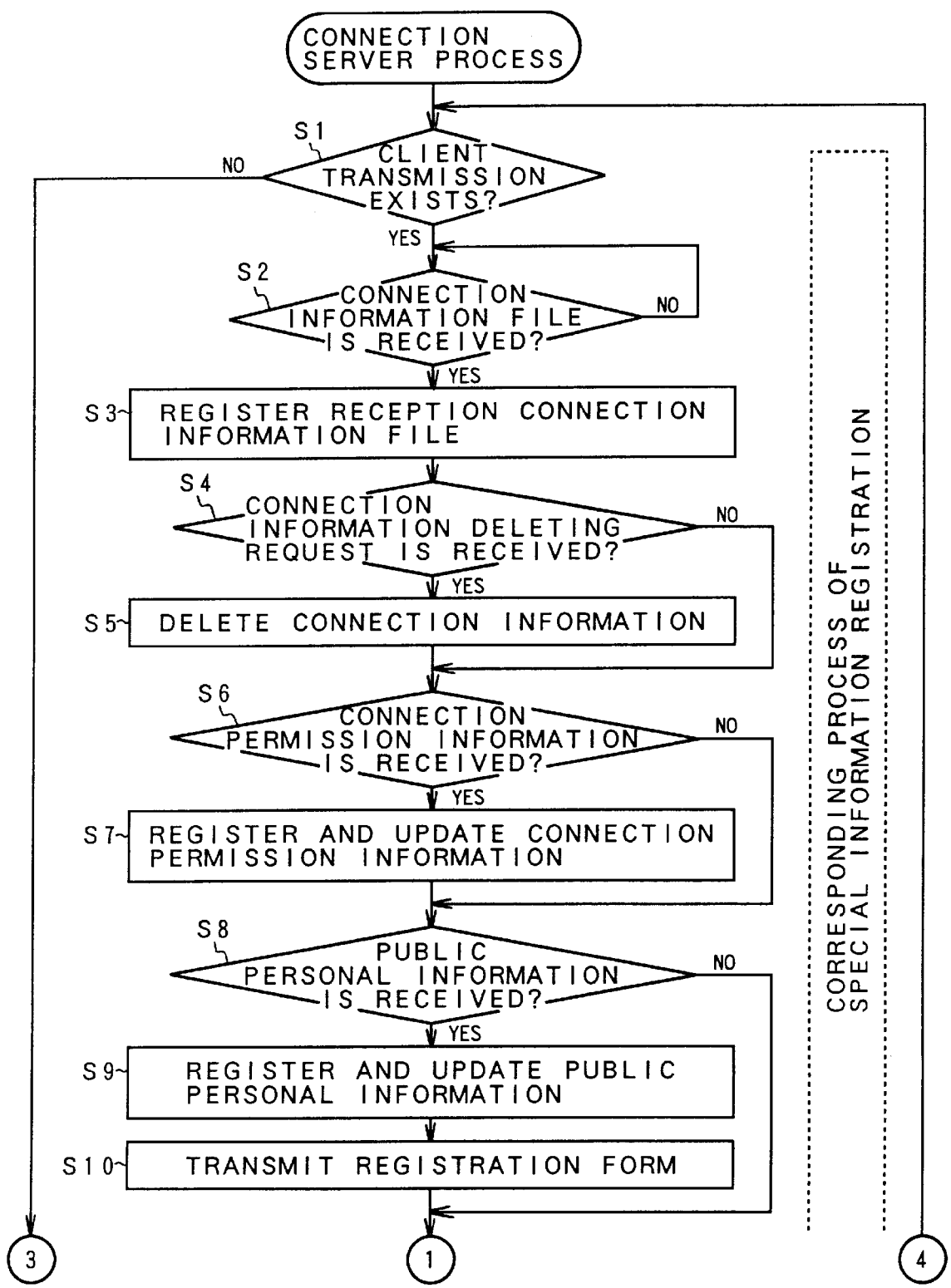
FIG. 30 is a flowchart for a corresponding process of a registration of special personal information of the connection server.

Processes from step S1 in FIG. 30 to step S14 in FIG. 31 relate to the corresponding process for the special personal information registration by the peer client 10 in step S1 in FIG. 29. First in step S1 in FIG. 30, a check is made to see if the information has been transmitted from the peer client 10. When the information is transmitted from the peer client 10, the system waits for the reception of the connection information in step S2. In step S3, the received connection information is registered into the connecting situation database 36. In step S4, a check is made to see if a connection information deleting request has been received. If YES, the connection information in which the connecting request is received is deleted from the connecting situation database 36 in step S5. In step S6, a check is made to see if the connection permission information has been received. If YES, the connection permission information is updated and registered into the connecting situation database 36 in step S7. In this case, it is sufficient to perform the updating and registration of the connection permission information with respect to only the changed portion. In step S8, when the reception of the public personal information is discriminated, the changed portion of the public personal information is updated and registered in step S9. When the public personal information is updated and registered and the kind of necessary information is newly updated at this time, the corresponding registration form is transmitted to the peer client 10 in step S10 in accordance with the contents of the necessary information. When the public personal information use permission information is received in step S11, the changed portion of the public personal information use permission information is updated and registered into the public personal information database 38 in step S12. When the setting of the active publication is discriminated in step S13 in FIG. 31 in the updating and registration of the public personal information use permission information, a fact that there is a change such as registration, updating, deletion, or the like in the connecting situation and the public personal information is notified to the designated IP server by using the information provider's file in step S14.

Processes in steps S15 to S19 in FIG. 31 relate to a corresponding process for the retrieval request of the client in which the access is permitted by the IP server in step S2 in FIG. 29. When the transmission from the IP server 14 is discriminated in step S15, step S16 follows. When there is a retrieval request of the public personal information use permission information 104, the public personal information use permission information 104 is retrieved in step S17 and the ID code of the peer client 10 in which the access permission has been set is responded for the host name of the IP server. When the retrieval request of the retrieved public personal information in which the ID code was designated is discriminated in step S18, the public personal information designated by the ID code is retrieved in step S19 and "kind of necessary information" as an inevitable public item of the retrieved public personal information is responded to the IP server 14. The processes in steps S15 to S19 are executed by the user retrieval responding unit 82 in the connection server 12 in FIGS. 1A and 1B.

Figure 32:
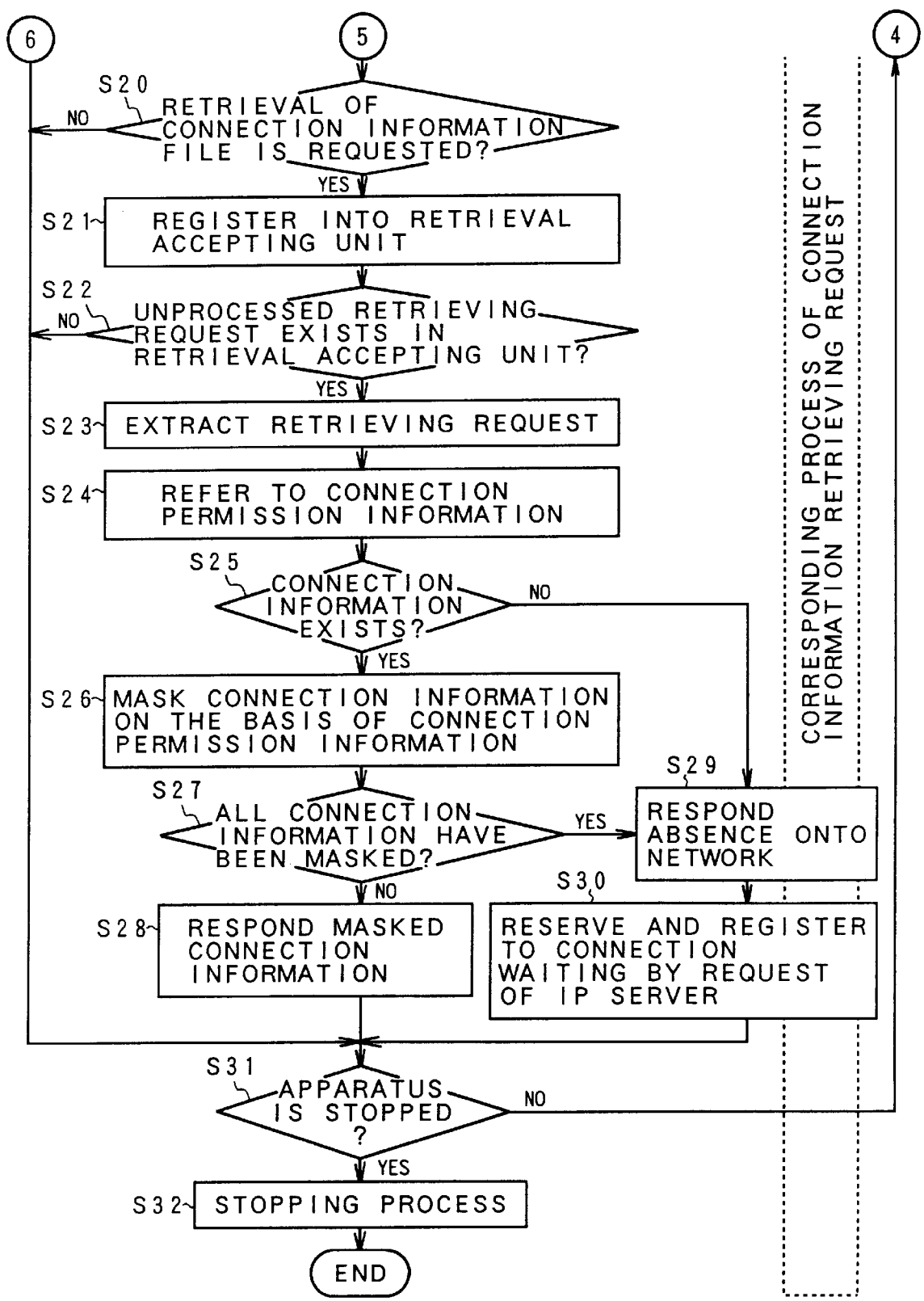
FIG. 32 follows FIG. 31 and is a flowchart for the corresponding process of the connection information retrieval request of the connection server.
Figure 33:
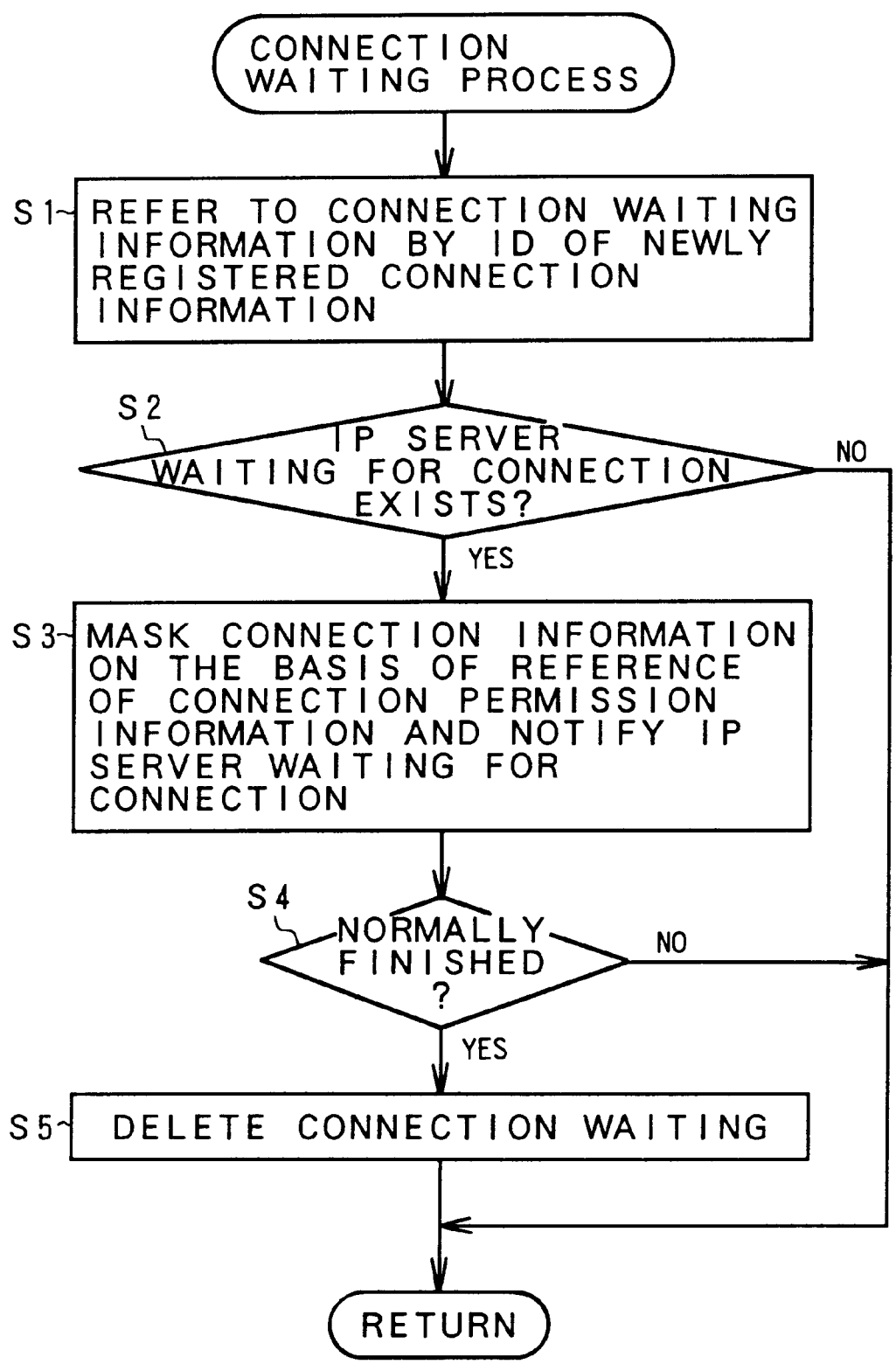
FIG. 33 follows FIG. 32 and is a flowchart for a connection waiting process of the connection server.

Processes from step S20 in FIG. 31 to step S30 in FIG. 33 relate to the corresponding process for the retrieval request of the client connection information by the IP server 14 in step S3 in FIG. 29. In step S20 in FIG. 31, when the retrieval request of the connection information in which the ID code was designated is received by the connection information retrieval responding unit 84 from the IP server 14, the retrieval request is registered into the retrieval accepting unit 86 in step S21. When there is an unprocessed retrieval request in the retrieval accepting unit 86 in step S22, the unprocessed retrieval request is extracted in step S23. The connection permission referring unit 88 refers to the connection permission information 96 in step S24 in FIG. 32. Subsequently, the connection information retrieval responding unit 84 discriminates whether the connection information 94 corresponding to the ID code exists in the connecting situation database 36 or not in step S25. If YES, the relevant connection information is mask-processed on the basis of the connection permission information in step S26. The connection information of the IP address of the peer client 10, the password of the permitted channel, and the like is responded together with the ID code. On the other hand, when the connection information designated by the ID code doesn't exist in step S25, step S29 follows and the absence of the connection information on the network is responded to the IP server. When a connection waiting registering request from the IP server for it is received, the IP server host name is registered into the connection waiting information 98 in step S29. After completion of the masking process, when it is determined in step S27 that all of the information was masked by the connection information, this means that the transmission of the information has been refused by the request from the peer client 10 side. Therefore, step S29 follows and the foregoing processes are executed. When such a series of processes are finished, a check is made in step S31 to see if the apparatus of the connection server 12 has been stopped. When the apparatus is not stopped, the processing routine is again returned to step S1 in FIG. 30 and the processes are repeated. When the stop of the apparatus is decided in step S31, a stopping process is executed in step S32.

FIG. 33 shows a connection waiting process based on the connection waiting information 98 registered in the connecting situation database 36 of the connection server 12 in FIGS. 1A and 1B. When the connection information is newly registered in association with the start of the connection of the peer client 10 to the internet 16, the connection information retrieval responding unit 84 of the connection server 12 refers to the connection waiting information 98 by the ID code of the connection information which was newly registered, thereby discriminating the presence or absence of the IP server in the connection waiting state in step S2. If there is the IP server in the connection waiting state, in step S3, the corresponding connection information is mask-processed with reference to the connection permission information corresponding to the ID code and notifies the IP server 14 in the connection waiting state of the masked information. When a normal end of the connection information for the IP server is recognized in step S4, the registration of the connection waiting from the connection waiting information 98 is deleted in step S5. Even if the connection information is notified to the IP server 14 in the connection waiting state in step S3, so long as the IP server 14 side doesn't exist on the network in this instance, the processes are not normally finished in step S4. The deletion of the registration of the connection waiting in step S5 is not performed but the registration in the connection waiting information 98 is maintained as it is.

(IP server)

Figure 34:
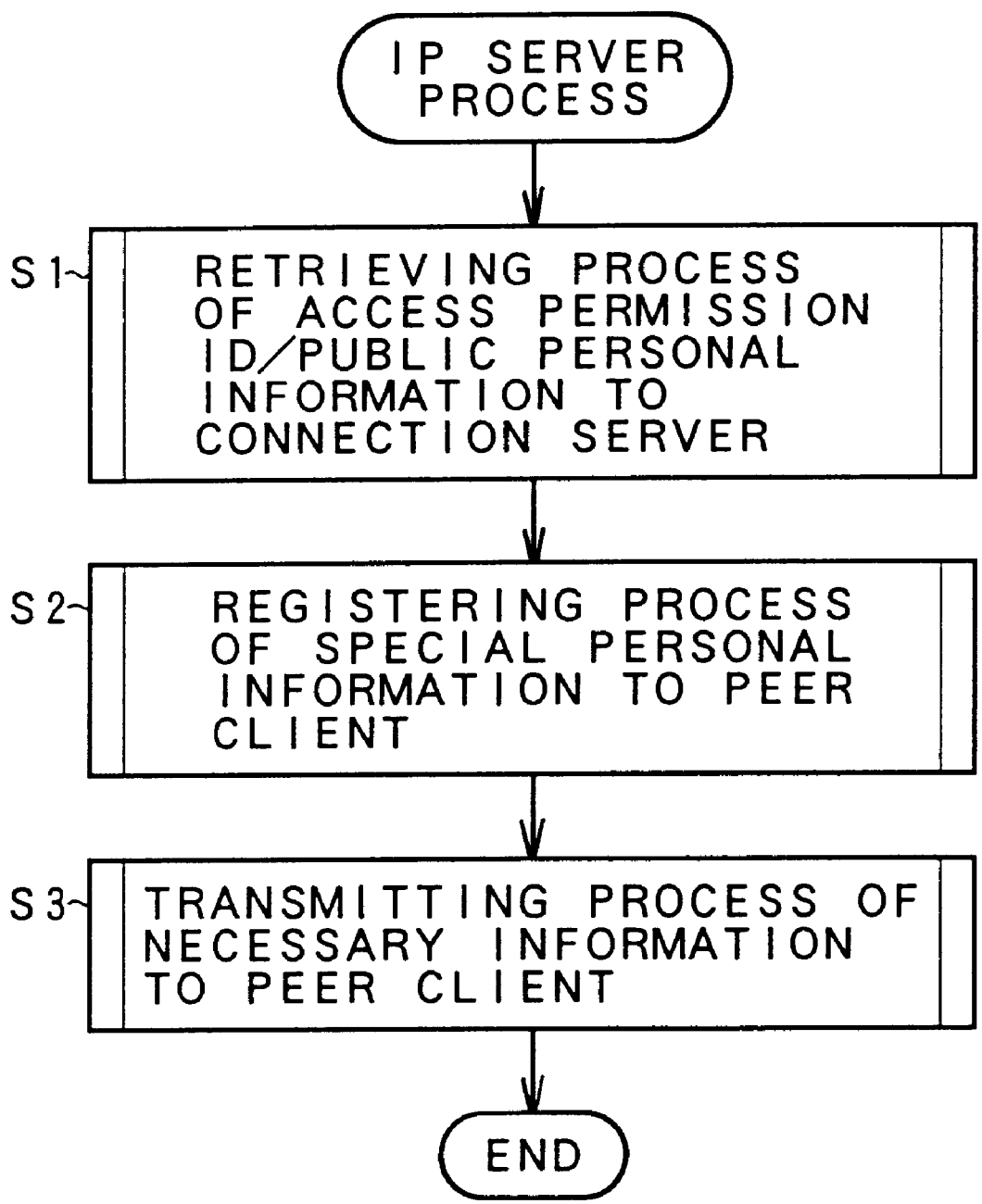
FIG. 34 is a schematic flowchart of the IP server.

FIG. 34 shows an outline of processes of the IP server 14 which functions as an information providing apparatus in FIGS. 1A and 1B. The processes of the IP server are divided into a retrieving process of the access permission client to the connection server 12 in step S1, a registering process of the special personal information to the peer client 10 in step S2, and a transmitting process of the necessary information to the peer client 10 in step S3.

Figure 35:
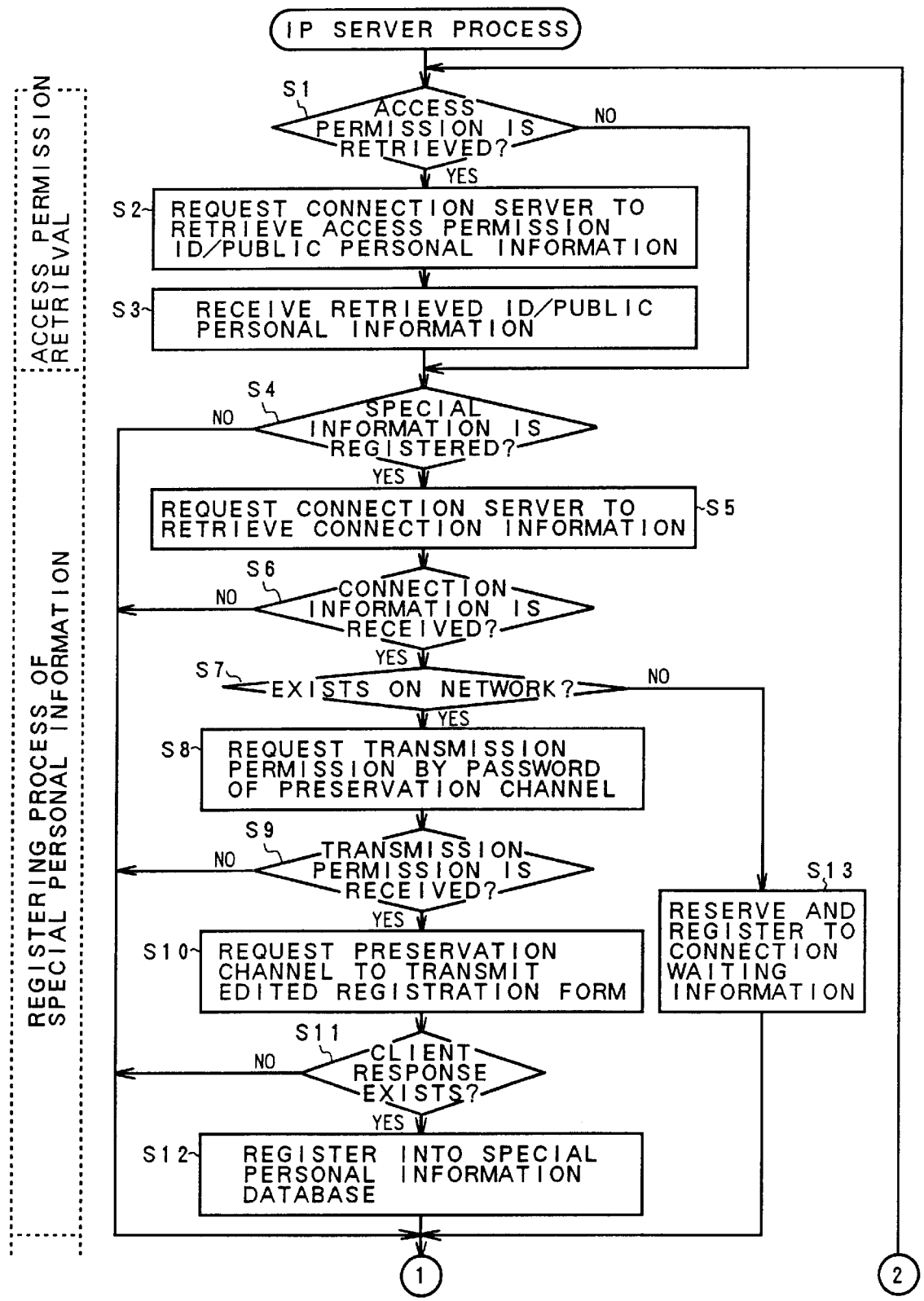
FIG. 35 is a flowchart for an access permission retrieval and a special personal information registration of the IP server.

Steps S1 to S3 in FIG. 35 relate to the retrieving process of the access permission or public personal information to the connection server 12 in step S1 in FIG. 34. First in step S1, when the retrieval of the access permission or public personal information is discriminated, the connection server 12 is requested so as to retrieve the ID code of the access permission or to retrieve the public personal information based on the ID code in step S2. In step S3, "kind of necessary information" of the ID code of the access permission or the inevitable public item of the public personal information corresponding to the ID code which was retrieved is received.

Steps S4 to S12 in FIG. 35 relate to the registering process of the special personal information to the peer client 10 in step S2 in FIG. 34. When the registration of the special personal information is determined in step S4, in step S5, the connection server 12 is requested so as to retrieve the connection information in which the ID code of the peer client 10 was designated. When the connection information is received in step S6, a check is made in step S7 to see if the peer client 10 exists on the network. If YES, a transmission permission is requested by the password of the preservation channel of the peer client 10 in step S8. When the transmission permission is received in step S9, a transmission of the edited special personal information registration form is requested to the preservation channel of the peer client 10 in step S10. When there is a response from the peer client 10 in step S11 for the transmitting request, the received special personal information is registered into the special personal information database 48 in step S12. When the peer client 10 doesn't exist on the network in step S7, a reservation registration of the connection server 12 for the connection waiting information 98 is performed in step S13.

Figure 36:
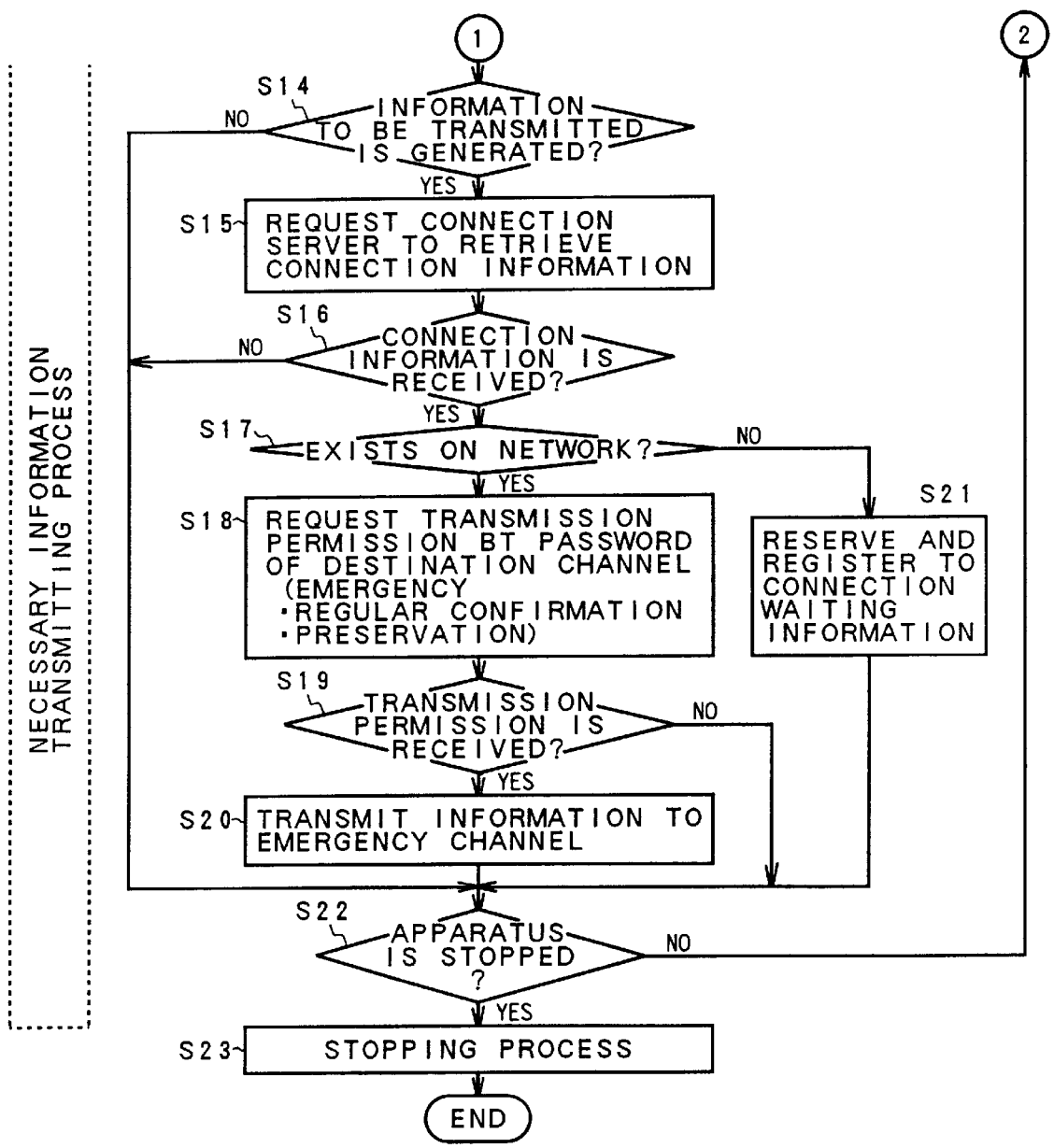
FIG. 36 is a flowchart for a necessary information transmitting process of the IP server.

Steps S14 to S20 in FIG. 36 relate to the transmitting process of the necessary information to the peer client 10 in step S3 in FIG. 34. In step S14, when information which meets the contents of the special personal information registered in the special personal information database 48 and is desired to be transmitted is generated in step S14, the ID code of the peer client 10 of the transmission destination is designated and the connection server 12 is requested so as to retrieve the connection information in step S15. When the connection information is received in step S16, it is confirmed in step S17 that the peer client 10 exists on the network. After that, in step S18, the transmission permission is requested by transmitting the password of any one of the emergency channel, regular confirmation channel, and preservation channel which was permitted as a destination channel. In step S19, the transmission permission is received. After that, the information is transmitted to the destination channel in step S20. If the peer client 10 doesn't exist on the network in step S17, the IP server host name is reserved and registered into the connection waiting information 98 of the connection server 12. When a series of transmitting processes of the necessary information are finished, a check is made in step S22 to see if the apparatus of the IP server has been stopped. When the apparatus is not stopped, the processing routine is again returned to step S1 and the series of processes are repeated. When the apparatus is stopped, the stopping process is performed in step S23. After that, the series of processes are finished.

According to the invention as described above, a form in which the client has the leadership such that the peer client which functions as a user apparatus selects the IP server which functions as an information providing apparatus and receives the providing of the necessary information. The user who desires the providing of the information can receive the information providing from a plurality of IP servers by merely opening the least information that is necessary for a contact from the IP server.

The user who desires the providing of the information receives the initial contacts from the side of a plurality of IP servers by merely disclosing the necessary least access permission of the connection information necessary for communication and the kind of information. In response to the initial contacts, the user can receive the providing of information and services by selecting an information providing destination and sending necessary special personal information thereto. Even if the personal information is not unreasonably opened to a number of IP servers as in the conventional system, the user easily select the information providing destination and can receive proper information.

If the special personal information for the IP server of the specific information providing destination is preliminarily registered, each time necessary information is generated after that, the information is provided from the IP server in a real-time manner and a freshness of the information providing can be remarkably raised. For example, it is also possible to properly cope with a case where information is needed in a real-time manner as in case of a stock exchange, a foreign exchange trading, or the like.

Further, even after the special personal information was registered into the IP server and the information providing was received, the information providing can be refused from the client side in the middle of the providing operation. By allowing the user side to have the leadership with respect to not only the information providing but also the refusal of the provided information, a use efficiency of the information management system is improved.

Although the above embodiment has been described as an example with respect to the information providing or service providing such as real estate exchange, stock exchange, conference schedule adjustment, or the like, the invention is not limited to the kind of information or service which is provided. The invention can be applied as it is to other proper information providing or service providing.

Although the internet has been described as an example of the open network environment, it will be obviously understood that other arbitrary open network environment can be also used.

Further, the invention provides the recording medium in which the control program of each of the peer client 10, IP server 14, and connection server 12 which are interconnected by the internet 16 constructing the information management system so that they can communicate with each other has been stored and which can be executed by the computer. However, as a providing form of the recording medium in this case, a form in which the program has been stored in a memory such as RAM, hard disk, or the like of the peer client 10, IP server 14, and connection server 12, a form in which the program is stored into a portable medium such as CD-ROM, floppy disk, or the like and is loaded, further, a form in which a program provider provides the program to each apparatus via a communication line, or the like is also included.

The present invention is not limited to the foregoing embodiment but further includes many proper modifications without departing from the objects of the present invention.

What is claimed is:

1. An information management system using an open network environment comprising:

a user apparatus for receiving information including an information providing apparatus for providing the information to said user apparatus; and a connection managing apparatus for managing information that is necessary to provide the information from said information providing apparatus to said user apparatus and is interconnected by a network environment so that they can communicate with each other, wherein said user apparatus has a user processing unit for transmitting connection information to said connection managing apparatus when the connection to said network is started and receiving the information from said information providing apparatus, and said information providing apparatus has an information providing processing unit transmitting information to said user apparatus based on the connection information of the user obtained from said connection managing apparatus;

a connection information processing unit for transmitting connection information including a self ID code, a network address, and a password of an information reception channel as said access permission information to said connection managing apparatus when a connection to the open network is started, allowing said connection information to be registered into a database of said connection managing apparatus, transmitting a connection end notification when the connection to said open network is finished, and allowing said connection information to be deleted from said database;

a public personal information processing unit editing public personal information in which each of the self ID code, the kind of providing information, and a reception channel in which the reception of the information is permitted is designated, transmitting said edited public personal information as a part of said access permission information to said connection managing apparatus when the connection to the open network is started, and allowing said public personal information to be registered into said database;

a special personal information processing unit editing a registration format of special personal information according to the kind of said providing information which is sent from said connection managing apparatus in association with the transmission of said public personal information, transmitting said edited registration format in response to a transmitting request of the registration format from said information providing apparatus, and allowing said registration format to be registered into a database of said information providing apparatus; and a reception display unit receiving the providing information from said information providing apparatus after the registration of said special personal information and displaying said providing information, a connection management processing unit of said connection managing apparatus comprises:

a connection information managing unit registering said connection information transmitted at the start of the connection of said user apparatus to the open network into said database and deleting the relevant connection information from said database upon receipt of the connection end notification;

a public personal information managing unit for updating and registering said public personal information transmitted from said user apparatus into said database;

a registration format providing unit for transmitting the registration mat of said special personal information which has been predetermined according to the kind of said providing information designated by said public personal information to said user apparatus;

a user retrieval responding unit for responding the personal inmation on the basis of the ID code of the user apparatus designating the access permission, the kind of information to be provided, and a predetermined registered publication permission by referring to said database when a retrieval request of a user who desires the information providing is received from said information providing apparatus; and a connection information retrieval responding unit for reading out the relevant connection information with reference to said database when a retrieval request of said connection information in which an ID code of a specific user apparatus is designated is received from said information providing apparatus, for recognizing items of a publication permission and items of a publication refusal in said connection information with reference to connection permission inmation in said database, and for responding said connection information by performing a masking process with respect to the items of the publication refusal, and said information providing processing unit of said information providing apparatus comprises:

a user retrieval requesting unit requesting said connection managing apparatus so as to retrieve the ID code of the user designating the access permission, the kind of information to be provided, and personal information in which a publication is permitted;

a connection information retrieval requesting unit requesting said connection managing apparatus so as to retrieve the connection information of said user apparatus by using a specific ID code obtained by said user retrieval requesting unit;

a special personal information managing unit requesting said user apparatus so as to transmit the special personal information on the basis of the connection information obtained by said connection information retrieval requesting unit and registering said special personal information into the database; and a providing information managing unit transmitting said providing information to the user apparatus on the basis of the connection information obtained by the operation of said connection information retrieval requesting unit when said providing information adapted to the special personal information in said database is obtained.

2. A system according to claim 1, wherein the connection information generated and transmitted by said user apparatus has passwords of a plurality of kinds of information reception channels, permission and inhibition of each of said reception channels are designated according to the connection permission information which was separately edited, and said connection managing apparatus performs the masking process of said connection information with reference to said connection permission information.

3. A system according to claim 1, wherein said user apparatus has an emergency channel displaying the received information onto a display in a real-time manner, a regular confirmation channel storing the received information and reading out and displaying the received information onto the display at every predetermined time period, and a preservation channel storing the received information and displaying the received information onto the display in accordance with a reading operation of the user, passwords of said emergency channel, said regular confirmation channel, and said preservation channel are set in accordance with said connection information and said connection permission information, and a use permission is designated.

4. A system according to claim 1, wherein said public personal information has inevitable public items in which necessary information and unnecessary information are designated and selective public items such as name, address, telephone number, FAX number, mail address, and the like, and whether said selective public items are opened or not opened is designated by public personal information use permission information which is separately edited.

5. A system according to claim 4, wherein said public personal information use permission information has an active publication item actively notifying of the public personal information from said connection managing apparatus without waiting for the user retrieval from said information providing apparatus and said active publication item is selectively designated by said public personal information use permission information.

6. A system according to claim 1, wherein when the retrieval request of said connection information using the ID code of the specific user apparatus is received from said information providing apparatus, if the relevant connection information doesn't exist in said database, said connection managing apparatus performs the masking process to all of items in said connection information and responds, thereby notifying of the absence of said user apparatus on the network.

7. A system according to claim 6, wherein when the notification indicative of the absence on the network is received for the retrieval request of the connection information to said connection managing apparatus, said information providing apparatus registers a self network name and the ID code of the user apparatus as connection waiting information into connection waiting information of said connection managing apparatus, and when the connection information is registered in the database in association with the start of the connection of an arbitrary user apparatus to the open network, said connection managing apparatus refers to said connection waiting information, recognizes said information providing apparatus in a connection waiting state, and retrieves and responds the connection information.

8. A system according to claim 6, wherein said user apparatus forms connection notification destination information which designates the information providing apparatus generating the connection information from said connection managing apparatus, transmits said connection notification destination information at the time of the start of the connection to said connection managing apparatus, and registers said connection notification destination information into the database, and when the registration of the connection information in association with the connection to the open network is received from said user apparatus, said connection managing apparatus refers to the connection notification destination information in said database and responds valid connection information to the information providing apparatus designated as a connection notification destination.

9. An information management system using an open network environment comprising:

a user apparatus for receiving information including an information providing apparatus for providing the information to said user apparatus; and a connection managing apparatus for managing information that is necessary to provide the information from said information providing apparatus to said user apparatus and is interconnected by a network environment so that they can communicate with each other, wherein said user apparatus has a user processing unit for transmitting connection information to said connection managing apparatus when the connection to said network is started and receiving the information from said information providing apparatus, and said information providing apparatus has an information providing processing unit transmitting information to said user apparatus based on the connection information of the user obtained from said connection managing apparatus, wherein said user apparatus registers conference convention information necessary for scheduling a conference as predetermined personal information into a database of said information providing apparatus, and said information providing apparatus transmits conference guide information to user apparatuses of convention target persons designated based on said conference convention information, collects attendance information, determines details of the conference after said attendance information was collected, and transmits the details of the conference to the user apparatuses of said convention target persons.

10. An apparatus comprising:

a user apparatus of an open network environment which is interconnected to an information providing apparatus; and a connection managing apparatus managing various information necessary to provide information by the open network environment so that they can communicate with each other and which receives information provided from said information providing apparatus, wherein said user apparatus has a user processing unit transmitting least access permission information necessary to provide the information to said connection processing apparatus when the connection to the open network is started, allowing the least access permission information to be registered into a database, responding to a transmission request of predetermined personal information defined as special personal information from said information providing apparatus based on said access permission information, allowing the special personal information to be registered into the database, and receiving providing information adapted to said special personal information from said information providing apparatus;

wherein said user processing unit comprises:

a connection information processing unit transmitting connection information as said access permission information including a self ID code, a network address, and a password of an information reception channel to said connection managing apparatus when the connection to the open network is started, allowing said access permission information to be registered into the database of said connection managing apparatus, transmitting a connection end notification when the connection is finished, and allowing said connection information to be deleted from said database;

a public personal information processing unit editing public personal information in which a self ID code, a kind of information to be provided, and a reception channel in which a reception of the information is permitted are designated, transmitting said edited public personal information as a part of said access permission information to said connection managing apparatus when the connection to the open network is started, and allowing the public personal information to be registered into said database;

a special personal information processing unit editing a registration format of the special personal information according to the kind of said providing information which is sent from said connection managing apparatus in association with the transmission of said public personal information, transmitting said edited registration format in response to a transmitting request of the registration format from said information providing apparatus, and allowing the registration format to be registered into the database of said information providing apparatus; and a reception display unit receiving the information provided from said information providing apparatus after said special personal information was registered and displaying said provided information.

11. An apparatus comprising:

a connection managing apparatus of an open network environment managing various information necessary to provide information to a user apparatus from information providing apparatuses which are interconnected by the open network environment so that they can communicate with each other, wherein said connection managing apparatus has a connection management processing unit registering least access permission information necessary for information providing transmitted at the time of the start of the connection of said user apparatus to an open network into a database and responding relevant access permission information to a retrieval request from said information providing apparatus with reference to said database;

wherein said connection management processing unit comprises:

a connection information managing unit registering connection information including an ID code, a network address, and a password of an information reception channel transmitted from said user apparatus as said access permission information at the start of the connection to the open network of said user apparatus into the database and deleting the relevant connection information from said database when receiving a connection end notification;

a public personal information managing unit updating public personal information which was transmitted from said user apparatus by designating each of an ID code, a kind of providing information, a reception channel in which a reception of the information is permitted, and other personal information in which a publication is selectively permitted is designated and registering said public personal information into said database;

a registration format providing unit transmitting a registration format of predetermined personal information defined as special personal information to said user apparatus in accordance with the kind of said providing information designated by said public personal information;

a user retrieval responding unit performing, when a retrieval request of a user who desires the information providing from said information providing apparatus is received, responding an ID code of the user apparatus in which the access permission is designated, a kind of information to be provided, and other personal information in which a publication is selectively permitted with reference to said database; and a connection information retrieval responding unit reading out the relevant connection information with reference to said database when a retrieval request of said connection information in which an ID code of a specific user apparatus is designated is received from said information providing apparatus, recognizing items of publication permission and items of publication refusal by referring to connection information use permission information in said database, executing a masking process with respect to the connection information of the publication refusal, and responding said connection information.

12. An apparatus according to claim 11, wherein said connection information has passwords of a plurality of kinds of information reception channels, the passwords are automatically formed by a random number process by said user apparatus, different passwords are generated each time said user apparatus is connected to the open network, connection permission information controlling a designation of permission and inhibition of each of said information reception channels which was separately edited and transmitted from said user apparatus has been registered in said database, and when a retrieval request of the connection information is received from said information providing apparatus, the masking process of said connection information is performed with reference to said connection permission information.

13. An apparatus according to claim 12, wherein when said user apparatus has an emergency channel displaying received information onto a display in a real-time manner, a regular confirmation channel storing the received information and reading out and displaying the received information onto the display at every predetermined period, and a preservation channel storing the received information and displaying onto the display in accordance with a reading operation by a user as said information reception channels, passwords of said emergency channel, said regular confirmation channel, and said preservation channel are set on the basis of said connection information and said connection permission information, and a use permission is designated.

14. An apparatus according to claim 11, wherein the public personal information registered in said database has inevitable public items in which necessary information and unnecessary information are designated and selective public items such as name, address, telephone number, facsimile number, mail address, and the like, and whether said selective public items are opened or not opened is designated on the basis of public personal information use permission information which was separately edited, transmitted, and registered by said user apparatus.

15. An apparatus according to claim 14, wherein said selective public items of said public personal information has an active public item to actively notify of an access permission without waiting for a retrieval of the access permission from said information providing apparatus, and said active public item is selectively designated by said public personal information use permission information.

16. An apparatus according to claim 11, wherein when a retrieval request of said connection information using an ID code of a specific user apparatus is received from said information providing apparatus, if the relevant connection information doesn't exist in said database, a masking process is performed to all of items in said connection information and a response is performed, thereby notifying of the absence of said user apparatus on the network.

17. An apparatus according to claim 16, wherein when the absence on the network is notified in response to the retrieval request of the connection information from said information providing apparatus, a network name of said information providing apparatus and an ID code of said user apparatus are registered as connection waiting information into the connection waiting information in said database, when the connection information is registered in the database in association with the start of the connection of an arbitrary user apparatus to the open network, the information providing apparatus in a connection waiting state is recognized by referring to said connection waiting information and the relevant connection information is retrieved and responded.

18. An apparatus according to claim 16, wherein connection notification destination information to designate an information providing apparatus responding the connection information transmitted at the start of the connection to the open network of said user apparatus is registered into said database and, when the registration of the connection information in association with the connection of said user apparatus to the open network is received, said connection notification destination information in said database is referred to and valid connection information is responded to the information providing apparatus designated as a connection notification destination.

19. An information providing apparatus of an open network environment which is interconnected to a user apparatus and a connection managing apparatus managing various information necessary for information providing by the open network environment so that they can communicate with each other and which provides information to said user apparatus, wherein said information providing apparatus has an information providing processing unit obtaining predetermined personal information defined as special personal information by a transmitting request based on least access permission information which was obtained by a retrieval request to said connection managing apparatus and which is necessary to provide information to said user apparatus, registering said predetermined personal information into a database and, when providing information adapted to said special personal information is obtained, transmitting said obtained information to said user apparatus, wherein said information providing processing unit comprises:

a user retrieval requesting unit requesting said connection managing apparatus so as to retrieve an ID code of a user who designates an access permission, a kind of information to be provided, and personal information which is selectively opened;

a connection information retrieval requesting unit requesting said connection managing apparatus so as to retrieve the connection information of the user apparatus by using a specific ID code obtained by said user retrieval requesting unit;

a special personal information managing unit requesting said user apparatus so as to transmit special personal information on the basis of the connection information obtained by said connection information retrieval requesting unit and registering said special personal information into the database; and a providing information managing unit performing, when providing information adapted to said special personal information in said database is obtained, transmitting said providing information to the user apparatus on the basis of the connection information obtained by an operation of said connection information retrieval requesting unit.

20. A computer readable recording medium which is interconnected to an information providing apparatus and a connection managing apparatus managing various information necessary for information providing by an open network environment so that they can communicate with each other and in which a control program of a user apparatus of the open network environment receiving the information providing from said information providing apparatus, comprising:

said recording medium has a user processing module transmitting least access permission information necessary for information providing to said connection managing apparatus at the time of the start of the connection to an open network, allowing said access permission information to be registered into a database, responding to a transmitting request of predetermined personal information defined as special personal information from said information providing apparatus based on said access permission information, allowing said personal information to be registered into the database, and receiving the providing information adapted to said special personal information from said information providing apparatus, wherein said user processing module comprises:

a connection information processing module transmitting connection information including a self ID code, a network address, and a password of an information reception channel as said access permission information at the time of the start of the connection to the open network, allowing said connection information to be registered into the database of said connection managing apparatus, and transmitting a connection end notification when the connection is finished, thereby deleting said connection information from said database;

a public personal information processing module editing public personal information in which each of a self ID code, a kind of providing information, a reception channel in which a reception of information is permitted, and personal information which is selectively opened has been designated, transmitting said edited public personal information as apart of said access permission information to the open network at the start of the connection to said connection managing apparatus, and allowing said public personal information to be registered into said database;

a special personal information processing module editing a registration format of special personal information according to the kind of said providing information which is transmitted from said connection managing apparatus in association with the transmission of said public personal information, transmitting said edited registration format in response to a transmitting request of the registration format from said information providing apparatus, and allowing said registration format to be registered into the database of said information providing apparatus; and a reception displaying module receiving and displaying the providing information from said information providing apparatus after said special personal information was registered.

21. A computer readable recording medium in which a control program of a connection managing apparatus of an open network environment managing various information necessary for information providing to a user apparatus from information providing apparatuses which are interconnected by an open network environment so that they can communicate with each other, comprising:

said recording medium has a connection management processing module registering least access permission information which was transmitted at the time of the start of the connection of said user apparatus to an open network and which is necessary for information providing into a database and responding relevant access permission information for a retrieval request from said information providing apparatus with reference to said database, wherein said connection management processing module comprises:

a connection information managing module registering connection information including an ID code, a network address, and a password of an information reception channel transmitted as said access permission information at the start of the connection of said user apparatus to the open network into the database and deleting the relevant connection information from said database when receiving a connection end notification;

a public personal information managing module updating public personal information which was transmitted from said user apparatus and in which each of an ID code, a kind of providing information, a reception channel in which a reception of information is permitted, and personal information which is selectively opened is designated and registering said public personal information into said database;

a registration format providing module transmitting a registration format of predetermined personal information defined as special personal information in accordance with the kind of said providing information designated by said public personal information to said user apparatus;

a user retrieval responding module, when a retrieval request of a user who desires information providing is received from said information providing apparatus, responding an ID code of the user apparatus in which an access permission is designated and a kind of information to be provided with reference to said database; and a connection information retrieval responding module, when a retrieving request of said connection information in which an ID code of a specific user apparatus is designated is received from said information providing apparatus, reading out relevant connection information with reference to said database, recognizing items of publication permission and items of publication refusal with reference to the connection permission information in said database, executing a masking process with respect to the items of publication refusal, and responding said connection information.

22. A computer readable recording medium which is interconnected to a user apparatus and a connection managing apparatus managing various information necessary information providing by an open network environment so that they can communicate with each other and in which a control program of an information providing apparatus of the open network environment providing information to said user apparatus, comprising:

said recording medium has an information providing processing module obtaining predetermined personal information defined as special personal information by a transmitting request based on least access permission information which was obtained by a retrieval request to said connection managing apparatus and which is necessary for information providing to said user apparatus, registering said predetermined personal information into a database, and when providing information adapted to said special personal information is obtained, transmitting said providing information to said user apparatus, wherein said information providing processing module comprises:

a user retrieval requesting module requesting said connection managing apparatus so as to retrieve an ID code of a user in which an access permission is designated, a kind of information to be provided, and personal information which is selectively opened;

a connection information retrieval requesting module requesting said connection managing apparatus so as to retrieve connection information of the user apparatus by using a specific ID code obtained by said user retrieval requesting module;

a special personal information managing module requesting said user apparatus so as to transmit special personal information on the basis of the connection information obtained by said connection information retrieval requesting module and registering said special personal information into the database; and a providing information managing module performing, when providing information adapted to the special personal information in said database is obtained, transmitting said providing information to the user apparatus on the basis of the connection information obtained by an operation of said connection information retrieval requesting module.

* * * * *

UNITED STATES PATENT AND TRADEMARK OFFICE
CERTIFICATE OF CORRECTION

PATENT NO. : 6,199,164 B1  
DATED : March 6, 2001  
INVENTOR(S) : Atsushi Nishimoto, et al.

Page 1 of 1

It is certified that error appears in the above-identified patent and that said Letters Patent is hereby corrected as shown below:

<u>Column 33,</u>  
Lines 33, 48 and 49, change "inmation" to -- information --.

Signed and Sealed this

Twenty-seventh day of November, 2001

Attest:

*Attesting Officer*

NICHOLAS P. GODICI  
*Acting Director of the United States Patent and Trademark Office*